(12) United States Patent
Skupin et al.

(10) Patent No.: US 11,582,473 B2
(45) Date of Patent: Feb. 14, 2023

(54) CODING CONCEPT ALLOWING EFFICIENT MULTI-VIEW/LAYER CODING

(71) Applicant: GE Video Compression, LLC, Albany, NY (US)

(72) Inventors: Robert Skupin, Berlin (DE); Karsten Suehring, Berlin (DE); Yago Sanchez De La Fuente, Berlin (DE); Gerhard Tech, Berlin (DE); Valeri George, Berlin (DE); Thomas Schierl, Berlin (DE); Detlev Marpe, Berlin (DE)

(73) Assignee: GE Video Compression, LLC, Albany, NY (US)

( * ) Notice: Subject to any disclaimer, the term of this patent is extended or adjusted under 35 U.S.C. 154(b) by 693 days.

(21) Appl. No.: 14/875,808

(22) Filed: Oct. 6, 2015

(65) Prior Publication Data

US 2016/0057441 A1    Feb. 25, 2016

Related U.S. Application Data

(63) Continuation of application No. PCT/EP2014/057089, filed on Apr. 8, 2014.
(Continued)

(51) Int. Cl.
*H04N 19/44* (2014.01)
*H04N 19/137* (2014.01)
*H04N 19/105* (2014.01)
*H04N 19/17* (2014.01)
*H04N 19/70* (2014.01)
(Continued)

(52) U.S. Cl.
CPC .......... *H04N 19/44* (2014.11); *H04N 19/105* (2014.11); *H04N 19/137* (2014.11); *H04N 19/17* (2014.11); *H04N 19/187* (2014.11); *H04N 19/30* (2014.11); *H04N 19/36* (2014.11); *H04N 19/436* (2014.11); *H04N 19/463* (2014.11); *H04N 19/52* (2014.11); *H04N 19/55* (2014.11); *H04N 19/59* (2014.11); *H04N 19/597* (2014.11); *H04N 19/70* (2014.11)

(58) Field of Classification Search
CPC .... H04N 19/44; H04N 19/105; H04N 19/137; H04N 19/17; H04N 19/187; H04N 19/30; H04N 19/36; H04N 19/436; H04N 19/463; H04N 19/52; H04N 19/55; H04N 19/59; H04N 19/597; H04N 19/70
See application file for complete search history.

(56) References Cited

U.S. PATENT DOCUMENTS

| 6,343,100 | B1 | 1/2002 | Fujiwara et al. |
| 2007/0206673 | A1 | 9/2007 | Cipolli et al. |

(Continued)

FOREIGN PATENT DOCUMENTS

| CN | 101336549 A | 12/2008 |
| CN | 101371585 A | 2/2009 |

(Continued)

OTHER PUBLICATIONS

Notice of Allowance U.S. Appl. No. 14/753,144 dated Jun. 7, 2018.
(Continued)

*Primary Examiner* — Maria E Vazquez Colon
(74) *Attorney, Agent, or Firm* — Morgan, Lewis & Bockius LLP

(57) ABSTRACT

Various concepts which further improve multi-view/layer coding concepts, are described.

12 Claims, 32 Drawing Sheets

Related U.S. Application Data

(60) Provisional application No. 61/809,605, filed on Apr. 8, 2013.

(51) Int. Cl.

| | | |
|---|---|---|
| H04N 19/59 | (2014.01) | |
| H04N 19/30 | (2014.01) | |
| H04N 19/597 | (2014.01) | |
| H04N 19/55 | (2014.01) | |
| H04N 19/436 | (2014.01) | |
| H04N 19/463 | (2014.01) | |
| H04N 19/52 | (2014.01) | |
| H04N 19/187 | (2014.01) | |
| H04N 19/36 | (2014.01) | |

(56) References Cited

U.S. PATENT DOCUMENTS

| | | |
|---|---|---|
| 2008/0007438 A1 | 1/2008 | Segall et al. |
| 2008/0089412 A1 | 4/2008 | Ugur et al. |
| 2009/0010332 A1 | 1/2009 | Jeon et al. |
| 2009/0141814 A1 | 6/2009 | Yin et al. |
| 2009/0268805 A1 | 10/2009 | Shanableh et al. |
| 2009/0285306 A1 | 11/2009 | Leonardi et al. |
| 2009/0310680 A1 | 12/2009 | Jeon et al. |
| 2010/0195738 A1 | 8/2010 | Zhu et al. |
| 2010/0208796 A1 | 8/2010 | Luo et al. |
| 2010/0226440 A1 | 9/2010 | Miyoshi et al. |
| 2010/0322529 A1 | 12/2010 | Amonou et al. |
| 2011/0122944 A1 | 5/2011 | Gupta et al. |
| 2011/0293004 A1* | 12/2011 | An ............... H04N 19/96 375/240.13 |
| 2012/0224634 A1 | 9/2012 | Yamori |
| 2014/0064373 A1* | 3/2014 | Le Leannec ...... H04N 19/119 375/240.16 |
| 2014/0254669 A1* | 9/2014 | Rapaka ............. H04N 19/436 375/240.12 |
| 2016/0088305 A1* | 3/2016 | Oh ................... H04N 19/187 375/240.02 |

FOREIGN PATENT DOCUMENTS

| | | |
|---|---|---|
| CN | 101529911 A | 9/2009 |
| CN | 101601304 A | 12/2009 |
| CN | 101627634 A | 1/2010 |
| CN | 101822055 A | 9/2010 |
| CN | 101971630 A | 2/2011 |
| CN | 102724556 A | 10/2012 |
| CN | 102726045 A | 10/2012 |
| EP | 0 577 310 A2 | 1/1994 |
| JP | 2003-199106 A | 7/2003 |
| JP | 2007-067552 A | 3/2007 |
| JP | 2009518981 A | 5/2009 |
| KR | 10-2007-0008365 A | 1/2007 |
| WO | 2007/064347 A2 | 7/2007 |
| WO | 2008/047300 A2 | 4/2008 |
| WO | 2009048502 A2 | 4/2009 |
| WO | 2012/036901 A1 | 3/2012 |
| WO | 2012096981 A1 | 7/2012 |
| WO | 2012/167712 A1 | 12/2012 |
| WO | 2012167711 A1 | 12/2012 |

OTHER PUBLICATIONS

Boyce, J. et al., "Description of Low Complexity Scalable Video Coding Technology Proposal by Vidyo and Samsung", Joint Collaborative Team on Video Coding (JCT-VC) of ITU-T SG16 WP3 and ISO/IEC JTC1/SC29/WG11, JCTVC-K0045, 11th Meeting, Oct. 10-19, 2012, pp. 1-25.
Bross, B. et al., "High Efficiency Video Coding (HEVC) Text Specification Draft 6", Joint Collaborative Team on Video Coding (JCT-VC) of ITU-T SG16 WP3 and ISO/IEC JTC1/SC29/WG11, JCTVC-H1003_d0, 7th Meeting, Nov. 21-30, 2011, 228 pages.
Bross, B. et al., "High Efficiency Video Coding (HEVC) Text Specification Draft 9", Joint Collaborative Team on Video Coding (JCT-VC) of ITU-T SG16 WP3 and ISO/IEC JTC1/SC29/WG11, JCTVC-K1003_v1, 11th Meeting, Oct. 10-19, 2012, 280 pages.
Chen, Y. et al., "AHG7: Parallel Decoding SEI Message for MV-HEVC", Joint Collaborative Team on 3D Video Coding Extensions of ITU-T SG16 WP3 and ISO/IEC JTC1/SC29/WG11, JCT3V-D0199, 4th Meeting, Apr. 20-26, 2013, pp. 1-4.
Coban, M. et al., "Support of Independent Sub-Pictures", Joint Collaborative Team on Video Coding (JCT-VC) of ITU-T SG16 WP3 and ISO/IEC JTC1/SC29/WG11, JCTVC-I0356, 9th Meeting, Apr. 27-May 7, 2012, pp. 1-6.
Deshpande, S., "On Video Parameter Set", Joint Collaborative Team on Video Coding (JCT-VC) of ITU-T SG16 WP3 and ISO/IEC JTC1/SC29/WG11, JCTVC-K0223, m26554, 11th Meeting Oct. 10-19, 2012, pp. 1-6.
Ding, C. et al., "A Fast Mode Decision Algorithm for Multiview Auto-Stereoscopic 3D Video Coding Based on Mode and Disparity Statistic Analysis", Proc. of SPIE, vol. 8558, 2012, pp. 85580P-1-85580P-12.
Francois, E. et al., "Storage Reduction in Dependent Tiles", Joint Collaborative Team on Video Coding (JCT-VC) of ITU-T SG16 WP3 and ISO/IEC JTC1/SC29/WG11, JCTVC-H0179, 8th Meeting, Feb. 1-10, 2012, pp. 1-4.
Fuldseth, A. et al., "Tiles", Joint Collaborative Team on Video Coding (JCT-VC) of ITU-T SG16 WP3 and ISO/IEC JTC1/SC29/WG11, JCTVC-F335, 6th Meeting, Jul. 14-22, 2011, pp. 1-15.
Henry, F. et al., "Wavefront Parallel Processing", Joint Collaborative Team on Video Coding (JCT-VC) of ITU-T SG16 WP3 and ISO/IEC JTC1/SC29/WG11, JCTVC-E196, M19714, 5th Meeting, Mar. 16-23, 2011, pp. 1-8.
Horimai, H. et al., "Full-Color 3D Display System with 360 Degree Horizontal Viewing Angle", Proc. Int. Symposium of 3D and Contents, 2010, 4 pages.
Ikai, T., "AHG13: Parallel Decoding SEI Message", Joint Collaborative Team on Video Coding (JCT-VC) of ITU-T SG16 WP3 and ISO/IEC JTC1/SC29/WG11, JCT3V-D0064, 4th Meeting, Apr. 20-26, 2013, pp. 1-6.
Ikai, T., "3D-CE5.h Related: Disparity Vector Restrictions", Joint Collaborative Team on 3D Video Coding of ITU-T SG16 WP3 and ISO/IEC JTC1/SC29/WG11, JCT3V-B0112, 2nd Meeting, Oct. 13-19, 2012, 7 pages.
Nakagami, O. et al., "MV-HEVC: Vertical Length Restriction of Inter-view Vector for HEVC Simple 3D Extension", Joint Collaborative Team on 3D Video Coding of ITU-T SG16 WP3 and ISO/IEC JTC1/SC29/WG11, JCT3V-B0037, 2nd Meeting, Oct. 13-19, 2012, 7 pages.
Rapaka, K. et al., "Parallel Processing Indications for Tiles in HEVC Extensions", Joint Collaborative Team on Video Coding (JCT-VC) of ITU-T SG16 WP3 and ISO/IEC JTC1/SC29/WG11, JCTVC-M0334, 13th Meeting, Apr. 18-26, 2013, pp. 1-3.
Schwarz, H. et al., "Description of Scalable Video Coding Technology Proposal by Fraunhofer HHI (Configuration A)", Joint Collaborative Team on Video Coding (JCT-VC) of ITU-T SG16 WP3 and ISO/IEC JTC1/SC29/WG11, JCTVC-K0042, 11th Meeting, Oct. 10-19, 2012, pp. 1-37.
Segall, C. et al., "Spatial Scalability Within the H.264/AVC Scalable Video Coding Extension", IEEE Transactions on Circuits and Systems for Video Technology, vol. 17, No. 9, Sep. 2007, pp. 1121-1135.
Skupin, R. et al., "Layer Decoding Delay Indication for SHVC and 3D/MV-HEVC", Joint Collaborative Team on Video Coding (JCT-VC) of ITU-T SG16 WP3 and ISO/IEC JTC1/SC29/WG11, JCTVC-M0200, 13th Meeting, Apr. 18-26, 2013, pp. 1-4.
Skupin, R. et al., "Inter-layer Delay Indication in VUI (Combining Aspects of JCTVC-M0200, JCT3V-D0064 and JCT3V-D0199)", Joint Collaborative Team on Video Coding (JCT-VC) of ITU-T SG16 WP3 and ISO/IEC JTC1/SC29/WG11, JCTVC-M0463, 13th Meeting, Apr. 18-26, 2013, pp. 1-4.

(56) References Cited

OTHER PUBLICATIONS

Skupin, R. et al., "On VPS Extension", Joint Collaborative Team on Video Coding (JCT-VC) of ITU-T SG16 WP3 and ISO/IEC JTC1/SC29/WG11, JCTVC-L0200, 12th Meeting, Jan. 14-23, 2013, 2 pages.
Sühring, K. et al., "Indication of Tile Boundary Alignment", Joint Collaborative Team on Video Coding (JCT-VC) of ITU-T SG16 WP3 and ISO/IEC JTC1/SC29/WG11, JCTVC-L0197, 12th Meeting, Jan. 14-23, 2013, 2 pages.
Sühring, K. et al., "Indication of Tile Boundary Alignment", Joint Collaborative Team on Video Coding (JCT-VC) of ITU-T SG16 WP3 and ISO/IEC JTC1/SC29/WG11, JCTVC-M0202, 13th Meeting, Apr. 18-26, 2013, pp. 1-3.
Sühring, K. et al., "Tile Boundary Alignment and Inter-layer Prediction Constraints for SHVC and MV-HEVC", Joint Collaborative Team on Video Coding (JCT-VC) of ITU-T SG16 WP3 and ISO/IEC JTC1/SC29/WG11, JCTVC-Mxxxx, 13th Meeting, Apr. 18-26, 2013, pp. 1-5.
Tech, G. et al., "AHG 13: Restriction of Inter-layer Prediction on Tile Boundaries", Joint Collaborative Team on 3D Video Coding Extensions of ITU-T SG16 WP3 and ISO/IEC JTC1/SC29/WG11, JCT3V-D0051_v1, 4th Meeting, Apr. 20-26, 2013, pp. 1-3.
Thang, T. et al., "Proposal to Video Parameter Set and its Extension", Joint Collaborative Team on Video Coding (JCT-VC) of ITU-T SG16 WP3 and ISO/IEC JTC1/SC29/WG11, JCTVC-K0228, 11th Meeting, Oct. 10-19, 2012, pp. 1-7.
Ugur, K. et al., "Parallel Decoding Info SEI Message for MVC", Joint Video Team (JVT) of ISO/IEC MPEG and ITU-T VCEG (ISO/IEC JTC1/SC29/WG11 and ITU-T SG16 Q. 6) JVT-V098, JVT-V098r1.doc, 22nd Meeting, Jan. 13-19, 2007, pp. 1-8.
Wang, Y., "BoG on High-level Syntax for Extension Planning", Joint Collaborative Team on Video Coding (JCT-VC) of ITU-T SG16 WP3 and ISO/IEC JTC1/SC29/WG11, JCTVC-J00574, 10th Meeting, Jul. 11-20, 2012, pp. 1-17.
Wang, Y. et al., "Tile Groups", Joint Collaborative Team on Video Coding (JCT-VC) of ITU-T SG16 WP3 and ISO/IEC JTC1/SC29/WG11, JCTVC-G318, 7th Meeting, Nov. 21-30, 2011, pp. 1-9.
Wilburn, B. et al., "High Performance Imaging Using Large Camera Arrays", ACM Transactions on Graphics, vol. 24, No. 3, 2005, 12 pages.
Wilburn, B. et al., "The Light Field Video Camera", Electronic Imaging 2002, International Society for Optics and Photonics, 2001, 8 pages.
Zhou, M., "AHG4: Enable Parallel Decoding with Tiles", Joint Collaborative Team on Video Coding (JCT-VC) of ITU-T SG16 WP3 and ISO/IEC JTC1/SC29/WG11, JCTVC-10118, M24357, 9th Meeting, Apr. 27-May 7, 2012, pp. 1-9.
Boyce, J. et al., "NAL Unit Header and Parameter Set Designs for HEVC Extensions", Joint Collaborative Team on Video Coding (JCT-VC) of ITU-T SG16 WP3 and ISO/IEC JTC1/SC29/WG11, JCTVC-K1007, 11th Meeting, Oct. 10-19, 2012, pp. 1-8.
Bross, B. et al., "High Efficiency Video Coding (HEVC) Text Specification Draft 9", Joint Collaborative Team on Video Coding (JCT-VC) of ITU-T SG16 WP3 and ISO/IEC JTC1/SC29/WG11, JCTVC-K1003_v13, 11th Meeting, Oct. 10-19, 2012, 316 pages.
Bross, B. et al., "High Efficiency Video Coding (HEVC) Text Specification Draft 10 (for FDIS and Last Call)", Joint Collaborative Team on Video Coding (JCT-VC) of ITU-T SG16 WP3 and ISO/IEC JTC1/SC29/WG11, JCTVC-L1003_v34, 12th Meeting, Jan. 14-23, 2013, 310 pages.
Chen, J. et al., "SHVC Draft Text 1", Joint Collaborative Team on Video Coding (JCT-VC) of ITU-T SG16 WP3 and ISO/IEC JTC1/SC29/WG11, JCTVC-L1008, 12th Meeting, Jan. 14-23, 2013, 34 pages.
Tech, G. et al., "MV-HEVC Draft Text 2", Joint Collaborative Team on 3D Video Extension Development of ITU-T SG16 WP3 and ISO/IEC JTC1/SC29/WG11, JCT3V-B1004_d0, 2nd Meeting, Oct. 13-19, 2012, 22 pages.
Tech, G. et al., "MV-HEVC Draft Text 3 (ISO/IEC 23008-2:201x/PDAM2)", Joint Collaborative Team on 3D Video Extension Developments of ITU-T SG16 WP3 and ISO/IEC JTC1/SC29/WG11, JCT3V-C1004_d3, 3rd Meeting, Jan. 17-23, 2013, 34 pages.
Tech, G. et al., "3D-HEVC Test Model 3", Joint Collaborative Team on 3D Video Extension Development of ITU-T SG16 WP3 and ISO/IEC JTC1/SC29/WG11, JCT3V-C1005_d0, 3rd Meeting, Jan. 17-23, 2013, 51 pages.
Tech, G. et al., "3D-HEVC Test Model 3", Joint Collaborative Team on 3D Video Extension Development of ITU-T SG16 WP3 and ISO/IEC JTC1/SC29/WG11, JCT3V-C1005_spec_d1, 3rd Meeting, Jan. 17-23, 2013, 90 pages.
Joint Call for Proposals on Scalable Video Coding Extensions of High Efficiency Video Coding (HEVC), International Organization for Standardization, ISO/IEC JTC1/SC29/WG11, Coding of Moving Pictures and Audio, Jul. 2012, 49 pages.
Wang, Y., "Solutions Considered for NAL Unit Header and Video Parameter Set for HEVC Extensions", Joint Collaborative Team on Video Coding (JCT-VC) of ITU-T SG16 WP3 and ISO/IEC JTC1/SC 29/WG11, JCTVC-J1007, 10th Meeting, Jul. 11-20, 2012, pp. 1-6.
Official Communication issued in corresponding International Application PCT/EP2014/057089, dated Aug. 12, 2014.
Office Action dated Aug. 8, 2017 in Japanese Application 2015-551183.
Fuldseth. A. et al., "Tiles", Joint Collaborative Team on Video Coding (JCT-VC) of ITU-T SG16 WP3 and ISO/IEC JTC1/SC29/WG11 5th Meeting: Geneva, CH,Mar. 16-23, 2011, U.S., JCTVC, Mar. 11, 2011, JCTVC-E408, p. 1-p. 14, URL: http://phenix.it-sudparis.eu/jct/index.php.
Decision to Grant dated Aug. 31, 2017 in Korean Application 10-2015-7020813.
Office Action dated Nov. 29, 2016 in Japanese Application No. 2016-506938.
Byeongdoo Choi et al., "AHG9: NAL unit header design for base spec", Joint Collaborative Team on Video Coding (JCT-VC) of ITU-T SG16 WP3 and ISO/IEC JTC1/SC29/WG11 JCTVC-K0210, ITU-T, Oct. 19, 2012, p. 1-5.
Byeongdoo Choi et al., "AHG9: NAL unit header with layer ID partitioning", Joint Collaborative Team on Video Coding (JCT-VC) of ITU-T SG16 WP3 and ISO/IEC JTC1/SC29/WG11 JCTVC-K0177, ITU-T, Oct. 19, 2012, p. 1-8.
Office Action dated Aug. 16, 2016 in Japanese Application No. 2015-551183.
Office Action dated Oct. 24, 2017 In Chinese Application 2014800324507.
Office Action dated Oct. 31, 2017 in European Application 14715932.1.
Office Action dated Nov. 3, 2017 in Chinese Application 2014800122327.
Boyce, J. et al., "NAL Unit Header and Parameter Set Designs for HEVC extensions," Joint Collaborative Team on Video Coding (JCT-VC) of ITU-T SG 16 WP and ISO/IEC JTC 1/SC 29/WG 11, 11th Meeting, Shanghai, CN, Oct. 19, 2012.
Sjoberg, R. et al., "Overview of HECV high-level syntax and reference picture management," IEEE Transactions on Circuits and Systems for Video Technology, Jan. 1, 2012, XP055045360, ISSN: 1051-8215.
Bross, B. et al., "High Efficiency Video Coding (HEVC) Text Specification Draft 10 (for FDIS & Last Call)", Joint Collaborative Team on Video Coding (JCT-VC) of ITU-T SG16 WP3 and ISO/IEC JTC1/SC29/WG11, JCTVC-H1003_d0, 12th Meeting, Mar. 19, 2013.
Suehring, K et al., "3D/MV-HEVC HLS: Extending the supported number of layers", 5. JCT-3V Meeting; Jul. 27, 2013-Aug. 2, 2013; Vienna; (The Joint Collaborative Team on 3D Video Coding Extension Development of ISO/IEC JTC1/SC29/WG11 and ITU-T SG. 16 ); URL: http://phenix.int-evry.fr/jct2/, No. JCT3V-E0092, Jul. 19, 2013 (Jul. 19, 2013).
Suehring, K et al., "MV-HEVC/SHVC HLS: Extending the supported number of layers", 4. JCT-3V Meeting; Apr. 20, 2013-Apr. 26, 2013; Incheon; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-D0211, Apr. 13, 2013.

(56) References Cited

OTHER PUBLICATIONS

Suehring, K et al., "3D/MV-HEVC HLS: Study and proposal of methods for extending the supported number of layers" 15 JCT-VC Meeting; Oct. 23, 2013; Nov. 1, 2013 Geneva; (Joint Collaborative Team on Video Coding of ISO/IEC JTC1/SC29/WG11 and ITU-T SG.16 ); URL: http://wftp3.itu.int/av-arch/jctvc-site/,, No. JCTVC-O0200, Oct. 15, 2013 (Oct. 15, 2013), XP030115242.
"Choi B. et al., "Layer identifier extension for MV-HEVC and other HEVC extension", 4. JCT-3V Meeting; Apr. 20, 2013-Apr. 26, 2013; Incheon; (The Joint Collaborative Team ON3D Video Coding Extension Development of ISO/IEC JTC1/SC29/WG11 and ITU-T SG.16 ); URL: http://phenix.int-evry.fr/jct2,, No. JCT3V-D0238, Apr. 14, 2013 (Apr. 14, 2013), XP030130902."
Non-Final Office Action dated Feb. 7, 2019 issued in corresponding U.S. Appl. No. 16/123,184.
Decision to Grant a Patent issued in Japanese Patent Application No. 2016-506938 dated Nov. 6, 2018 with English translation.
Office Action dated Oct. 29, 2019 in Japanese Application 2018-206897.
Office Action dated Jun. 20, 2019 issued in corresponding Korean Patent Application No. 10-2017-7023826 with English translation.
Office Action dated Dec. 3, 2019 in Japanese Application 2018-228292.
Office Action dated Jan. 30, 2020 in Korean Application 10-2017-7034815.
Office Action dated Aug. 4, 2020 in U.S. Appl. No. 16/795,632.
Extended European Search Report issued in corresponding European Application No. 20196003.6 dated Feb. 26, 2021.
Decision to Grant a Patent issued in corresponding Japanese Patent Application No. 2018-206897 dated Jan. 12, 2021, with English translation.
Office Action issued in corresponding Japanese Patent Application No. 2018-228292 dated Dec. 1, 2020, with English translation.
Gerhard Tech et.al., "3D-HEVC Test Model 3", Joint Collaborative Team on 3D Video Coding Extension Development of ITU-T SG16 WP3 and ISO/IEC JTC1/SC29/WG11, 3rd Meeting: Geneva, CH, [JCT3V-C1005_d0], Mar. 2013, JCT3V-C1005 (version 1), pp. 13-19.
Tomohiro Ikai et al., "AHG13: Disparity vector restrictions", Joint Collaborative Team on 3D Video Coding Extension Development of ITU-T SG16 WP3 and ISO/IEC JTC1/SC29/WG11, 3rd Meeting: Geneva, CH, [JCT3V-C0083], Jan. 2013, JCT3V-C0083 (version 1), pp. 1-5.
Ye-Kui Wang et al., "Tile groups", Joint Collaborative Team on Video Coding (JCT-VC) of ITU-T SG16 WP3 and ISO/IEC JTC1/SC29/WG11, 7th Meeting: Geneva, CH, [JCTVC-G318], Nov. 2011, JCTVC-G318 (version 1), pp. 1-9.
Partial European Search Report issued in corresponding European Patent Application No. 20176564.1 dated Nov. 3, 2020.
Cong Ding et al., "A Fast Mode Decision Algorithm for Multiview Auto-stereoscopic 3D Video Coding Based on Mode and Disparity Statistic Analysis", Proc. of SPIE, vol. 8558, pp. 85580P-1-85580P-12.
Extended European Search Report issued in corresponding European Patent Application No. 20176564 dated Jan. 21, 2021.

Junghak Nam et al., "Advanced motion an disparity prediction for 3D video coding", 98. MPEG Meeting, M22560, Geneva, CH, Nov. 28, 2011-Dec. 2, 2011.
Office Action dated Sep. 28, 2020 in Korean Application 10-2020-7017996.
Decision to Grant issued in corresponding Japanese Patent Application No. 2018-228292 dated Jun. 22, 2021, with English translation.
Notice of Allowance issued in corresponding Korean Patent Application No. 10-2020-7017996 dated Aug. 10, 2021, with English translation.
Ki-Kit Lai et al., "Viewpoint Switching in Multiview Videos Using SP-Frames", ICIP, 2008, pp. 1776-1779.
Decision to Grant a Patent issued in corresponding Korean Patent Application No. 10-2020-7024491 dated Aug. 24, 2021, with English translation.
Office Action issued in corresponding Korean Patent Application No. 10-2021-7036956 dated Nov. 30, 2021, with English translation.
Office Action issued in corresponding Chinese Patent Application No. 201811477939.1 dated Jan. 6, 2022, with English translation.
ITU-T Telecommunication Standardization Sector of ITU, H.264/AVC, 2012, "Series H: Audiovisual and Multimedia Systems, Infrastructure of audiovisual services—Coding of moving video—Advanced video coding for generic audiovisual services", 680 pps.
Yong Liu et al., "An optimal bit allocation framework for error resilient scalable video coding", Proceedings of the 27th conference on Picture Coding Symposium, May 2009 (abstract only).
Office Action issued in corresponding U.S. Appl. No. 17/241,855 dated Jan. 25, 2022.
Office Action issued in corresponding Korean Patent Application No. 10-2021-7038166 dated Mar. 30, 2022 with English translation.
Office Action issued in corresponding Japanese Patent Application No. 2021-020886 dated Mar. 22, 2022, with English translation.
Office Action (Decision to Grant) issued in corresponding Japanese Patent Application 2021-020886 dated Jul. 12, 2022, with English translation.
Final Office Action issued in corresponding U.S. Appl. No. 17/241,855 dated Jul. 21, 2022.
Office Action (Decision to Grant) issued in corresponding Korean Patent Application 10-2021-7036956 dated Aug. 9, 2022, with English translation.
Office Action issued in corresponding Chinese Patent Application 201811477939.1 dated Aug. 10, 2022, with English translation.
Office Action issued in corresponding Chinese Patent Application 201910419460.0 dated Oct. 9, 2022.
Wiegand, Thomas, "Overview of the H.264/AVC Video Coding Standard", IEEE Transactions On Circuits and Systems for Video Technology, Jul. 2003, 19 pages.
Office Action issued in corresponding Japanese Patent Application 2021-121175 dated Sep. 27, 2022, with English translation.
English translation of Office Action issued in corresponding Chinese Patent Application 201910419560.0 dated Oct. 9, 2022 (Office Action previously submitted in Oct. 25, 2022 IDS).

* cited by examiner

| 0 | 1 | 2 | 3 | 12 | 13 | 14 | 21 | 22 | 23 | 24 |
|---|---|---|---|----|----|----|----|----|----|----|
| 4 | 5 | 6 | 7 | 15 | 16 | 17 | 25 | 26 | 27 | 28 |
| 8 | 9 | 10 | 11 | 18 | 19 | 20 | 29 | 30 | 31 | 32 |
| 33 | 34 | 35 | 36 | 41 | 42 | 43 | 47 | 48 | 49 | 50 |
| 37 | 38 | 39 | 40 | 44 | 45 | 46 | 51 | 52 | 53 | 54 |
| 55 | 56 | 57 | 58 | 63 | 64 | 65 | 69 | 70 | 71 | 72 |
| 59 | 60 | 61 | 62 | 66 | 67 | 68 | 73 | 74 | 75 | 76 |

FIG 12

| video_parameter_set_rbsp( ) { | Descriptor |
|---|---|
| ... | |
|    inter_layer_PREDTYPE_RESTYPE_SCAL_flag_1 | u(1) |
|    inter_layer_PREDTYPE_RESTYPE_SCAL_flag_2 | u(1) |
| ... | ... |
|    inter_layer_PREDTYPE_RESTYPE_SCAL_flag_N | u(1) |
| } | |

FIG 13A

| sequence_parameter_set_rbsp( ) { | Descriptor |
|---|---|
| ... | |
|    inter_layer_PREDTYPE_RESTYPE_SCAL_flag_1 | u(1) |
|    inter_layer_PREDTYPE_RESTYPE_SCAL_flag_2 | u(1) |
| ... | ... |
|    inter_layer_PREDTYPE_RESTYPE_SCAL_flag_N | u(1) |
| ... | |
| } | |

FIG 13B

| video_parameter_set_rbsp( ) { | Descriptor |
|---|---|
| ... | |
|    ultra_low_delay_decoding_mode_flag | u(1) |
| ... | |
|    if(!ultra_low_delay_decoding_mode_flag){ | |
|       du_interleaving_enabled_flag | u(1) |
|       inter_layer_PREDTYPE_RESTYPE_SCAL_flag_1 | u(1) |
|       inter_layer_PREDTYPE_RESTYPE_SCAL_flag_2 | u(1) |
|       ... | |
|       inter_layer_PREDTYPE_RESTYPE_SCAL_flag_N | u(1) |
|    } | |
| ... | |
| } | |

FIG 13C

| picture_parameter_set_rbsp( ) { | Descriptor |
|---|---|
| ... | |
|    if(!ultra_low_delay_decoding_mode_flag) | |
|       independent_tile_upsampling_idc | ue(v) |
| ... | |
| } | |

FIG 13D

| video_parameter_set_rbsp( ) { | Descriptor |
|---|---|
| ... | |
|    independent_tiles_flag | u(1) |
| ... | |
| } | |

FIG 13E

| video_parameter_set_rbsp( ) { | Descriptor |
|---|---|
| ... | |
|    independent_tiles_flag | u(1) |
| ... | |
| ... | |
|    if(!independent_tiles_flag){ | |
|       inter_layer_PREDTYPE_RESTYPE_SCAL_flag_1 | u(1) |
|       inter_layer_PREDTYPE_RESTYPE_SCAL_flag_2 | u(1) |
|       ... | u(1) |
|       inter_layer_PREDTYPE_RESTYPE_SCAL_flag_N | u(1) |
|    } | |
| ... | |
| } | |

FIG 13F

| picture_parameter_set_rbsp( ) { | Descriptor |
|---|---|
| ... | |
|    if(!independent_tiles_flag) | |
|       independent_tiles_upsampling_idc | ue(v) |
| ... | |
| } | |

FIG 13G

| video_parameter_set_rbsp( ) { | Descriptor |
|---|---|
| ... | |
| ultra_low_delay_decoding_mode_flag | u(1) |
| ... | |
| } | |

FIG 14

| video_parameter_set_rbsp( ) { | Descriptor |
|---|---|
| ... | |
| du_interleaving_enabled_flag | u(1) |
| ... | |
| } | |

FIG 24

| nal_unit_header( ) { | Descriptor |
|---|---|
| forbidden_zero_bit | f(1) |
| nal_unit_type | u(6) |
| nuh_layer_id | u(6) |
| nuh_temporal_id_plus1 | u(3) |
| } | |

FIG 25

| video_parameter_set_rbsp( ) { | Descriptor |
|---|---|
| video_parameter_set_id | u(4) |
| ... | |
| layer_id_ext_flag | u(1) |
| ... | |
| } | |

FIG 26

| video_parameter_set_rbsp( ) { | Descriptor |
|---|---|
| video_parameter_set_id | u(4) |
| ... | |
| layer_id_mode_idc | u(2) |
| ... | |
| } | |

FIG 27

| video_parameter_set_rbsp( ) { | Descriptor |
|---|---|
|   video_parameter_set_id | u(4) |
|   ... | |
|   layer_id_ext_len | u(3) |
|   ... | |
| } | |

FIG 28

| slice_segment_header( ) { | Descriptor |
|---|---|
|   first_slice_segment_in_pic_flag | u(1) |
|   ... | |
|   if( !dependent_slice_segment_flag ) { | |
|     layer_id_ext | u(v) |
|     for( i=0;i<(num_extra_slice_header_bits- layer_id_ext_len);i++) | |
|       slice_reserved_flag[ i ] | u(1) |
|   ... | |
| } | |

FIG 29

| slice_segment_header( ) { | Descriptor |
|---|---|
| ... | |
|   if( slice_segment_header_extension_present_flag ) { | |
|     slice_segment_header_extension_length | ue(v) |
|     if( slice_segment_header_extension_length>0 ) { | |
|       layer_id_ext | ue(v) |
|       byte_align() | |
|     } | |
|     for( i=1;i<slice_segment_header_extension_length; i++) | |
|       slice_segment_header_extension_data_byte[ i ] | u(8) |
|   } | |
| ... | |
| } | |

FIG 30

| vps_extension( ) { | Descriptor |
|---|---|
| ... | |
|   layer_id_ext | ue(v) |
| ... | |
| } | |

FIG 31

| layer_id_ext_info( payloadSize ) { | Descriptor |
|---|---|
| ... | |
|   layer_id_ext | u(v) |
| ... | |
| } | |

FIG 32

| vps_extension( ) { | Descriptor |
|---|---|
| ... | |
| if (LayerIdExtEnabled) | |
|    vps_max_ext_layer_id | ue(v) |
| ... | |
| for( i = 1; i < VpsMaxNumLayers; i++ ) { | |
|   if( vps_nuh_layer_id_present_flag ) | |
|     layer_id_in_nalu[ i ] | u(v) |
|   for( j=0; j<NumScalabilityTypes; j++) | |
|     dimension_id[ i ][ j ] | u(v) |
| } | |
| for( lsIdx=1; lsIdx <= vps_num_layer_sets_minus1; lsIdx++ ) { | |
|   vps_profile_present_flag[ lsIdx ] | u(1) |
|   if( !vps_profile_present_flag[ lsIdx ]) | |
|     profile_layer_set_ref_minus1[ lsIdx ] | ue(v) |
|   profile_tier_level( vps_profile_present_flag[ lsIdx ], vps_max_sub_layers_minus1) | |

FIG 34A

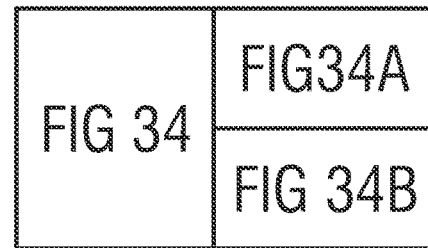

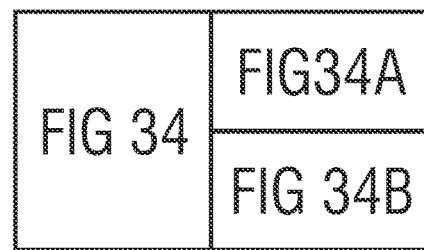
FIG 34B

| | |
|---|---|
| ... | |
| num_dims  ⟵ 902 | u(5) |
| for( t = 0; t < num_dims; t++ ) | |
|   num_pos_minus1[ t ] | u(3) |
| ... | |

FIG 39

| | |
|---|---|
| | |
| ... | |
| for( i = 1; i <=vps_max_layers_minus1; i++ ) | |
|   for( t = 0; t <=num_dims; t++ ) | |
|     pos_in_dim[ i ][ t ] | u(v) |
| ... | |

FIG 40

CODING CONCEPT ALLOWING EFFICIENT MULTI-VIEW/LAYER CODING

CROSS-REFERENCE TO RELATED APPLICATIONS

This application is a continuation of copending International Application No. PCT/EP2014/057089, filed Apr. 8, 2014, which is incorporated herein by reference in its entirety, and additionally claims priority from U.S. Application No. 61/809,605, filed Apr. 8, 2013, which is also incorporated herein by reference in its entirety.

BACKGROUND OF THE INVENTION

The present application is concerned with coding concepts allowing efficient multi-view/layer coding such as multi-view picture/video coding.

Scalable coding concepts are known in the art. In video coding, for example, H.264 allows a base layer coded video data stream to be accompanied by additional enhancement layer data so as to increase the reconstruction quality of the base layer quality video in different terms, such as spatial resolution, signal-to-noise ratio (SNR) or the like, and/or, last but not least, number of views. The recently finalized HEVC standard will also be extended by SVC/MVC profiles (SVC=Scalable Video Coding, MVC=Multi-View Coding). HEVC differs from its predecessor H.264 in many aspects, such as, for example, suitability for parallel decoding/encoding and low delay transmission. As far as the parallel encoding/decoding is concerned, HEVC supports WPP (Wavefront Parallel Processing) encoding/decoding as well a tile parallel processing concept. According to the WPP concept, the individual pictures are segmented in a row-wise manner into substreams. The coding order within each substream is directed from left to right. The substreams have a decoding order defined thereamong which leads from the top substream to the bottom substream. The entropy coding of the substreams is performed using probability adaptation. The probability initialization is done for each substream individually or on the basis of a preliminarily adapted state of the probabilities used in entropy coding the immediately preceding substream up to a certain position from the left-hand edge of the preceding substream, respectively, such as the end of the second CTB (Coded Tree Block). Spatial prediction does not need to be restricted. That is, spatial prediction may cross borders between immediately succeeding substreams. In this manner, such substreams may be encoded/decoded in parallel with the locations of current encoding/decoding forming a wavefront which runs, in a tilted manner leading from bottom left to top right, from left to right. According to the tile concept, the pictures are segmented into tiles and in order to render the encoding/decoding of these tiles a possible subject of parallel processing, spatial prediction across tile boundaries is prohibited. Merely in-loop filtering across tile boundaries may be allowed. In order to support low delay processing, the slice concept has been extended: slices are allowed to be switchable to either initialize the entropy probabilities anew, to adopt the entropy probabilities saved during processing a previous substream, i.e. a substream preceding the substream to which the current slice begin belongs, and to adopt the entropy probabilities having been continuously updated until the end of the immediately preceding slice. By this measure, WPP and tile concepts are rendered more suitable for low delay processing.

Nevertheless, it would be more favorable to have concepts at hand which further improve multi-view/layer coding concepts.

SUMMARY

According to a first embodiment, a decoder configured to decode a multi-layered video signal composed of a sequence of packets each of which includes a layer identification syntax element, may be configured to be responsive to a layer identification extension mechanism signaling in the multi-layered video signal so as to if the layer-identification extension mechanism signaling signals an activation of a layer-identification extension mechanism, read, for a predetermined packet, a layer-identification extension from the multi-layered data stream and determine a layer-identification index of the predetermined packet using the layer-identification extension, and if the layer identification extension mechanism signaling signals an inactivation of the layer-identification extension mechanism, determine, for the predetermined packet, the layer-identification index of the predetermined packet from the layer-identification syntax element included by the predetermined packet.

Another embodiment may have a multi-layered video signal composed of a sequence of packets each of which includes a layer identification syntax element, wherein a layer identification extension mechanism signaling is included by the multi-layered video signal, wherein if the layer-identification extension mechanism signaling signals an activation of a layer-identification extension mechanism, a layer-identification extension is included by the multi-layered data stream for a predetermined packet, and a layer-identification index of the predetermined packet is derivable using the layer-identification extension, and if the layer identification extension mechanism signaling signals an inactivation of the layer-identification extension mechanism, the layer-identification index of the predetermined packet is derivable from the layer-identification syntax element included by the predetermined packet.

Another embodiment may have an encoder for encoding a video into a multi-layered video signal composed of a sequence of packets each of which includes a layer identification syntax element, wherein the encoder is configured provide the multi-layered video signal with a layer identification extension mechanism signaling with if the layer-identification extension mechanism signaling signals an activation of a layer-identification extension mechanism, providing, for a predetermined packet, the multi-layered data stream with a layer-identification extension using which a layer-identification index of the predetermined packet may be determined, wherein if the layer identification extension mechanism signaling signals an inactivation of the layer-identification extension mechanism, the layer-identification index of the predetermined packet is determinable from the layer-identification syntax element included by the predetermined packet.

Another embodiment may have a method for decoding a multi-layered video signal composed of a sequence of packets each of which includes a layer identification syntax element, wherein the method is responsive to a layer identification extension mechanism signaling in the multi-layered video signal in that same includes if the layer-identification extension mechanism signaling signals an activation of a layer-identification extension mechanism, reading, for a predetermined packet, a layer-identification extension from the multi-layered data stream and determining a layer-identification index of the predetermined packet using the layer-identification extension, and if the layer identification extension mechanism signaling signals an inactivation of the layer-identification extension mechanism, determining, for the predetermined packet, the layer-identification index of the predetermined packet from the layer-identification syntax element included by the predetermined packet.

According to another embodiment, a method for encoding a video into a multi-layered video signal composed of a sequence of packets each of which includes a layer identification syntax element may have the steps of providing the multi-layered video signal with a layer identification extension mechanism signaling; and if the layer-identification extension mechanism signaling signals an activation of a layer-identification extension mechanism, providing, for a predetermined packet, the multi-layered data stream with a layer-identification extension using which a layer-identification index of the predetermined packet may be determined, wherein if the layer identification extension mechanism signaling signals an inactivation of the layer-identification extension mechanism, the layer-identification index of the predetermined packet is determinable from the layer-identification syntax element included by the predetermined packet.

Another embodiment may have a computer program having a program code for performing, when running on a computer, an inventive method.

Another embodiment may have a multi-view decoder configured to reconstruct a plurality of views from a data stream using inter-view prediction from a first view to a second view, wherein the multi-view decoder is configured to be responsive to a signaling in the data stream so as to change the inter-view prediction at spatial segment boundaries of spatial segments into which the first view is partitioned such that the inter-view prediction from the first view to the second view does not combine any information for different spatial segments of the first view, but predicts the second view and syntax elements of the second view, respectively, from information stemming from one spatial segment of the first view, only.

Another embodiment may have a multi-view decoder configured to reconstruct a plurality of views from a data stream using inter-view prediction from a first view to a second view, wherein the multi-view decoder is configured to use a signaling in the data stream as a guarantee that the inter-view prediction is restricted at spatial segment boundaries of spatial segments into which the first view is partitioned such that the inter-view prediction does not involve any dependency of any current portion of the second view on a spatial segment other than the spatial segment a co-located portion of the first view co-located to the respective current portion of the second view, is located in so as to adjust an inter-view decoding offset in reconstructing the first and second views using inter-view parallel decoding or decide on a trial of performing the reconstruction of the first and second views using inter-view parallel decoding responsive to the signaling in the data stream.

Another embodiment may have a decoder configured to decode a multi-layered video data stream composed of a sequence of NAL units, the multi-layered video data stream having pictures of a plurality of layers encoded thereinto using inter-layer prediction, each NAL unit having a layer index (e.g. nuh_layer_id) indicating the layer the respective NAL unit relates to, the sequence of NAL units being structured into a sequence of non-interleaved access units wherein NAL units belonging to one access unit relate to pictures of one temporal time instant, and NAL units of different access units relate to different time instants, wherein, within each access unit, for each layer, at least some of the NAL units relating to the respective layer are grouped into one or more decoding units, and the decoding units of NAL units relating to different layers are interleaved so that, for each decoding unit, inter-layer prediction used to encode the respective decoding unit is based on portions of pictures of layers other than the layer the respective decoding unit relates to, which are coded into decoding units preceding the respective decoding unit within the respective access unit.

Another embodiment may have a method including reading a first and second syntax structure from a multilayered data stream, the multi-layered video data stream having coded thereinto video material at different levels of information amount using inter-layer prediction, the levels having a sequential order defined thereamong and the video material being coded into the multi-layered video data stream so that no layer depends, via the inter-layer prediction, from any layer being subsequent in accordance with the sequential order, wherein each layer which depends, via the inter-layer prediction, from one or more of the other layers, increases an information amount at which the video material is coded into the one or more other layers (in terms of different dimension types, for example), wherein the multi-layered video data stream includes the first syntax structure which defines a number M of dependency dimensions spanning a dependency space as well as a maximum number $N_i$ of rank levels per dependency dimension i, thereby defining $$\prod_i N_i$$

available points in the dependency space, and an bijective mapping, mapping each level onto a respective one of at least a subset of the available points within the dependency space, and per dependency dimension i, the second syntax structure describing a dependency among a $N_i$ rank levels of dependency dimensions i, thereby defining dependencies between the available points in the dependency space all of which run parallel to a respective one of the dependency axes with pointing from higher to lower rank levels, with, for each dependency dimension, the dependencies parallel to the respective dependency dimension being invariant against a cyclic shift along each of the dependency dimensions other than the respective dimension, thereby defining, via the bijective mapping, concurrently the dependencies between the layers, and determining the dependencies between the layers based on the first and second second syntax structures, A first aspect of the present application is concerned with multi-view coding. In particular, the idea underlying the first aspect is as follows. On the one hand, inter-view prediction helps in exploiting redundancies between the plurality of views at which a certain scene is captured, thereby increasing the coding efficiency. On the other hand, inter-view prediction prevents the plurality of views from being decodable/encodable completely independent from each other, i.e. from being decodable/encodable in parallel so as to take advantage, for example, from a multi-core processor. To be more precise, inter-view prediction renders portions of a second view dependent on corresponding reference portions of a first view and this interrelationship between portions of the first and second views necessitates a certain inter-view decoding/encoding offset/delay to be met when decoding/ encoding the first and second view in parallel. The idea underlying the first aspect is that this inter-view coding offset may be substantially reduced with reducing the coding efficiency merely in a minor manner if the encoding and/or the decoding is changed with respect to the way the inter-view prediction is performed at spatial segment boundaries of spatial segments into which the first/reference view is partitioned. The change may be performed such that the inter-view prediction from the first view to the second view does not combine any information for different spatial segments of the first view, but predicts the second view and its syntax elements, respectively, from information stemming from one spatial segment of the first view, only. In accordance with an embodiment, the change is performed even more strict such that the inter-view prediction does not even cross the spatial segment boundaries, i.e. the one spatial segment is the one comprising the co-located position or co-located portion. The benefit resulting from the change of inter-view prediction at segment boundaries becomes clear when considering the consequence of combining information stemming from two or more spatial segments of the first view in the inter-view prediction. In that case, the encoding/decoding of any portion of the second view involving such a combination in the inter-layer prediction has to be deferred until the encoding/decoding of all spatial segments of the first view being combined by the inter-layer prediction. The change of the inter-view prediction at spatial segment boundaries of spatial segments of the first view, however, solves this problem and each portion of the second view is readily encodable/decodable as soon as the one spatial segment of the first view has been decoded/encoded. The coding efficiency, however, has been reduced only minorly as the inter-layer prediction is still substantially allowed, the restriction merely applying to the spatial segment boundaries of the spatial segments of the first view. In accordance with an embodiment, the encoder takes care of the change of the inter-layer prediction at the spatial segment boundaries of the spatial segments of the first view so as to avoid the just outlined combination of two or more spatial segments of the first view and signals this avoidance/circumstance to the decoder, which in turn uses the signaling as a corresponding guarantee so as to, for example, decrease the inter-view decoding delay responsive to the signaling. In accordance with another embodiment, the decoder also changes the way of inter-layer prediction, triggered by a signaling in the data stream, so that the restriction of inter-layer prediction parameter settings at spatial segment boundaries of spatial segments of the first view may be taken advantage of in forming the data stream, as the amount of side information necessitated to control the inter-layer prediction may be reduced as far as these spatial segment boundaries are concerned.

A second aspect of the present application is concerned with multi-layered video coding and the circumstance that usually NAL units into which the pictures of a plurality of layers are coded are collected into access units such that NAL units relating to one time instant form one access unit irrespective of the layer the respective NAL unit relates to, or such that one access unit exists for each different pair of time instant and layer with, however, irrespective of the possibility chosen, treating the NAL units of each time-instant-to-layer pair separately, ordering same un-interleaved. That is, NAL units belonging to one certain time instant and layer were sent out before proceeding with NAL units of another pair of time instant and layer. No interleaving was admitted. However, this hinders further reducing the end-to-end delay as the encoder is prevented from sending-out NAL units belonging to a dependent layer between NAL units belonging to the base layer, which occasion would, however, result from an inter-layer parallel processing. The second aspect of the present application gives up the strict sequential un-interleaved arrangement of the NAL units within the transmitted bitstream and reuses, to this end, the first possibility of defining the access unit as collecting all NAL units of one time instant: all NAL units of one time instant are collected within one access unit and the access units are still arranged in an un-interleaved manner within the transmitted bitstream. However, interleaving of the NAL units of one access unit is allowed so that NAL units of one layer are interspersed by NAL units of another layer. The runs of the NAL units belonging to one layer within one access unit, form decoding units. The interleaving is admitted to the extent that for each NAL unit within one access unit, the necessitated information for inter-layer prediction is contained in any of the preceding NAL units within that access unit. The encoder may signal within the bitstream whether or not interleaving has been applied and the decoder, in turn, may for example use a plurality of buffers in order to re-sort the interleaved NAL units of different layers of each access unit, or merely one buffer in case of no interleaving, depending on the signalization. No coding efficiency penalties result, with however the end-to-end delay being decreased.

A third aspect of the present application is concerned with the signalization of the layer index per bitstream packet such as per NAL unit. In accordance with the third aspect of the present application, the inventors realized that applications primarily fall into one of two types. Normal applications necessitate a moderate number of layers, and accordingly do not suffer from layer ID fields in each packet configured to completely cover the overall moderate number of layers. More complex applications, which in turn necessitate an excessive number of layers, only seldom occur. Accordingly, in accordance with the third aspect of the present application, a layer identification extension mechanism signaling in the multi-layered video signal is used so as to signal whether the layer identification syntax element within each packet completely, or merely partially, along with a layer-identification extension in the multi-layered data stream, determines the layer of the respective packet, or is replaced/overruled by the layer-identification extension completely. By this measure, the layer identification extension is necessitated, and consumes bitrate, in the seldom occurring applications only, while in most of the cases, an efficient signaling of the layer association is feasible.

A fourth aspect of the present application concerns the signaling of the inter-layer prediction dependency between the different levels of information amounts at which video material is coded into a multi-layered video data stream. In accordance with the fourth aspect, a first syntax structure defines the number of dependency dimensions as well as a maximum Ni of rank levels per dependency dimension i, and a bijective mapping, mapping each level onto a respective one of at least a subset of the available points within the dependency space, and per dependency dimension i a second syntax structure. The latter defines the dependencies among the layers. Each syntax structure describes the dependency among the Ni rank levels of the dependency dimensions i to which the respective second syntax structure belongs. Thus, the effort for defining the dependencies merely linearly increases with the number of dependency dimensions, whereas the restriction on the inter-dependencies between the individual layers imposed by this signalization is comparatively low.

Naturally, all of the above aspects may be combined in pairs, triplets, or all of them.

BRIEF DESCRIPTION OF THE DRAWINGS

Embodiments of the present invention will be detailed subsequently referring to the appended drawings, in which:

FIG. 12 shows a schematic diagram of a picture subdivided into code blocks and tiles respectively, with the tiles being composed of integer multiples of the code blocks and a decoding order defined among the code blocks following the picture's subdivision into tiles;

FIG. 13A shows a portion out of a modified VPS syntax as an example for exemplarily building the embodiment of FIGS. 8 to 11 into HEVC;

FIG. 13B shows a portion corresponding to the that of FIG. 13a with this portion belonging, however, to the SPS syntax;

FIG. 13C shows another exemplary portion out of a modified VPS syntax;

FIG. 13D shows an example of a modified VPS syntax for implementing the inter-view prediction change signalization;

FIG. 13E shows an even further example for a portion out of a modified VPS syntax for signaling the inter-view prediction change at spatial segment boundaries;

FIG. 13F shows an even further example for a portion out of a modified VPS syntax;

FIG. 13G shows a portion out of a modified VPS syntax as a further possibility of signaling the inter-view prediction change/restriction;

FIG. 14 shows an example for a portion of a modified VPS syntax of an even further embodiment for signaling inter-view prediction change/restriction;

FIG. 24 shows an example for a portion out of a modified VPS syntax for illustrating a possibility of signaling the decoding unit interleaving;

FIG. 25 shows a portion out of a NAL unit header, the portion exemplarily comprising a fixed-length layer identification syntax element;

FIG. 26 shows a portion out of a VPS syntax indicating a possibility of realizing the layer-identification extension mechanism signaling;

FIG. 27 shows a portion out of a VPS syntax for illustrating another possibility of realizing a layer-identification extension mechanism signaling;

FIG. 28 shows a portion out of a VPS syntax in order to illustrate an even further example of realizing a layer-identification extension mechanism signaling;

FIG. 29 shows a portion out of a slice segment header for illustrating a possibility of implementing a layer-identification extension in the data stream;

FIG. 30 shows a portion of a sliced segment header in order to illustrate a further possibility of implementing a layer-identification extension;

FIG. 31 shows a portion out of a VPS syntax for illustrating the realization of a layer-identification extension;

FIG. 32 shows a portion out of a data stream syntax for illustrating another possibility of realizing the layer-identification extension;

FIGS. 34A and 34B show a portion out of a VPS extension syntax for signaling within a data stream the framework for the layer extension mechanism;

FIG. 39 shows a portion out of a data stream syntax illustrating a way of signaling a part of a first syntax structure defining the dependency space.

FIG. 40 shows a portion out of a data stream for illustrating a possibility of signaling a part of the first syntax structure concerning the mapping between layers of the data stream and available points in dependency space;

DETAILED DESCRIPTION OF THE INVENTION

First, as an overview, an example for an encoder/decoder structure is presented which fits to any of the subsequently presented concepts.

Figure 1:
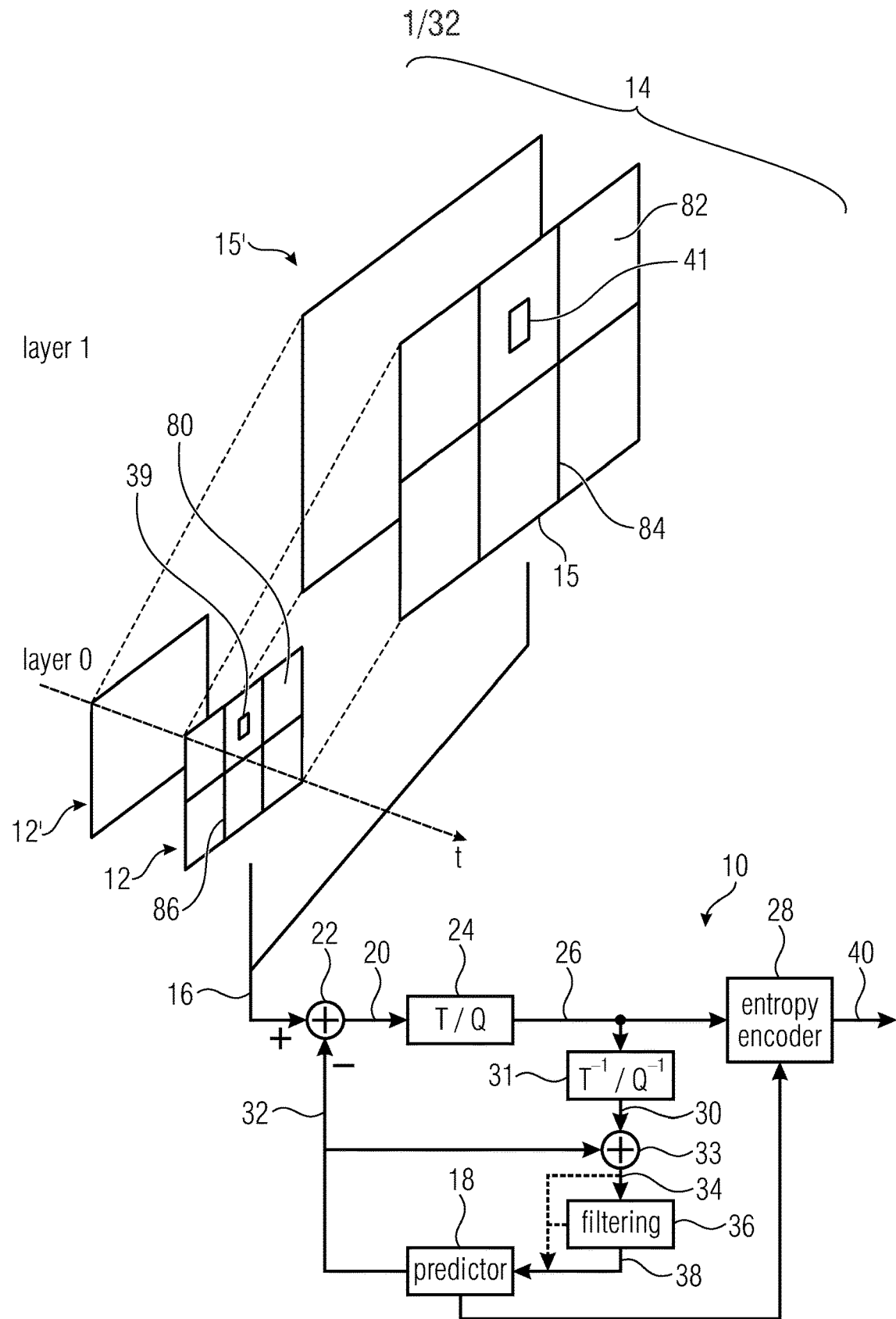
FIG. 1 shows a video encoder serving as an illustrative example for implementing any of the multi-layer encoders further outlined with respect to the following figures.

FIG. 1 shows a general structure of an encoder in accordance with an embodiment. The encoder 10 could be implemented to be able to operate in a multi-threaded way or not, i.e., merely single-threaded. That is, encoder 10 could, for example, be implemented using multiple CPU cores. In other words, the encoder 10 could support parallel processing but it does not have to. The bitstreams generated will also be generatable/decodable by single-threaded encoders/decoders. The coding concept of the present application enables, however, parallel processing encoders to efficiently apply parallel processing without, however, compromising the compression efficiency. With regard to the parallel processing ability, similar statements are valid for the decoder which is described later with respect to FIG. 2.

The encoder 10 is a video encoder but in general the encoder 10 may also be a picture encoder. A picture 12 of a video 14 is shown as entering encoder 10 at an input 16. Picture 12 shows a certain scene, i.e., picture content. However, encoder 10 receives at its input 16 also another picture 15 pertaining the same time instant with both pictures 12 and 15 belonging to different layers. Merely for illustration purposes, picture 12 is shown as belonging to layer zero whereas picture 15 is shown as belonging to layer 1. FIG. 1 illustrates that layer 1 may involve, with respect to layer zero, a higher spatial resolution, i.e., may show the same scene with a higher number of picture samples but this is merely for illustration purposes only and picture 15 of layer 1 may, alternatively, have the same spatial resolution but may differ, for example, in the view direction relative to layer zero, i.e., pictures 12 and 15 may have been captured from different viewpoints. It is noted that the terminology of base and enhancement layer used in this document may refer to any set of reference and depending layer in the hierarchy of layers.

The encoder 10 is a hybrid encoder, i.e., pictures 12 and 15 are predicted by a predictor 18 and the prediction residual 20 obtained by a residual determiner 22 is subject to a transform, such as a spectral decomposition such as a DCT, and a quantization in a transform/quantization module 24. A transformed and quantized prediction residual 26, thus obtained, is subject to entropy coding in an entropy coder 28, such as arithmetic coding or variable length coding using, for example, context-adaptivity. The reconstructible version of the residual is available for the decoder, i.e., the dequantized and retransformed residual signal 30 is recovered by a retransform/requantizing module 31 and recombined with a prediction signal 32 of predictor 18 by a combiner 33, thereby resulting in a reconstruction 34 of picture 12 and 15 respectively. However, encoder 10 operates on a block basis. Accordingly, reconstructed signal 34 suffers from discontinuities at block boundaries and, accordingly, a filter 36 may be applied to the reconstructed signal 34 in order to yield a reference picture 38 for pictures 12 and 15, respectively, on the basis of which predictor 18 predicts subsequently encoded pictures of the different layers. As shown by a dashed line in FIG. 1, predictor 18 may, however, also, such as in other prediction modes such as spatial prediction modes, exploit the reconstructed signal 34 directly without filter 36 or an intermediate version.

The predictor 18 may choose among different prediction modes in order to predict certain blocks of picture 12. One such block 39 of picture 12 is exemplarily shown in FIG. 1. There may be a temporal prediction mode according to which block 39 which is representative for any block of picture 12 into which picture 12 is partitioned, is predicted on the basis of a previously coded picture of the same layer such as picture 12'. A spatial prediction mode may also exist according to which a block 39 is predicted on the basis of a previously coded portion of the same picture 12, neighboring block 39. A block 41 of picture 15 is also illustratively shown in FIG. 1 so as to be representative for any of the other blocks into which picture 15 is partitioned. For block 41, predictor 18 may support the prediction modes just-discussed, i.e. temporal and spatial prediction modes. Additionally, predictor 18 may provide for an inter-layer prediction mode according to which block 41 is predicted on the basis of a corresponding portion of picture 12 of a lower layer. "Corresponding" in "corresponding portion" shall denote the spatial correspondence, i.e., a portion within picture 12 showing the same portion of the scene as bock 41 to be predicted in picture 15.

The predictions of predictor 18 may, naturally, not be restricted to picture samples. The prediction may apply to any coding parameter, too, i.e. prediction modes, motion vectors of the temporal prediction, disparity vectors of the multi-view prediction, etc. Merely the residuals may then be coded in bitstream 40. That is using spatial and/or inter-layer prediction, coding parameters could be predictively coded/decoded. Even here, disparity compensation could be used.

A certain syntax is used in order to compile the quantized residual data 26, i.e., transform coefficient levels and other residual data, as well as the coding parameters including, for example, prediction modes and prediction parameters for the individual blocks 39 and 41 of pictures 12 and 15 as determined by predictor 18 and the syntax elements of this syntax are subject to entropy coding by entropy coder 28. The thus obtained data stream 40 as output by entropy coder 28 forms the bitstream 40 output by encoder 10.

Figure 2:
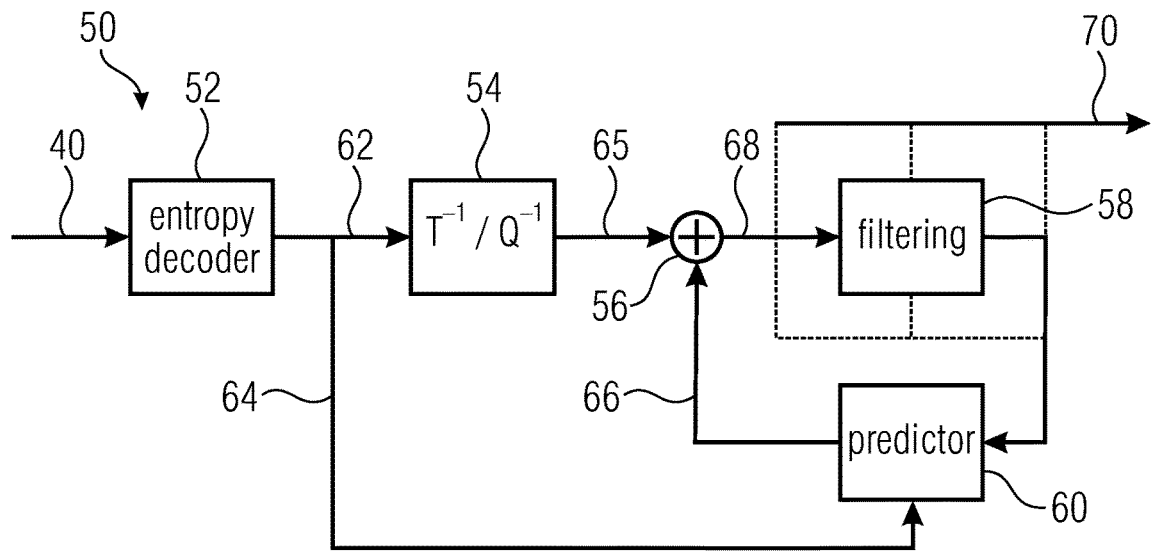
FIG. 2 shows a schematic block diagram showing a video decoder fitting to the video encoder of FIG. 1.

FIG. 2 shows a decoder which fits to the encoder FIG. 1, i.e., is able to decode the bitstream 40. The decoder of FIG. 2 is generally indicated by reference sign 50 and comprises an entropy decoder, a retransform/dequantizing module 54, a combiner 56, a filter 58 and a predictor 60. The entropy decoder 42 receives the bitstream and performs entropy decoding in order to recover the residual data 62 and the coding parameters 64. The retransform/dequantizing module 54 dequantizes and retransforms the residual data 62 and forwards the residual signal thus obtained to combiner 56. Combiner 56 also receives a prediction signal 66 from predictor 60 which, in turn, forms the prediction signal 66 using the coding parameter 64 on the basis of the reconstructed signal 68 determined by combiner 56 by combining the prediction signal 66 and the residual signal 65. The prediction mirrors the prediction finally chosen be predictor 18, i.e. the same prediction modes are available and these modes are selected for the individual blocks of pictures 12 and 15 and steered according to the prediction parameters. As already explained above with respect to FIG. 1, the predictor 60 may use the filtered version of the reconstructed signal 68 or some intermediate version thereof, alternatively or additionally. The pictures of the different layers to be finally reproduced and output at output 70 of decoder 50 may likewise be determined on an unfiltered version of the combination signal 68 or some filtered version thereof.

In accordance with the tile concept, the pictures 12 and 15 are subdivided into tiles 80 and 82, respectively, and at least the predictions of blocks 39 and 41 within these tiles 80 and 82, respectively, are restricted to use, as a basis for spatial prediction, merely data relating to the same tile of the same picture 12, 15, respectively. This means, the spatial prediction of block 39 is restricted to use previously coded portions of the same tile, but the temporal prediction mode is unrestricted to rely on information of a previously coded picture such as picture 12'. Similarly, the spatial prediction mode of block 41 is restricted to use previously coded data of the same tile only, but the temporal and inter-layer prediction modes are unrestricted. The subdivision of pictures 15 and 12 into six tiles, respectively, has merely been chosen for illustration purposes. The subdivision into tiles may be selected and signaled within bitstream 40 individually for pictures 12', 12 and 15, 15', respectively. The number of tiles per picture 12 and 15, respectively, may be any of one, two, three, four, six and so forth, wherein tile partitioning may be restricted to regular partitioning into rows and columns of tiles only. For the sake of completeness, it is noted that the way of coding the tiles separately may not be restricted to the intra-prediction or spatial prediction but may also encompass any prediction of coding parameters across tile boundaries and the context selection in the entropy coding. That is that latter may also be restricted to be dependent only on data of the same tile. Thus, the decoder is able to perform the just-mentioned operations in parallel, namely in units of tiles.

Figure 3:
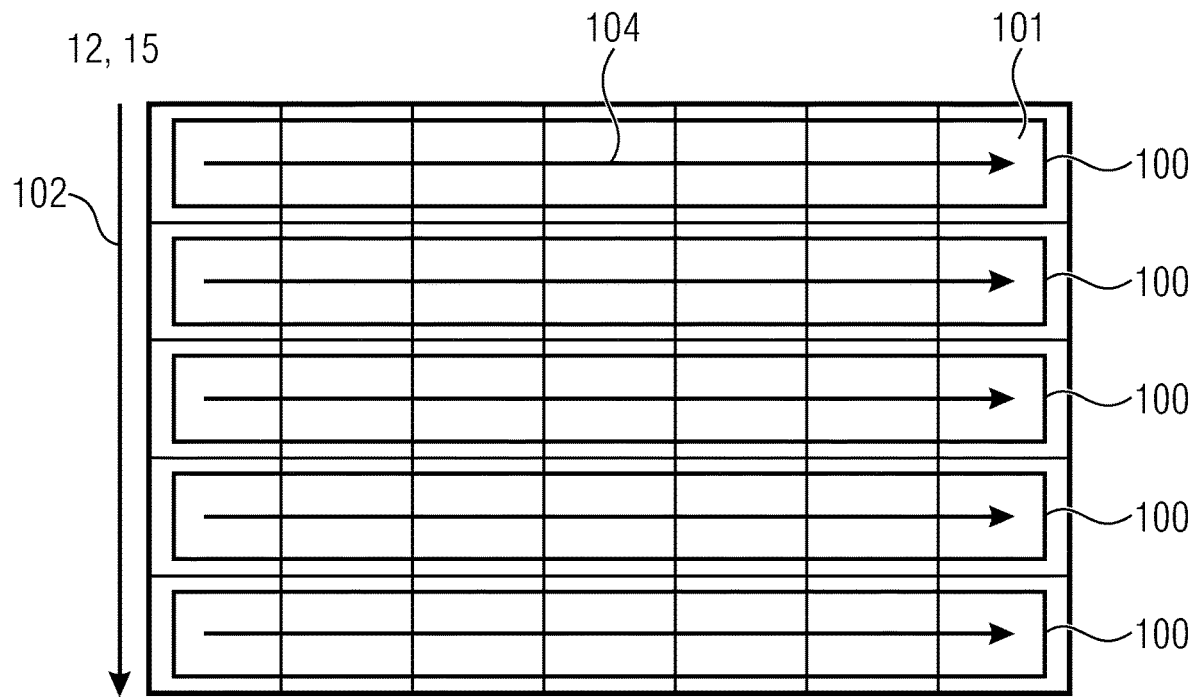
FIG. 3 shows a schematic diagram of a picture subdivided into substreams for WPP processing.

The encoder and decoders of FIGS. 1 and 2 could alternatively or additionally be able to use the WPP concept. See FIG. 3. WPP substreams 100 also represent a spatial partitioning of a picture 12, 15 into WPP substreams. In contrast to tiles and slices, WPP substreams do not impose restrictions onto predictions and context selections across WPP substreams 100. WPP substreams 100 extend row-wise such as across rows of LCUs (Largest Coding Unit) 101, i.e. the greatest possible blocks for which prediction coding modes are individually transmittable in the bitstream, and in order to enable parallel processing, merely one compromise is made in relation to entropy coding. In particular, an order 102 is defined among the WPP substreams 100, which exemplarily leads from top to bottom, and for each WPP substream 100, except for the first WPP substream in order 102, the probability estimates for the symbol alphabet, i.e. the entropy probabilities, are not completely reset but adopted from or set to be equal to the probabilities resulting after having entropy coded/decoded the immediately preceding WPP substream up to the second LCU, thereof, as indicated by lines 104, with the LCU order, or the substreams' decoder order, starting, for each WPP substream at the same side of the picture 12 and 15, respectively, such as the left-hand side as indicated by arrow 106 and leading, in LCU row direction, to the other side. Accordingly, by obeying some coding delay between the sequence of WPP substreams of the same picture 12 and 15, respectively, these WPP substreams 100 are decodable/codable in parallel, so that the portions at which the respective picture 12, 15 is coded/decoded in parallel, i.e. concurrently, forms a kind of wavefront 108 which moves across the picture in a tilted manner from left to right.

It is briefly noted that orders 102 and 104 also define a raster scan order among the LCUs leading from the top left LCU 101 to the bottom right LCU row by row from top to bottom. WPP substreams may correspond to one LCU row each. Briefly referring back to tiles, the latter may also restricted to be aligned to LCU borders. Substreams may be fragmented into one or more slices without being bound to LCU borders as far as the borders between two slices in the inner of a substream is concerned. The entropy probabilities are, however, adopted in that case when transitioning from one slice of a substream to the next of the substream. In case of tiles, whole tiles may be summarized into one slice or one tile may be fragmented into one or more slices with again not being bound to LCU borders as far as the borders between two slices in the inner of a tile is concerned. In case of tiles, the order among the LCUs is changed so as to traverse the tiles in tile order in raster scan order first before proceeding to the next tile in tile order.

As described until now, picture 12 may be partitioned into tiles or WPP substreams, and likewise, picture 15 may be partitioned into tiles or WPP substreams, too. Theoretically, WPP substream partitioning/concept may be chosen for one of pictures 12 and 15 while tile partitioning/concept is chosen for the other of the two. Alternatively, a restriction could be imposed onto the bitstream according to which the concept type, i.e. tiles or WPP substreams, has to be the same among the layers. Another example for a spatial segment encompasses slices. Slices are used to segment the bitstream 40 for transmission purposes. Slices are packed into NAL units which are the smallest entities for transmission. Each slice is independently codable/decodable. That is, any prediction across slice boundaries is prohibited, just as context selections or the like is. These are, altogether, three examples for spatial segments: slices, tiles and WPP substreams. Additionally all three parallelization concepts, tiles, WPP substreams and slices, can be used in combination, i.e. picture 12 or picture 15 can be split into tiles, where each tile is split into multiple WPP substreams. Also slices can be used to partition the bitstream into multiple NAL units for instance (but not restricted to) at tile or WPP boundaries. If a picture 12, 15 is partitioned using tiles or WPP substreams and, additionally, using slices, and slice partitioning deviates from the other WPP/tile partitioning, then spatial segment shall be defined as the smallest independently decodable section of the picture 12,15. Alternatively a restriction may be imposed on the bitstream which combination of concepts may be used within a picture (12 or 15) and/or if borders have to be aligned between the different used concepts.

Various prediction modes supported by encoder and decoder as well as restrictions imposed onto prediction modes as well as context derivation for entropy coding/decoding in order to enable the parallel processing concepts, such as the tile and/or WPP concept, have been described above. It has also been mentioned above that encoder and decoder may operate on a block basis. For example, the above explained prediction modes are selected on a block basis, i.e. at a granularity finer than the pictures themselves. Before proceeding with describing aspects of the present application, a relation between slices, tiles, WPP substreams and the just mentioned blocks in accordance with an embodiment shall be explained.

Figure 4:
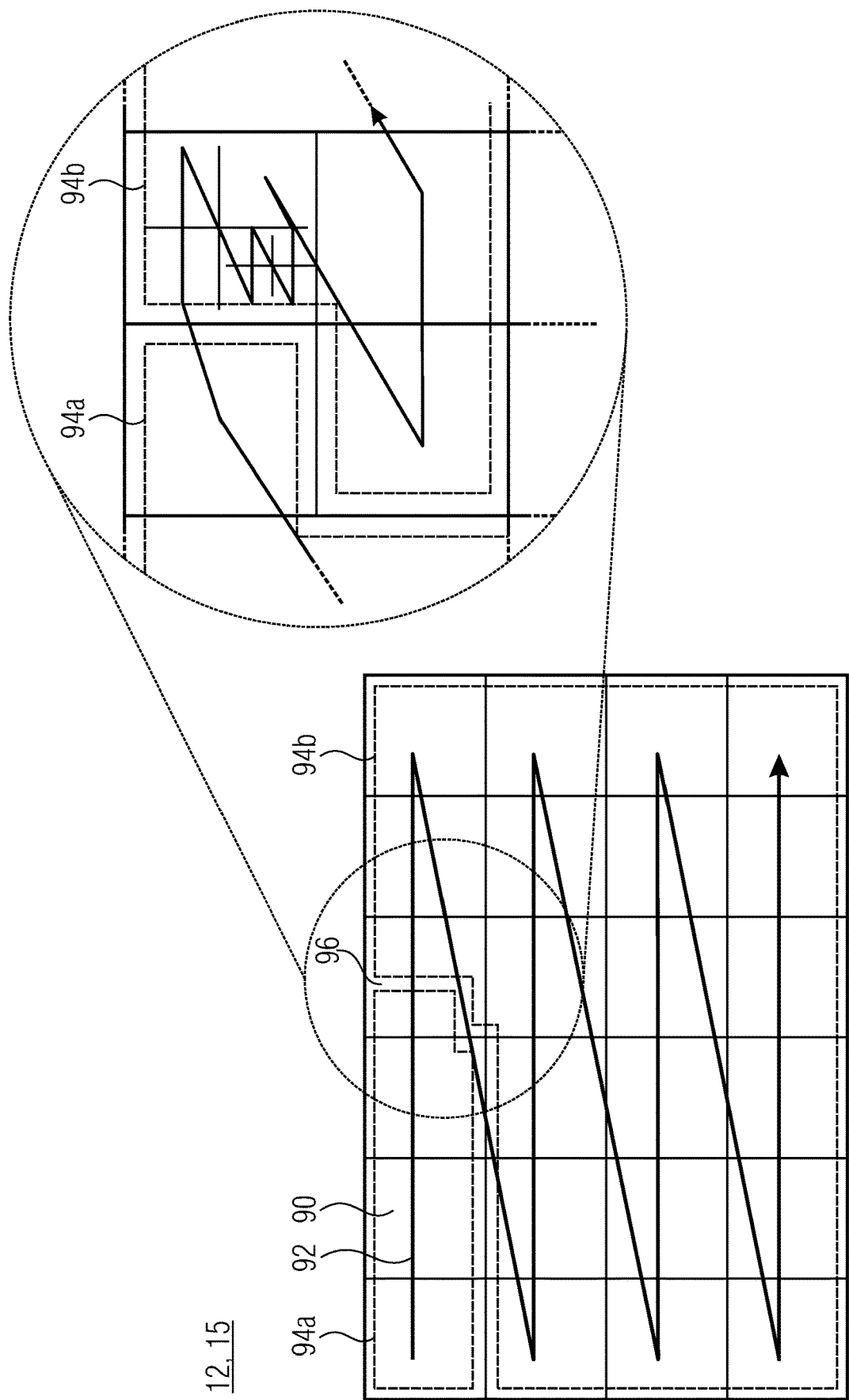
FIG. 4 shows a schematic diagram illustrating a picture of any layer, subdivided into blocks with indicating a further subdivision of the picture into spatial segments.

FIG. 4 shows a picture which may be a picture of layer 0, such as layer 12 or a picture of layer 1 such as picture 15. The picture is regularly subdivided into an array of blocks 90. Sometimes, these blocks 90 are called largest coding blocks (LCB), largest coding units (LCU), coding tree blocks (CTB) or the like. The subdivision of the picture into blocks 90 may form a kind of base or coarsest granularity at which the above described predictions and residual codings are performed and this coarsest granularity, i.e. the size of blocks 90, may be signaled and set by the encoder, individually for layer 0 and layer 1. For example, a multi-tree such as a quad-tree subdivision may be used and signaled within the data stream so as to subdivide each block 90 into prediction blocks, residual blocks and/or coding blocks, respectively. In particular, coding blocks may be the leaf blocks of a recursive multi-tree subdivisioning of blocks 90 and some prediction related decisions may be signaled at the granularity of coding blocks, such as prediction modes, and the prediction blocks at the granularity of which the prediction parameters such as motion vectors in case of temporal inter prediction and disparity vectors in case of inter layer prediction for example, is coded and residual blocks at the granularity of which the prediction residual is coded, may be the leaf blocks of separate recursive multi-tree subdivisionings of the code blocks.

A raster scan coding/decoding order 92 may be defined among blocks 90. The coding/decoding order 92 restricts the availability of neighboring portions for the purpose of spatial prediction: merely portions of the picture which according to the coding/decoding order 92 precede the current portion such as block 90 or some smaller block thereof, to which a currently to be predicted syntax element relates, are available for spatial prediction within the current picture. Within each layer, the coding/decoding order 92 traverses all blocks 90 of the picture so as to then proceed with traversing blocks of a next picture of the respective layer in a picture coding/decoding order which not necessarily follows the temporal reproduction order of the pictures. Within the individual blocks 90, the coding/decoding order 92 is refined into a scan among the smaller blocks, such as the coding blocks.

In relation to the just outlined blocks 90 and the smaller blocks, each picture is further subdivided into one or more slices along the just mentioned coding/decoding order 92. Slices 94a and 94b exemplarily shown in FIG. 4 accordingly cover the respective picture gaplessly. The border or interface 96 between consecutive slices 94a and 94b of one picture may or may not be aligned with borders of neighboring blocks 90. To be more precise, and illustrated at the right hand side of FIG. 4, consecutive slices 94a and 94b within one picture may border each other at borders of smaller blocks such as coding blocks, i.e. leaf blocks of a subdivision of one of blocks 90.

Slices 94a and 94b of a picture may form the smallest units in which the portion of the data stream into which the picture is coded may be packetized into packets, i.e. NAL units. A further possible property of slices, namely the restriction onto slices with regards to, for example, prediction and entropy context determination across slice boundaries, was described above. Slices with such restrictions may be called "normal" slices. As outlined in more detail below, besides normal slices "dependent slices" may exist as well.

Figure 5:
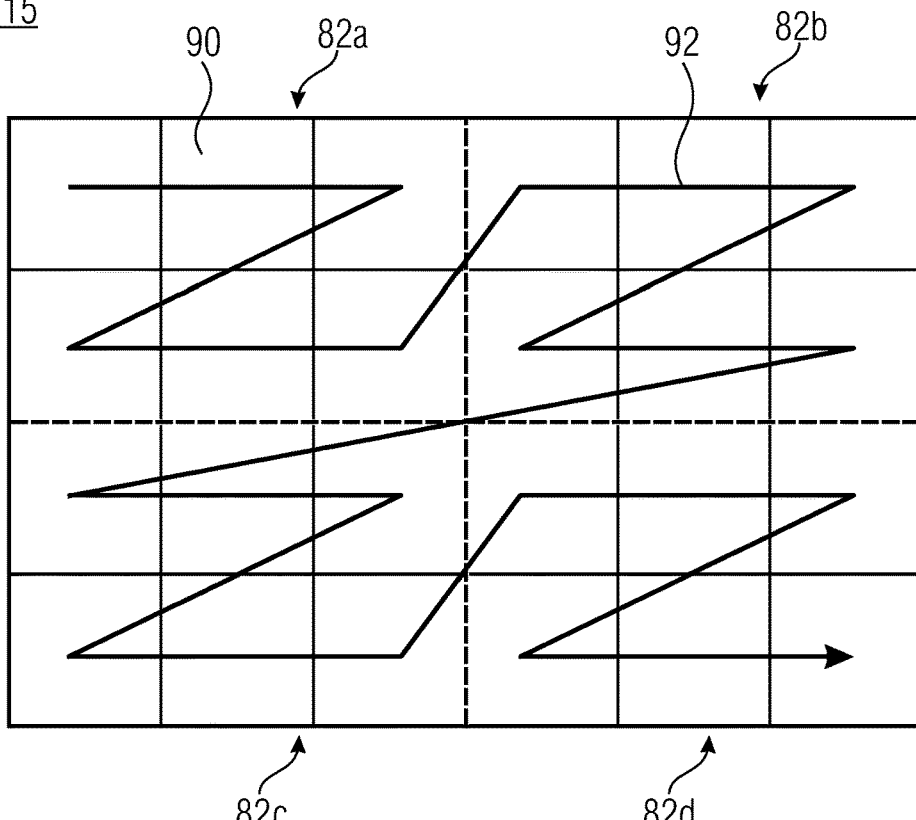
FIG. 5 shows a schematic diagram of a picture of any layer, subdivided into blocks and tiles.

The coding/decoding order 92 defined among the array of blocks 90 may change if the tile partitioning concept is used for the picture. This is shown in FIG. 5 where the picture is exemplarily shown to the partitioned into four tiles 82a to 82d. As illustrated in FIG. 5, tiles are themselves defined as a regular subdivision of a picture in units of blocks 90. That is, each tile 82a to 82d is composed of an array of n×m blocks 90 with n being set individually for each row of tiles and m being individually set for each column of tiles. Following the coding/decoding order 92, blocks 90 in a first tile are scanned in raster scan order first before proceeding to the next tile 82b and so forth, wherein the tiles 82a to 82d are themselves scanned in a raster scan order.

Figure 6:
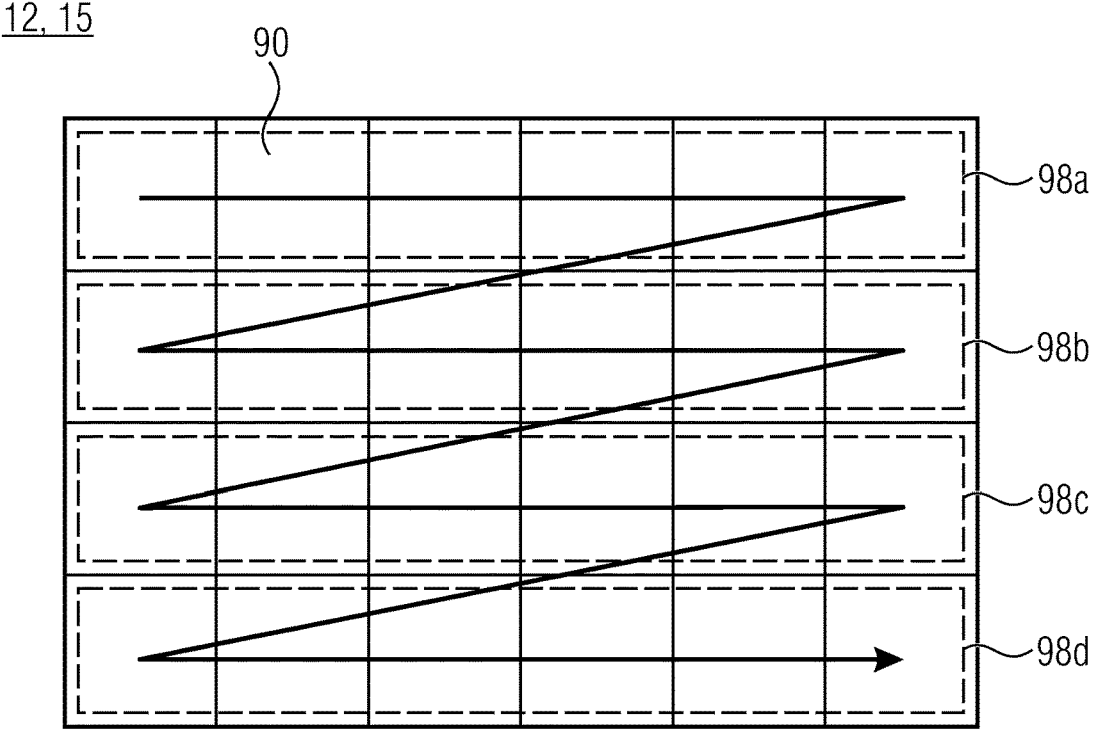
FIG. 6 shows a schematic diagram of a picture subdivided into blocks and substreams.

In accordance with a WPP stream partitioning concept, a picture is, along the coding/decoding order 92, subdivided in units of one or more rows of block 90 into WPP substreams 98a to 98d. Each WPP substream may, for example, cover one complete row of blocks 90 as illustrated in FIG. 6.

The tile concept and the WPP substream concept may, however, also be mixed. In that case, each WPP substream covers, for example one row of blocks 90 within each tile.

Even the slice partitioning of a picture may be co-used with the tile partitioning and/or WPP substream partitioning. In relation to tiles, each of the one or more slices the picture is subdivided into may either be exactly composed of one complete tile or more than one complete tile, or a subportion of merely one tile along the coding/decoding order 92. Slices may also be used in order to form the WPP substreams 98a to 98d. To this end, slices forming the smallest units for packetization may comprise normal slices on the one hand and dependent slices on the other hand: while normal slices impose the above-described restrictions onto prediction and entropy context derivation, dependent slices do not impose such restrictions. Dependent slices which start at the border of the picture from which the coding/decoding order 92 substantially points away rowwise, adopt the entropy context as resulting from entropy decoding block 90 in the immediately preceding row of blocks 90, and dependent slices starting somewhere else may adopt the entropy coding context as resulting from entropy coding/decoding the immediately preceding slice up to its end. By this measure, each WPP substream 98a to 98d may be composed of one or more dependent slices.

That is, the coding/decoding order 92 defined among blocks 90 linearly leads from a first side of the respective picture, here exemplarily the left side, to the opposite side, exemplarily the right side, and then steps to the next row of blocks 90 in downward/bottom direction. Available, i.e. already coded/decoded portions of the current picture, accordingly lie primarily to the left and to the top of the currently coded/decoded portion, such as the current block 90. Due to the disruption of predictions and entropy context derivations across tile boundaries, the tiles of one picture may be processed in parallel. Coding/decoding of tiles of one picture may even be commenced concurrently. Restrictions stem from the in-loop filtering mentioned above in case where same is allowed to cross tile boundaries. Commencing the coding/decoding of WPP substreams, in turn, is performed in a staggered manner from top to bottom. The intra-picture delay between consecutive WPP substreams is, measured in blocks 90, two blocks 90.

However, it would be favorable to even parallelize the coding/decoding of pictures 12 and 15, i.e. the time instant of different layers. Obviously, coding/decoding the picture 15 of the dependent layer has to be delayed relative to the coding/decoding of the base layer so as to guarantee that there are "spatially corresponding" portions of the base layer already available. These thoughts are valid even in case of not using any parallelization of coding/decoding within any of pictures 12 and 15 individually. Even in case of using one slice in order to cover the whole picture 12 and 15, respectively, with using no tile and no WPP substream processing, coding/decoding of pictures 12 and 15 may be parallelized. The signaling described next, i.e. aspect six, is a possibility to express such decoding/coding delay between layers even in such a case where, or irrespective of whether, tile or WPP processing is used for any of the pictures of the layers.

Before discussing the above presented concepts of the present application, again referring to FIGS. 1 and 2, it should be noted that the block structure of the encoder and decoder in FIGS. 1 and 2 is merely for illustration purposes and the structure may also be different.

With respect to the above description relating to the minimum coding delay between the coding of consecutive layers it should be noted that the decoder would be able to determine the minimum decoding delay based on short-term syntax elements. However, in case of using long-term syntax elements so as to signal this inter-layer temporal delay in advance for a predetermined time period, the decoder may plan into the future using the guarantee provided and may more easily perform the workload allocation within the parallel decoding of the bitstream 40.

A first aspect is concerned with restricting inter-layer prediction among views, especially, for example, disparity-compensated inter-view prediction, in favour of a lower overall coding/decoding delay or parallelization capabilities. Details are readily available from the following figures. For a brief explanation see the FIG. 7.

Figure 7:
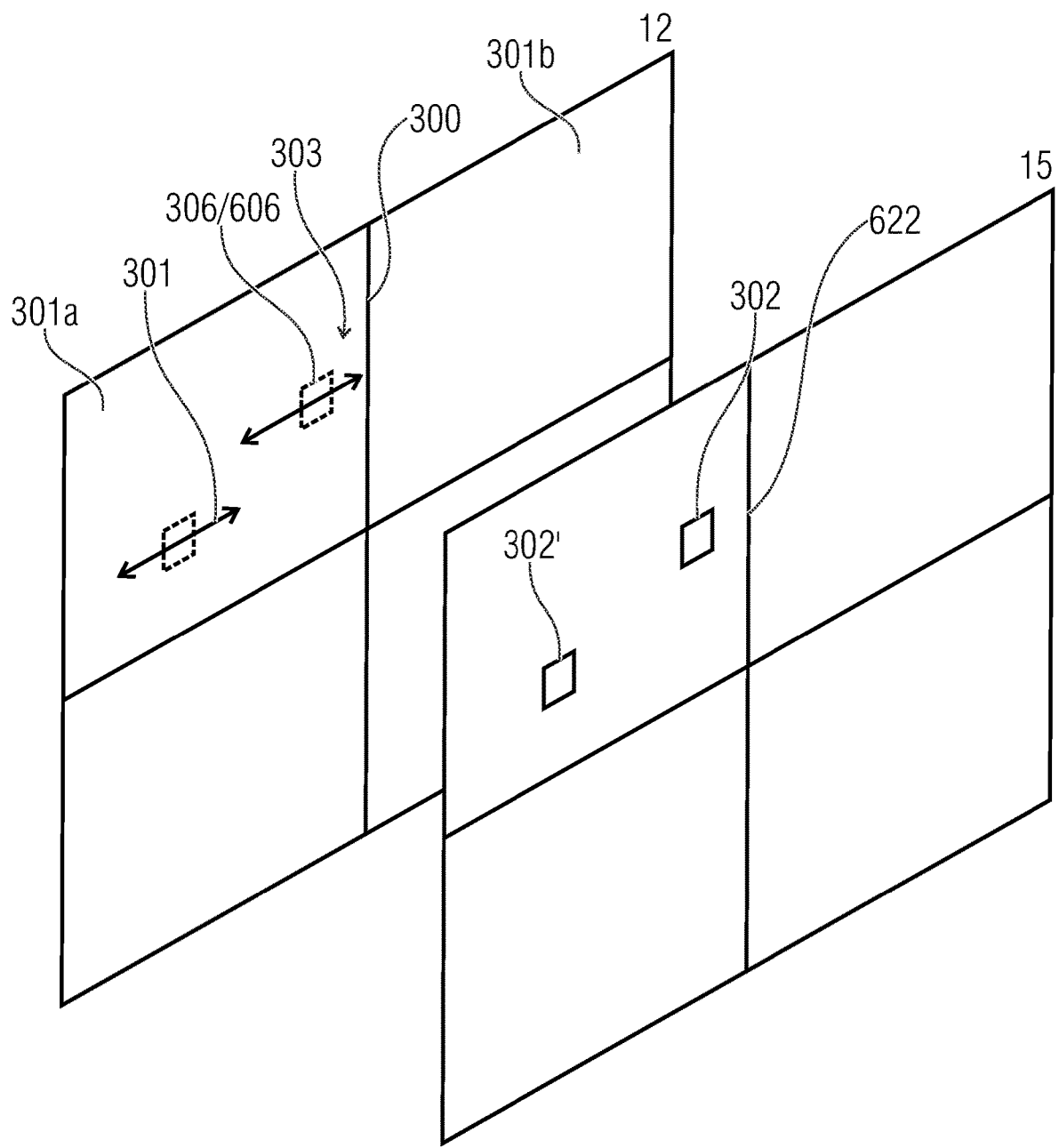
FIG. 7 shows a schematic of pictures of base and dependent views with the dependent view picture arranged in front of the base view picture, both registered to each other in order to illustrate the restriction of the domain of possible values of disparity vectors of base view blocks near to spatial segment boundaries relative to base view blocks positioned farther away from spatial segment boundaries, in accordance with an embodiment.

The encoder could for example, restrict an available domain 301 of disparity vector for a current block 302 of a dependent view to be interlayer-predicted at boundaries 300 of base layer segments. 303 indicates the restriction. For comparison, FIG. 7 shows another block 302' of the dependent view, the available domain of disparity vectors of which is not restricted. The encoder could signal this behavior, i.e. the restriction 303, in the data stream to enable the decoder to take advantage thereof in low delay sense. That is, the decoder may operate just as normal as far as interlayer prediction is concerned with the encoder, however, guaranteeing that no portion of "a non-available segment" is needed, i.e. the decoder may keep the inter layer delay lower. Alternatively, the encoder and decoder both change their mode of operation as far as the interlayer prediction at boundaries 300 is concerned so as to, additionally, for example, take advantage of the lower manifold of available states of interlayer prediction parameters at boundaries 300.

Figure 8:
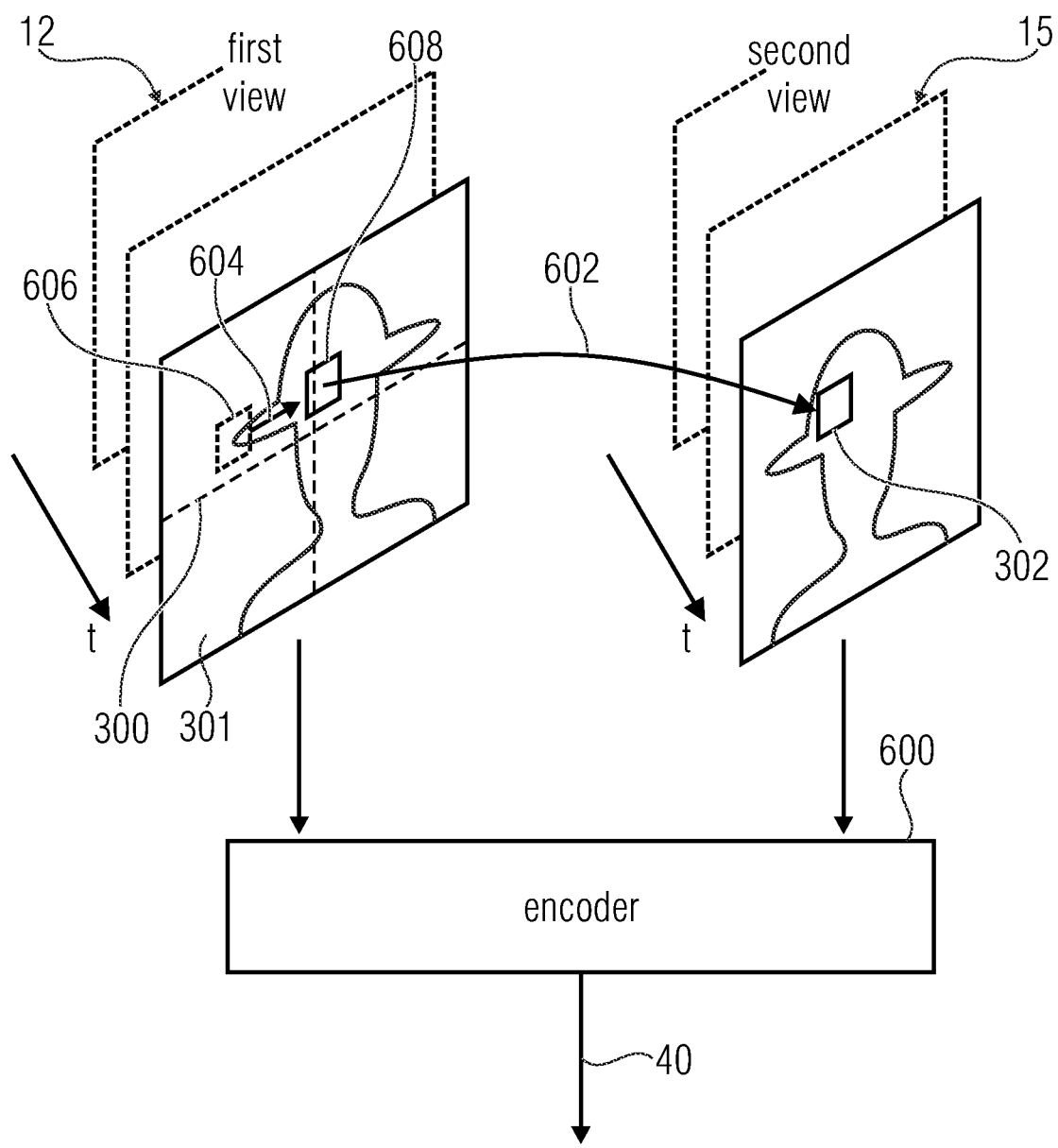
FIG. 8 shows a schematic block diagram of an encoder which supports inter-view prediction restrictions and spatial segment boundaries in accordance with an embodiment.

FIG. 8 shows a multi-view encoder 600 which is configured to encode a plurality of views 12 and 15 into a data stream 40 using inter-view prediction. In the case of FIG. 8, the number of views is exemplarily chosen to be two, with the inter-view prediction leading from the first view 12 to the second view 15 as being illustrated using an arrow 602. An extension towards more than two views is readily imaginable. The same applies to the embodiments described hereinafter. The multi-view encoder 600 is configured to change the inter-view prediction at spatial segment boundaries 300 of spatial segments 301 into which the first view is partitioned.

As far as possible implementation details concerning the encoder 600 are concerned, reference is made to the description brought forward above with respect to FIG. 1, for example. That is, the encoder 600 may be a picture or video encoder and may operate in a block-wise manner. In particular, the encoder 600 may be of a hybrid encoding type, configured to subject the first view 12 and the second view 15 to predictive coding, insert the prediction parameters into data stream 40, transform code the prediction residual by use of a spectral decomposition into the data stream 40, and at least as far as the second view 15 is concerned, switch between different prediction types including, at least, spatial and inter-view prediction 602. As mentioned previously, the units at which encoder 600 switches between the different prediction types/modes may be called coding blocks, the size of which may vary as these coding blocks may represent, for example, leaf blocks of an hierarchical multi-tree subdivisioning of the second view's 15 picture or tree root blocks into which the second view's 15 picture may regularly be pre-partitioned. Inter-view prediction may result in predicting the samples within a respective coding block using a disparity vector 604 indicating the displacement to be applied to the spatially co-located portion 606 of the first view's 12 picture, spatially co-located to the inter-view predicted block 302 of the second view's 15 picture, so as to access the portion 608 from which the samples within block 302 are predicted by copying the reconstructed version of portion 608 into block 302. Inter-view prediction 602 is, however, not restricted to that type of inter-view prediction of sample values of second view 15. Rather, additionally or alternatively, inter-view prediction as supported by encoder 600 may be used to predictively code prediction parameters themselves: imagine that encoder 600 supports, in addition to the inter-view prediction mode just outlined, spatial and/or temporal prediction. Spatially predicting a certain coding block ends up in prediction parameters to be inserted for that coding block into data stream 40, just as temporal prediction does. Instead of independently coding all of these prediction parameters of coding blocks of the second view's 15 picture into data stream 40, however, independent from prediction parameters having been used for coding the first view's picture into data stream 40, encoder 600 may use predictive coding with predicting prediction parameters used for predictively coding coding blocks of the second view 15 on the basis of prediction parameters or other information available from a portion of the data stream 40 into which the first view 12 has been encoded by encoder 600. That is, a prediction parameter of a certain coding block 302 of the second view 15 such as a motion vector or the like, may be predicted on the basis of, for example, the motion vector of a corresponding, also temporally-predicted coding block of the first view 12. The "correspondence" may take the disparity between views 12 and 15 into account. For example, first and second views 12 and 15 each may have a depth map associated therewith and encoder 600 may be configured to encode the texture samples of views 12 and 15 into data stream 40 along with associated depth values of the depth maps, and the encoder 600 may use a depth estimation of coding block 302 so as to determine the "corresponding coding block" within the first view 12, the scene content of which fits better to the scene content of the current coding block 302 of the second view 15. Naturally, such depth estimation may also be determined by encoder 600 on the basis of used disparity vectors of nearby inter-view predicted coding blocks of view 15, irrespective of any depth map being coded or not.

As already stated, the encoder 600 of FIG. 8 is configured to change the inter-view prediction at spatial segment boundaries 300. That is, the encoder 600 changes the way of inter-view prediction at these spatial segment boundaries 300. The reason and the aim thereof is outlined further below. In particular, the encoder 600 changes the way of inter-view prediction in such a manner that each entity of the second view 15 predicted, such as the texture sample content of an inter-view predicted coding block 300 or a certain prediction parameter of such a coding block, shall depend, by way of the inter-view prediction 602, merely on exactly one spatial segment 301 of the first view 12. The advantage thereof may be readily understood by looking at the consequence of the change of inter-view prediction for a certain coding block, the sample values or prediction parameter of which is inter-view predicted. Without change or restriction of inter-view prediction 602, encoding this coding block has to be deferred until having finalized the encoding of the two or more spatial segments 301 of the first view 12 participating in the inter-view prediction 602. Accordingly, the encoder 600 has to obey this inter-view encoding delay/offset in any case, and the encoder 600 is not able to further reduce an encoding delay by encoding views 12 and 15 in a time-overlapping manner. Things are different when the inter-view prediction 602 is changed/modified at the spatial segment boundaries 301 in the just-outlined manner, because in that case, the very coding block 302 in question, some entity of which is inter-view predicted, may be subject to encoding as soon as the one (merely one) spatial segment 301 of the first view 12 has been completely encoded. Thereby, the possible encoding delay is reduced.

Figure 9:
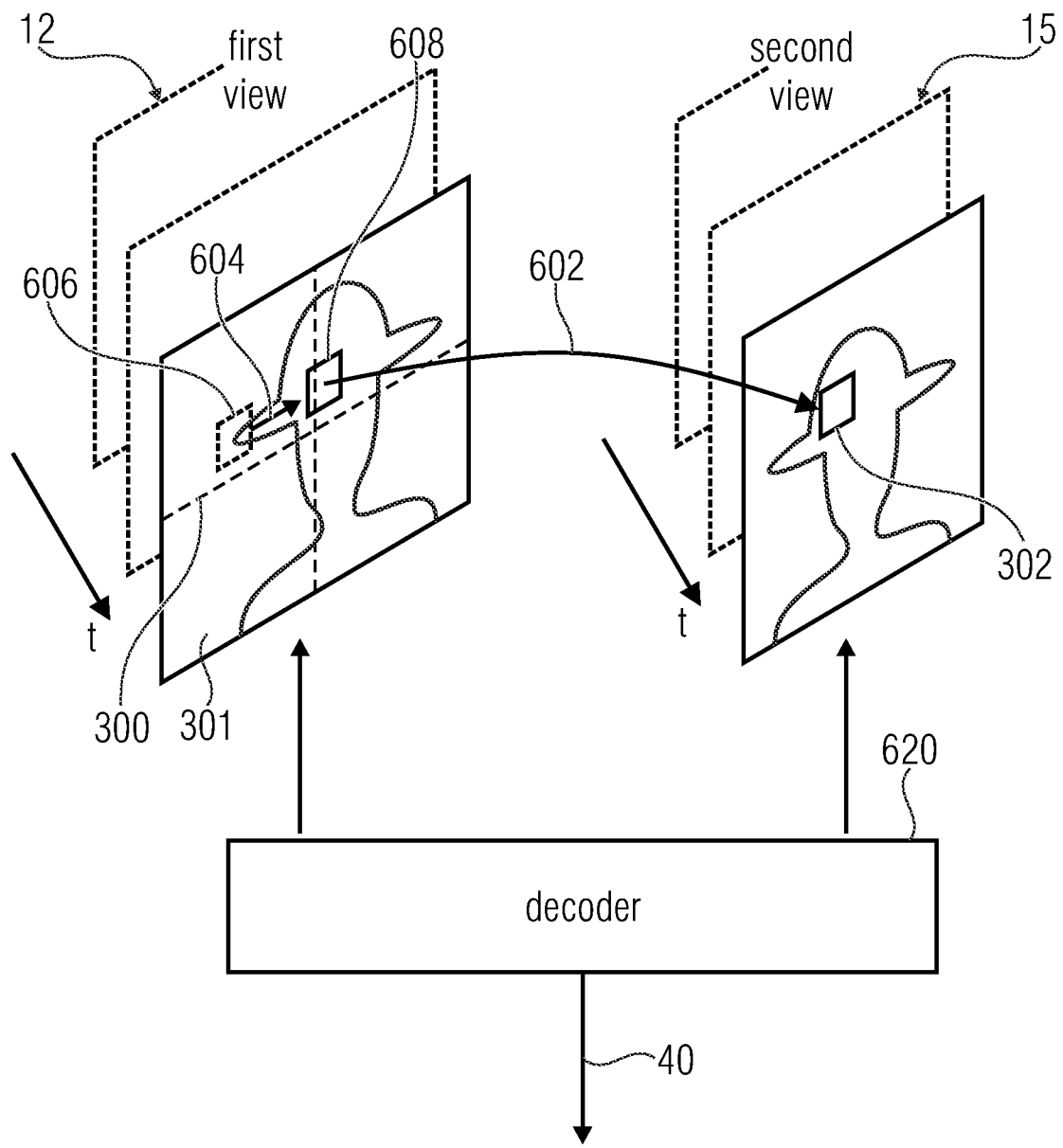
FIG. 9 shows a schematic block diagram of a decoder fitting to the encoder of FIG. 8.

Accordingly, FIG. 9 shows a multi-view decoder 620 fitting to the multi-view encoder of FIG. 8. The multi-view decoder of FIG. 9 is configured to reconstruct the plurality of views 12 and 15 from the data stream 40 using the inter-view prediction 602 from the first view 12 to the second view 15. As described above, decoder 620 may redo the inter-view prediction 602 in the same manner as supposed to be done by multi-view encoder 600 of FIG. 8 by reading from the data stream 40, and applying, prediction parameters contained in the data stream such as prediction modes indicated for the respective coding blocks of the second view 15, some of which are inter-view predicted coding blocks. As already described above, inter-view prediction 602 may alternatively or additionally relate to the prediction of prediction parameters themselves, wherein the data stream 40 may comprise for such inter-view predicted prediction parameters a prediction residual or an index pointing into a list of predictors, one of which is inter-view predicted according to 602.

As already described with respect to FIG. 8, the encoder may change the way of inter-view prediction at boundaries 300 so as to avoid the inter-view prediction 602 combining information from two segments 301. The encoder 600 may achieve this in a manner transparent for decoder 620. That is, the encoder 600 may simply impose a self-restriction with respect to its selection out of the possible coding parameter settings so that, with the decoder 620 simply applying the thus set coding parameters conveyed within data stream 40, the combination of information of two distinct segments 301 in inter-view prediction 602 is avoided inherently.

That is, as long as decoder 620 is not interested in, or is not able to, apply parallel processing to the decoding of data stream 40, with decoding views 12 and 15 in parallel, decoder 620 may simply disregard the encoder's 600 signalization inserted into data stream 40, signaling the just-described change in inter-view prediction. To be more precise, in accordance with one embodiment of the present application, the encoder of FIG. 8 signals within the data stream the change in inter-view prediction at segment boundaries 300 within the data stream 40, i.e. whether there is any change or there is no change at the boundaries 300. If signaled to be applied, the decoder 620 may takes the change in inter-view prediction 602 at boundaries 300 as a guarantee that the inter-view prediction 602 is restricted at the spatial segment boundaries 300 of the spatial segments 301 such that the inter-view prediction 602 does not involve any dependency of any portion 302 of the second view 15 on a spatial segment other than the spatial segment which a co-located portion 306 of the first view 12, co-located to the respective portion 302 of the second view is located in. That is, if the change in inter-view prediction 602 at boundaries 300 is signaled to be applied, decoder 620 may take this as a guarantee that: for any block 302 of the dependent view 15 for which inter-view prediction 602 is used for predicting its samples or any of its prediction parameters, this inter-view prediction 602 does not introduce any dependency on any "neighboring spatial segment". This means the following: for each portion/block 302, there is a co-located portion 606 of the first view 12 which is co-located with the respective block 302 of the second view 15. "Co-location" is meant to denote, for example, a block within view 12 the circumference exactly locally co-indices with block's 302 circumference. Alternatively, "co-location" is not measured at sample accuracy, but at a granularity of blocks into which the layer's 12 picture is partitioned so that determining the "co-located" block results in a selection of that block out of a partitioning of layer's 12 picture into blocks, namely, for example, selecting that one which incorporates a position co-located to the upper-left corner of block 302 or another representative position of block 302. The "co-located portion/block" is denoted 606. Remember, that due to the different view directions of views 12 and 15, the co-located portion 606 may not comprise the same scene content as portion 302. Nevertheless, in case of the inter-view prediction change signalization, the decoder 620 assumes that any portion/block 302 of the second view 15, being subject to inter-view prediction 602, depends, by the inter-view prediction 602, merely on that spatial segment 301 within which the co-located portion/block 606 is located in. That is, when looking at the first and second views' 12 and 15 pictures registered to each other one on the other, then inter-view prediction 602 does not cross the segment boundaries 300 of first view 12 but remains within those segments 301 within which the respective blocks/portions 302 of the second view 15 are located in. For example, the multi-view encoder 600 has appropriately restricted the signaled/selected disparity vectors 604 of inter-view predicted portions/blocks 302 of the second view 15, and/or has appropriately coded/selected indices into predictor lists so as not to index predictors involving inter-view prediction 602 from information of "neighboring spatial segments 301".

Before proceeding with the description of various possible specifics with respect to the encoder and decoder of FIGS. 8 and 9, which represent various embodiments which may or may not be combined with each other, the following is noted. It became clear from the description of FIGS. 8 and 9 that there are different ways the encoder 600 may realize its "change/restriction" of inter-view prediction 602. In a more relaxed restriction, the encoder 600 restricts the inter-view prediction 602 merely in a manner so that the inter-view prediction 602 does not combine information of two or more spatial segments. The description of FIG. 9 features a more strict restriction example according to which inter-view prediction 602 is even restricted so as to not cross spatial segments 302: that is, any portion/block 302 of the second view 15, being subject to inter-view prediction 602, obtains its inter-view predictor via the inter-view prediction 602 from information of that spatial segment 301 of the first view 12 exclusively which its "co-located block/portion 606" is located in. The encoder would act accordingly. The latter restriction type represents an alternative to the description of FIG. 8 and is even more strict than the one described previously. In accordance with both alternatives, the decoder 602 may take advantage of the restriction. For example, the decoder 620 may, if signaled to be applied, take advantage of the restriction of the inter-view prediction 602 by reducing/decreasing an inter-view decoding offset/delay in decoding the second view 15 relative to the first view 12. Alternatively or additionally, the decoder 602 may take the guarantee signaling into account when deciding on performing a trial of decoding views 12 and 15 in parallel: if the guarantee is signaled to apply, the decoder may be opportunistically try to perform inter-view parallel processing and otherwise refrain from that trial. For example, in the example shown in FIG. 9, where the first view 12 is regularly partitioned into four spatial segments 301 each representing a quarter of the first view's 12 picture, decoder 620 may commence decoding the second view 15 as soon as the first spatial segment 301 of the first view 12 has completely been decoded. Otherwise, assuming disparity vectors 604 to be of horizontal nature only, decoder 620 would have to at least await the complete decoding of both upper spatial segments 301 of first view 12. The more strict change/restriction of the inter-view prediction along segment boundaries 300 renders the exploitation of the guarantee more easy.

The just described guarantee signalization may have a scope/validity which encompasses, for example, merely one picture or even a sequence of pictures. Accordingly, as described hereinafter it may be signaled in a video parameter set or a sequence parameter set or even a picture parameter set.

Up to now, embodiments have been presented with respect to FIGS. 8 and 9, according to which, except for the guarantee signalization, the data stream 40 and the way of encoding/decoding same by encoder and decoder of FIGS. 8 and 9, does not change depending on the change in inter-view prediction 602. Rather, the way of decoding/encoding the data stream remains the same irrespective of the self-restriction in the inter-view prediction 602 applying or not. In accordance with an alternative embodiment, however, encoder and decoder even change their way of encoding/decoding data stream 40 so as to take advantage of the guarantee case, i.e. the restriction of inter-view prediction 602 at spatial segment boundaries 300. For example, the domain of possible disparity vectors signalizable in the data stream 40 may be restricted for inter-view predicted blocks/portions 302 of the second view 15 near a co-location of a spatial segment boundary 300 of first view 12. For example, see FIG. 7 again. As already described above, FIG. 7 shows two exemplary blocks 302' and 302 of the second view 15, one of which, namely block 302, is near to the co-located position of the spatial segment boundaries 300 of first view 12. The co-located position of spatial segment boundaries 300 of first 12, when transferring same into the second view 15, is shown at 622. As shown in FIG. 7, the co-located block 306 of block 302 is near to spatial segment boundary 300, vertically separating a spatial segment 301a comprising the co-located block 606, and the horizontally neighboring spatial segment 301b to such an extent that too large disparity vectors shifting the co-located block/portion 606 to the right, i.e. towards the neighboring spatial segment 301b, would result in inter-view predictive block 302 to be copied, at least partially, from samples of this neighboring spatial segment 301b, in which case the inter-view prediction 602 would cross the spatial segment boundary 300. Accordingly, in the "guarantee case", the encoder 600 may not choose such disparity vectors for block 302 and accordingly the codable domain of possible disparity vectors for block 302 may be restricted. For example, when using Huffman coding, the Huffman code used to code the disparity vector for inter-view predicted block 302 may be changed so as to take advantage of the circumstance of its restricted domain of possible disparity vectors. In the case of using arithmetic coding, for example, another binarization in combination with a binary arithmetic scheme may be used for coding the disparity vector, or another probability distribution among the possible disparity vectors may be used. In accordance with this embodiment, the minor coding efficiency reduction resulting from the inter-view prediction restriction at spatial segment boundaries 300 may be partially compensated by reducing the amount of side information to be conveyed within the data stream 40 with respect to the transmission of the disparity vectors for spatial segments 302 near the co-located position of the spatial segment boundaries 300.

Thus, in accordance with the just described embodiment, both multi-view encoders and multi-view decoders change their way of decoding/encoding disparity vectors from the data stream, depending on the guarantee case applying or not. For example, both change the Huffman code used to decode/encode disparity vectors, or change the binarization and/or probability distribution used for arithmetically decode/encode disparity vectors.

Figure 10:
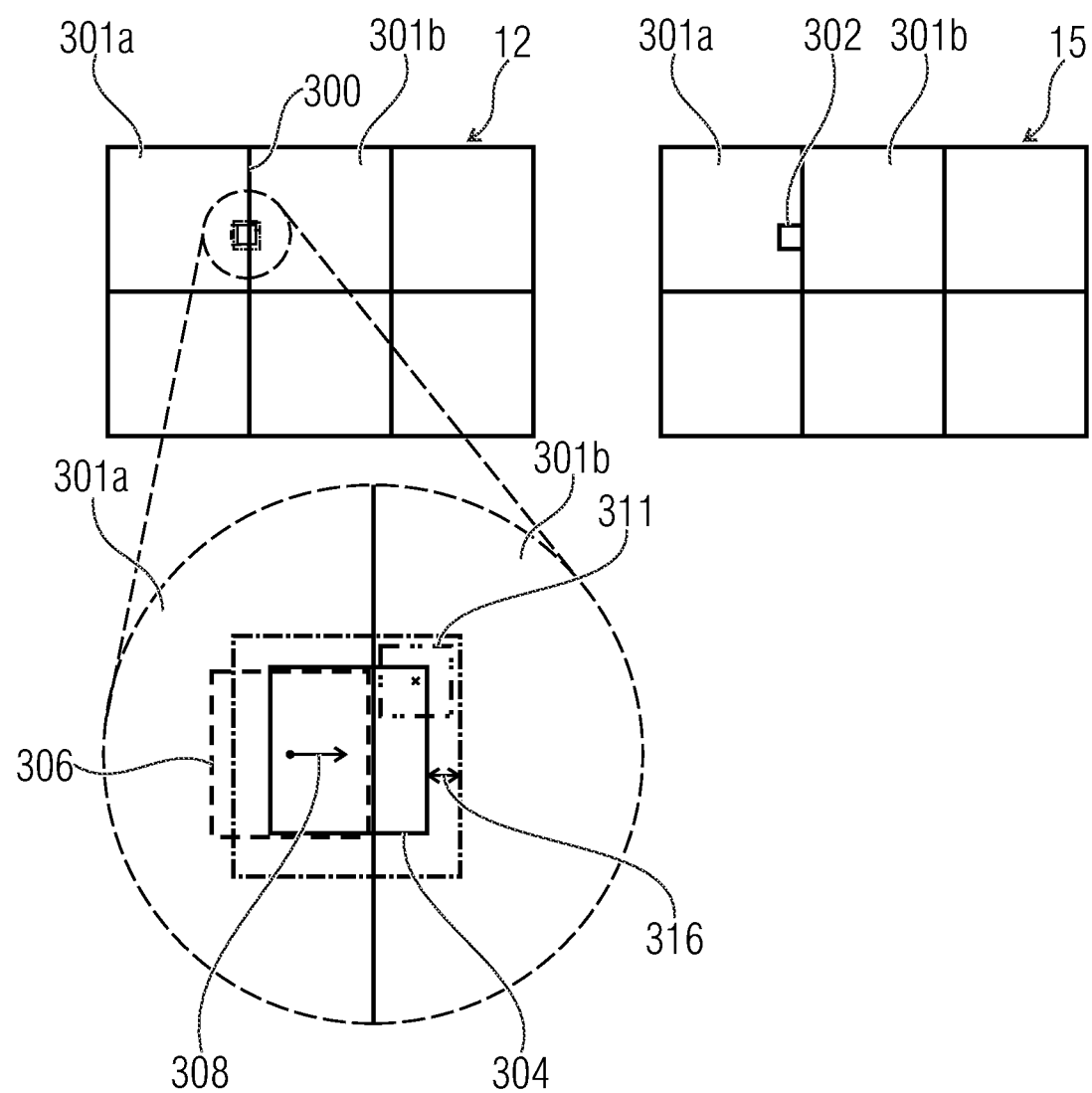
FIG. 10 shows a schematic diagram illustrating the inter-view prediction using disparity vectors in order to illustrate aspects in determining the restriction of the domain of possible values of disparity vectors and/or possible modifications of the inter-view prediction process of inter-view predicted dependent view blocks.

In order to more clearly describe, with respect to a specific example, the way the encoder and decoder in FIGS. 8 and 9 restrict the domain of possible disparity vectors signalizable in the data stream 40, reference is made to FIG. 10. FIG. 10 again shows the usual behavior of encoder and decoder for an inter-view predicted block 302: a disparity vector 308 out of a domain of possible disparity vectors is determined for a current block 302. Block 302 is thus a disparity-compensated predicted prediction block. The first view 12 is then sampled at a reference portion 304, which is displaced from the co-located portion 306 of the first view 12, co-located to the current block 302, by the determined disparity vector 308. The restriction of the domain of possible disparity vectors signalizable in the data stream is done as follows: the restriction is made such that the reference portion 304 completely lies within the spatial segment 301a, which the co-located portion 306 is spatially located in. The disparity vector 308 illustrated in FIG. 10, for example, does not fulfill this restriction. It lies, consequently, external to the domain of possible disparity vectors for block 302 and is, in accordance with one embodiment, not signalizable in the data stream 40 as far as block 302 is concerned. In accordance with alternative embodiments, however, disparity vector 308 would be signalizable in the data stream but the encoder 600 avoids, in the guarantee case, the appliance of this disparity vector 308 and chooses, for example, to apply another prediction mode for block 302 such as, for example, a spatial prediction mode.

FIG. 10 also illustrates that in order to perform the restriction of the domain of disparity vectors, an interpolation filter kernel half-width 10 may be taken into account. To be more precise, in copying the sample content of a disparity-compensated predicted block 302 from the first view's 12 picture, each sample of block 302 may, in case of a sub-pel disparity vector, be obtained from the first view 12 by applying interpolation using an interpolation filter having a certain interpolation filter kernel size. For example, the sample value illustrated using an "x" in FIG. 10 may be obtained by combining samples within the filter kernel 311 at the center of which sample position "x" is located, and accordingly the domain of possible disparity vectors for block 302 may, in that case, be restricted even such that for none of the samples within the reference portion 304, the filter kernel 311 overlays the neighboring spatial segment 301b, but remains within the current spatial segment 301a. The signalizable domain may or may not restricted accordingly. In accordance with an alternative embodiment, samples of filter kernel 311 positioned within the neighboring spatial segment 301b may simply be filled otherwise in accordance with some exceptional rule so as to avoid the additional restriction of the domain of possible disparity vectors for sub-pel disparity vectors. The decoder would enable the replacement filling, however, merely in the case of the guarantee being signaled to apply.

The latter example made it clear that the decoder 620 may or may not and, in addition to or alternatively to, the change in entropy decoding the date stream, change the way of performing the inter-view prediction at the spatial segment boundaries 300 responsive to the signaling and the data stream as inserted into the data stream by encoder 600. For example, as just described, both encoder and decoder could fill the interpolation filter kernel at portions extending beyond a spatial segment boundary 300 differently depending on the guarantee case applying or not. The same could apply to the reference portion 306 itself: same could be allowed to extend at least partially into the neighboring spatial segment 301b with the respective portion being filled substitutionally using information independent from any information external to the current spatial segment 301a. In effect, encoder and decoder could, in the guarantee case, treat spatial segments 300 like picture boundaries with portions of reference portion 304 and/or interpolation filter kernel 311 being filled by extrapolation from the current spatial segment 301a.

Figure 11:
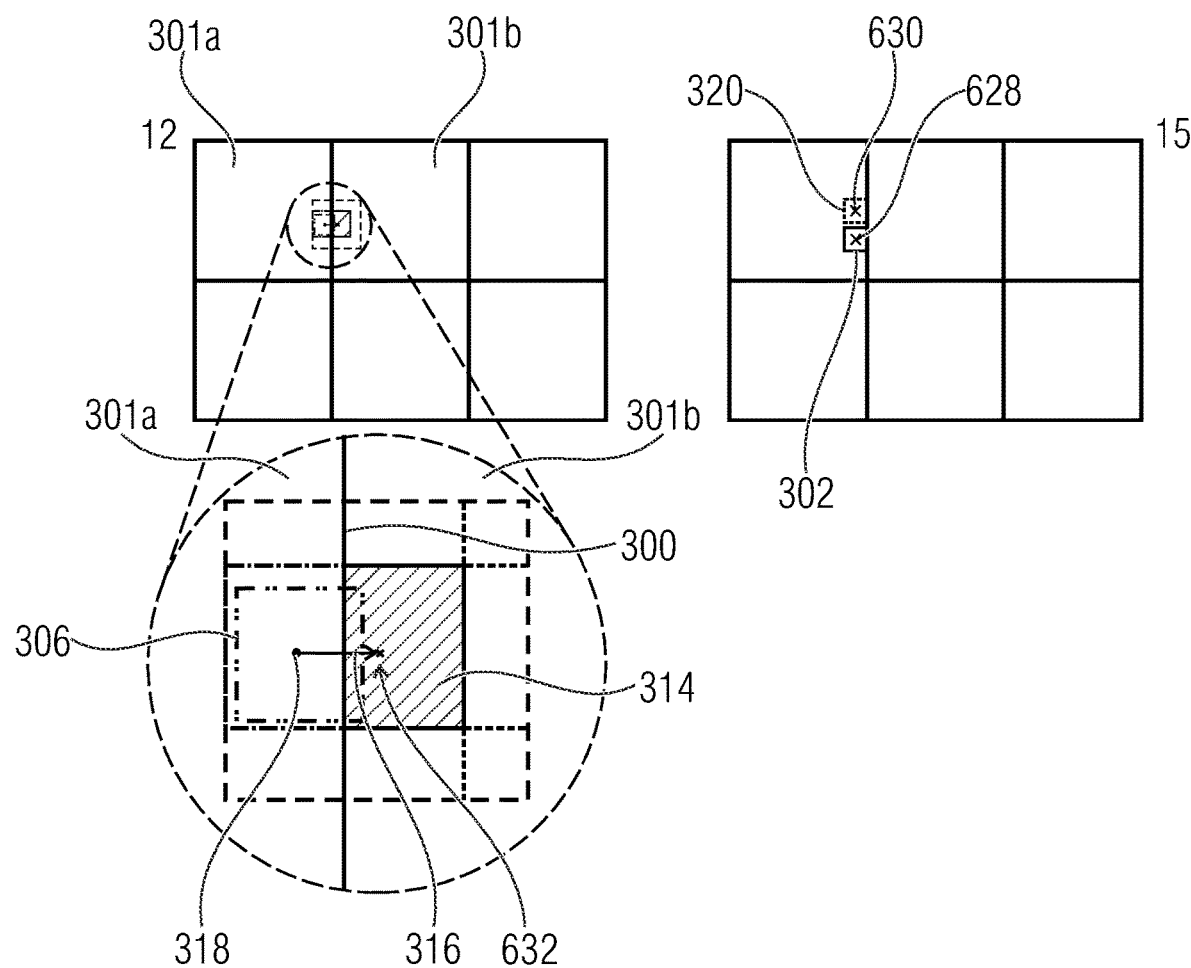
FIG. 11 shows a schematic diagram illustrating the inter-view prediction for predicting parameters of the dependent view in order to illustrate in applying the inter-view prediction.

As also described above, inter-view prediction 602 is not restricted to the prediction of the sample-wise content of an inter-view predicted block 302. Rather, inter-view prediction may also apply to the prediction of prediction parameters such as, for example, motion parameters involved with the prediction of temporally predicted blocks 302 of view 15, or the prediction of spatial prediction parameters involved in the prediction of spatially predicted blocks 302. In order to illustrate possible changes, restrictions imposed onto such inter-view prediction 602 at boundaries 300, reference is made to FIG. 11. FIG. 11 shows a block 302 of dependent view 15, a parameter of which shall be predicted, at least inter alias, using inter-view prediction. For example, a list of several predictors of the parameter of block 302 may be determined by inter-view prediction 602. To this end, encoder and decoder act, for example, as follows: a reference portion of the first view 12 is elected for current block 302. The selection or derivation of the reference portion/ block 314 is performed out of blocks such as coding blocks, prediction blocks or the like, into which the first layer's 12 picture is partitioned. For its derivation, a representative position 318 within the first view 12 may be determined to be co-located to a representative position 628 of block 302, or a representative position 630 of a neighbor block 320 neighboring block 302. For example, the neighbor block 320 may be the block to the top of block 302. The determination of the block 320 may involve selecting block 320 out of blocks into which the second view layer's 15 picture is partitioned as the one which comprises the sample immediately to the top of the upper left corner sample of block 302. The representative position 628 and 630 may be the sample at the upper left corner or the sample in the middle of the block or the like. The reference position 318 in the first view 12 is then the position co-located to 628 or 630. FIG. 11 illustrates the co-location to position 628. Then, the encoder/decoder estimates a disparity vector 316. This may be done, for example, on the basis of an estimated depth map of the current scene or using disparity vectors already decoded and being in the spatio-temporal neighborhood of block 302 or block 320, respectively. The disparity vector 316, thus determined, is applied to the representative position 318, so that the head of vector 316 points to a location 632. Among a partitioning of the first view's 12 picture into blocks, the reference portion 314 is selected to be that portion which comprises location 632. As just mentioned, the partitioning out of which the selection of portion/block 314 is made, may be a partitioning of coding blocks, prediction blocks, residual blocks and/or transform blocks of view 12.

In accordance with one embodiment, merely the multi-view encoder checks whether the reference portion 314 lies within the neighboring spatial segment 301b, i.e. the spatial segment not comprising the co-located block within which the co-location of reference point 628 lies. If the encoder signals the above-outlined guarantee to the decoder, the encoder 600 suppresses any appliance to a parameter of the current block 302. That is, a list of predictors for the parameter of block 302 may comprise the inter-view predictor leading to a crossing of boundary 300, but the encoder 600 avoids choosing that predictor and selects an index for block 302, which does not point to the un-wanted predictor. If both multi-view encoder and decoder check, in a guarantee case, whether the reference portion 314 lies within the neighboring spatial segment 301b, both encoder and encoder may substitute the "boundary crossing" inter-view predictor with another predictor or simply exclude same from the list of predictors which may, for example, also include spatially and/or temporally predicted parameters and/or one or more default predictors. The check of the condition, i.e. whether reference portion 314 is or is not part of spatial segment 301a, and the conditional substitution or exclusion is merely done in the guarantee case. In the non-guarantee case, any check whether or not reference portion 314 is within spatial segment 301a, may be left off and the application of a predictor derived from an attribute of reference portion 314 to the prediction of the parameter of block 302 may be done irrespective of whether reference portion 314 is within spatial segment 301a or 301b or wherever. In the case of not adding any predictor derived from an attribute of block 314 to a list of predictors for current block 302, or the addition of a substitute predictor, depending on reference block 314 lying within or outside spatial segment 301a, the respective modification of the usual inter-view prediction is performed by the encoder as well as the decoder 620. By this measure, any predictor index into the thus determined list of predictors for block 302 points to the same list of predictors within the decoder. The signallizable domain of the index for block 302 may or may not be restricted responsive to the guarantee case applying or not. In the case of the guarantee case applying, but merely the encoder performing the check, the multi-view encoder forms the list of predictors for block 302 irrespective of reference portion 314 lying within spatial segment 301a (and even irrespective of the guarantee case applying or not) with, however, in the guarantee case restricting the index so as to not select the predictor out of the list of predictors in case same has been derived from an attribute of a block 314 which lies outside spatial segment 301a. In that case, the decoder 620 may form the list of predictors for block 302 in the same manner, i.e. in the same manner in case of the guarantee case and the non-guarantee case, as the encoder 600 has already taken care that the inter-view prediction does not need any information from the neighboring spatial segment 301b.

As to the parameter of block 302 and the attribute of reference portion 314, it is noted that same may be a motion vector, a disparity vector, a residual signal such as transform coefficients, and/or a depth value.

The inter-view prediction change concept described with respect to FIGS. 8 to 11 could be introduced into the currently envisaged extension of the HEVC standard, namely in the manner described below. Insofar, the description brought forward immediately in the following shall also be interpreted as a basis for possible implementation details concerning the description brought forward above with respect to FIGS. 8 to 11.

As an intermediary note, it is noted that the spatial segments 301 discussed above as forming the units at the boundaries of which the inter-view prediction is changed/restricted do not necessarily form such spatial segments in units of which intra-layer parallel processing is alleviated or enabled. In other words, although the above discussed spatial segments of FIGS. 8 to 11 may be tiles into which the base layer 12 is partitioned, other examples are feasible as well, such as an example where the spatial segments 301 form coding tree root blocks CTBs of the base layer 12. In the embodiment described below, the spatial segments 301 are coupled to the definition of tiles, i.e. spatial segments are tiles or groups of tiles.

In accordance with the subsequently explained restrictions for ultra-low delay and parallelization in HEVC, inter-layer prediction is constrained in a way that ensures the partitioning of the base layer picture, especially tiles.

HEVC allows dividing the CTBs of a coded base layer picture via a grid of vertical and horizontal boundaries into rectangular regions that are referred to as tiles and can be processed independently except for in-loop filtering. The in-loop filters can be turned off at tile boundaries to make them completely independent.

Parsing and prediction dependencies are broken at tile boundaries much like on picture boundaries, whereas in-loop filters can cross tile boundaries if configured accordingly in order to reduce tile boundary artifacts. Therefore, processing of individual tiles does not rely on other tiles within a picture completely or to a vast extent depending of the filtering configuration. A restriction is installed in that all CTBs of a tile should belong to the same slice or all CTBs of a slice should belong to the same tile. As can be seen in FIG. 1, tiles force the CTB scan order to regard the order of tiles, i.e. going through all CTBs belonging to the first, e.g. upper-left tile, before continuing with the CTBs that belong to the second tile, e.g. upper-right. Tile structure is defined through number and size of the CTBs in each tile row and column that constitute a grid within a picture. This structure can either be changing on a per frame basis or stay constant throughout a coded video sequence.

FIG. 12 shows an exemplary division of CTBs within a picture into nine tiles. The thick black lines represent tile boundaries and the numbering represents the scanning order of CTBs, also revealing a tile order.

An enhancement layer tile of an HEVC extension can be decoded as soon as all tiles are decoded that cover that corresponding image area in the base layer bitstream.

The following section describes constrains, signaling and encoding/decoding process modifications that allow lower inter-layer coding offset/delay using the concept of FIGS. 7 to 11.

A modified decoding process related to tile boundaries in HEVC could look like the following:
a) Motion or Disparity Vectors should not Cross Tiles in the Base Layer.

If the constraint is enabled, the following shall apply:

If inter-layer prediction (as e.g. prediction of sample values, motion vectors, residual data or other data) uses a base view (layer 12) as reference picture, the disparity or motion vectors shall be constrained, so that the referenced picture area belongs to the same tile as the collocated base layer CTU. In a specific embodiment, the motion or disparity vectors 308 are clipped in the decoding process, so that the referenced picture area is located inside the same tile and the referenced sub-pel positions are predicted only from information inside the same tile. More specifically in the current HEVC sample interpolation process this would constrain motion vectors that point to sub-pel positions to be clipped 3 to 4 pels away from the tile boundary 300 or in the inter-view motion vector, inter-view residual prediction process this would constrain disparity vectors to point to a positions within the same tile. An alternative embodiment adjusts the sub-pel interpolation filter to handle tile boundaries similar to picture boundaries in order to allow motion vectors that point to sub-pel positions that are located closer than then the kernel size 310 of the sub-pel interpolation filter to the tile boundary. An alternative embodiment implies a bitstream constraint, that disallows the use of motions or disparity vectors that would have been clipped in the previously described embodiment.
b) Neighboring Blocks of a Collocated Block in the Base Layer Shall not be Utilized when in a Different Tile If the constraint is enabled, the following shall apply:

If the base layer is used for prediction from neighboring block (as e.g. TMVP or neighboring block disparity derivation) and tiles are used the following applies: predictor candidates that originate from a different CTU B than the collocated CTU A in the base layer shall only be used, if the CTU B belongs to the same tile as the collocated base layer CTU A. For example in the current HEVC derivation process, a CTU B can be located at the right of the collocated CTU A. In a specific embodiment of the invention, the prediction candidate is replaced with a different prediction. For instance, the collocated PU can be used for prediction instead. In another embodiment of the invention the use of the related prediction mode is disallowed in the coded bitstream.

Transferring the just outlined HEVC modification possibilities onto the description of FIGS. 8 and 11, it is noted that as far as the predictor substitute of FIG. 11 is concerned, same may be chosen to be a respective attribute of that block of the first layer 12, which comprises the co-located position of reference position 628 of the current block 302, itself.

c) Signaling

In specific embodiments, the following high level syntax can be used the VPS or SPS to enable the above described constraints/restrictions using N flags, for instance as shown in FIGS. 13a, b.

Here PREDTYPE, RESTYPE, SCAL in inter_layer_PREDTYPE_RESTYPE_SCAL_flag_1 to inter_layer_PREDTYPE_RESTYPE_SCAL_flag_N might be replaced by different values as described in the following:

a PREDTYPE indicates the prediction type for that the constraint/restriction applies, and might be one of the following or another prediction type not listed:
  e.g. temporal_motion_vector_prediction, for prediction of temporal motion vectors from neighboring blocks of the collocated block in the base view
  e.g. disparity_vector_prediction, for prediction of disparity vectors from neighboring blocks of the collocated block in the base view
  e.g. depth_map_derivation, for prediction of depth values from a base view
  e.g inter_view_motion_predition, for prediction of motion vectors from a base view
  e.g inter_view_residual_prediction, for prediction of residual data from a base view
  e.g. inter_view_sample_prediction, for prediction of sample values from a base view Alternatively it is not explicitly signaled for with prediction types the restriction/constraint applies, and the restriction/constraint applies for all prediction types or the restriction/constraint is signaled for sets of prediction types utilizing only one flag per set.

RESTYPE indicates the type of the restriction and might be one of the following:
  e.g constraint (indicates a bitstream constraint, and the flag may be contained in an VUI)
  e.g. restriction (indicates a clipping (a) or choice of a different predictor (b))

SCAL indicates whether the restriction/constraint applies for layers of the same type only:
  e.g. same_scal (indicates that the restriction only applies, when the base layer is of the same scalbility type as the enhancement layer)
  e.g. diff_scal, (indicates that the restriction applies, regardless of the scalability types of the base and the enhancement layers)

In an alternative embodiment, which FIG. 14 relates to, the usage of the all described restrictions can be signaled as an ultra-low delay mode in high level syntax, e.g. as ultra_low_delay_decoding_mode_flag in the VPS or SPS.

ultra_low_delay_decoding_mode_flag equal to one indicates the usage of a modified decoding process at tile boundaries.

The restriction implied by this flag can also include constraints on tile boundary alignment and upsampling filter restrictions over tile boundaries.

That is, with reference to FIG. 1, the guarantee signaling may additionally be used to signal a guarantee that, during a predetermined time period, such as a time period extending over a sequence of pictures, the pictures 15 of the second layer are subdivided so that borders 84 between the spatial segments 82 of the pictures of the second layer overlay every border 86 of the spatial segments 80 of the first layer (possibly after up-sampling if spatial scalability is considered). The decoder still periodically determines, in time intervals smaller than the predetermined time period, such as in units of individual pictures, i.e. in picture pitch intervals, the actual subdivision of the pictures 12, 15 of the first layer and the second layer into the spatial segments 80 and 82 based on short-term syntax elements of the multi-layer video data stream 40, but the knowledge on the alignment already helps in planning the parallel processing workload assignment. The solid lines 84 in FIG. 1, for example, represent an example where the tile boundaries 84 are completely spatially aligned to the tile boundaries 86 of layer 0. The just-mentioned guarantee would, however, also allow for the tile partitioning of layer 1 to be finer than the tile partitioning of layer 0 so that the tile partitioning of layer 1 would encompass further, additional tile boundaries not spatially overlapping any of the tile boundaries 86 of layer 0. In any case, the knowledge about the tile registration between layer 1 and layer 0 helps the decoder in allocating the workload or processing power available among the spatial segments concurrently processed in parallel. Without the long-term syntax element structure, the decoder would have to perform the workload allocation in the smaller time intervals, i.e. per picture, thereby wasting computer power in order to perform the workload allocation. Another aspect is "opportunistic decoding": a decoder with multiple CPU cores may exploit the knowledge about the parallelism of the layers to decide to try to decode or not try to decode layers of higher complexity, i.e. or higher number of layers or, in other words, further views. Bitstreams that exceed the capability of a single core might be decodable by utilizing all cores of the same decoder. This information is especially helpful, if profile and level indicators do not involve such indication on minimum parallelism.

Figure 15:
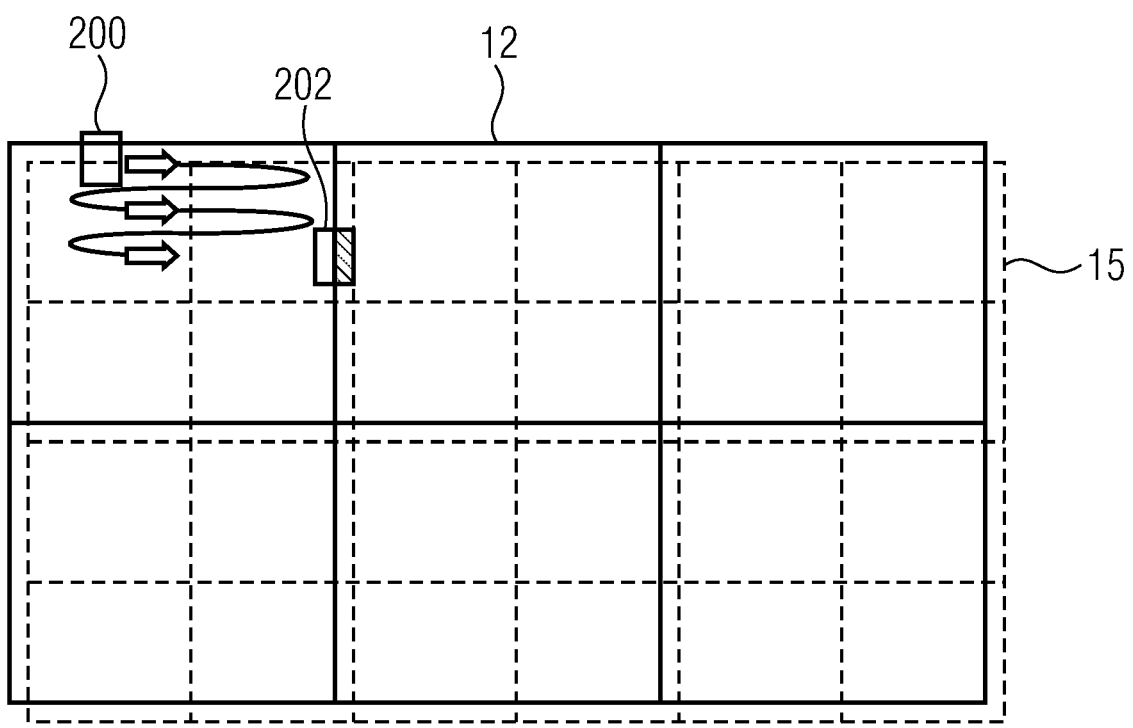
FIG. 15 shows a schematic diagram of an overlay of dependent view picture and base view picture, shown one on top of the other, in order to illustrate possible modifications for a base layer filter process at spatial segment boundaries, which modification could be triggered concurrently to the inter-view prediction change/restriction in accordance with an embodiment.

As explained above, the guarantee signalization (c.p., exemplarily, ultra_low_delay_decoding_mode_flag) could be used in order to steer the upsampling filter 36 in case of a multi-layer video with base layer picture 12 having different spatial resolution than the dependent view picture 15, too. If the upsampling filtering is performed in layer 0 across spatial segment boundaries 86, then the delay to be met in parallel decoding/encoding the spatial segments 82 of layer 1 relative to the encoding/decoding of the spatial segments 80 of layer 0 is increased as the upsampling filtering combines, and thus renders mutually dependent, the information of neighboring spatial segments of layer 0 to serve as the prediction reference 38 used in inter-layer prediction of blocks 41 of layer 1. See, for example, FIG. 15. Both pictures 12 and 15 are shown in an overlaying manner with both pictures dimensioned and registered to each other according to spatial correspondence, i.e. portions showing the same portion of the scene overlay each other. Pictures 12 and 15 are exemplarily shown to be split into 6 and 12, spatial segments such as tiles, respectively. A filter kernel is illustratively shown as moving across the left-upper tile of picture 12 so as to obtain the upsampled version thereof which serves as a basis for inter-layer predicting any block within the tiles of picture 15, spatially overlaying the left-upper tile. At some intermediate instances such as at 202 the kernel 200 overlaps a neighboring tile of picture 12. The sample value of the mid of kernel 200 at position 202 of the upsampled version thus depends on both samples of the upper-left tile of picture 12 as well as samples of the tile of picture 12 to the right thereof. If the upsampled version of picture 12 serves as the basis for inter-layer prediction, the inter-layer delay in parallel processing the segments of the layers is increased. A restriction could, thus, help in increasing the parallelization amount across the different layers and, accordingly, decreasing the overall coding delay. Naturally, the syntax element could also be a long-term syntax element which is valid for a sequence of pictures. The restriction could be achieved in one of the following ways: filling the overlapping portion of kernel 200 at overlapping position 202, for example, with a central tendency of the sample values within the non-dashed portion of kernel 200, extrapolating the non-dashed portion using linear or other functions into the dashed one or the like.

An alternative embodiment is given in the following in the VPS as an example, where the restriction/constraints mentioned above are controlled by the ultra_low_delay_decoding_mode_flag, but alternatively (when the flag is disabled) each restriction/constraint can be enabled individually. For this embodiment, reference is made to FIGS. 13c and 13d. This embodiment could be also included in other non-VCL NAL units (e.g. SPS or PPS). In FIGS. 13c and 13d, ultra_low_delay_decoding_mode_flag, equal to 1 specifies that du_interleaving_enabled_flag, interlayer_tile_mv_clipping_flag, depth_disparity_tile_mv_clipping_flag, inter_ layer_tile_tmvp_restriction_flag and independent_tile_upsampling_idc shall be inferred to be equal to 1 and are not present in the VPS, SPS or PPS.

When parallelization techniques such as tiles are used in a layered coded video sequence, it is beneficial from a delay perspective to control restrictions of coding tools such as inter-view prediction in the extension of HEVC to no cross the boundaries of tiles in a unified way.

In an embodiment, the value of independent_tiles_flag determines the presence of the syntax elements that control individual restriction/constraints such as inter_layer_PRED-TYPE_RESTYPE_SCAL_flag_x, or independent_tile_upsampling_idc. independent_tiles_flag could be included in the VPS as illustrated in FIG. 13e. Here, independent_tiles_flag, equal to 1 specifies that inter_layer_PREDTYPE_RESTYPE_SCAL_flag_1 to inter_layer_PREDTYPE_RESTYPE_SCAL_flag_N, and independent_tile_upsampling_idc shall be inferred to be equal to 1 and are not present in the VPS, SPS or PPS.

An alternative embodiment is given in FIG. 13f in the VPS as an example, where the constraints mentioned above are controlled by the independent_tiles_flag, but alternatively (when the flag is disabled) each constraint can be enabled individually. This embodiment could be also included in other non-VCL NAL units (e.g. SPS or PPS) as illustrated in FIG. 13g.

Summarizing the above embodiments described so far with respect to FIG. 8 to FIG. 15, a guarantee signalization in the data stream may be used by decoder 620 so as to optimize the inter-layer decoding offset between decoding the different layers/views 12 and 15, or the guarantee may be exploited by the decoder 620 so as to suppress or admit an inter-layer parallel processing trial as described above by referring to "opportunistic decoding".

The aspect of the present application discussed next is concerned with the problem of allowing for a lower end-to-end delay in multi-layer video coding. It is worthwhile to note that the aspect described next could be combined with the aspect described previously, but the opposite is also true, i.e. the embodiments concerning the aspect described now could also be implemented without details having been described above. In this regard, it should also be noted that the embodiments described hereinafter are not restricted to multi-view coding. The multiple layers mentioned hereinafter concerning the second aspect of the present application may involve different views, but may also represent the same view at varying degrees of spatial resolutions, SNR accuracy or the like. Possible scalability dimensions along which the below discussed multiple layers increase the information content conveyed by the previous layers are manifold and comprise, for example, the number of views, spatial resolution and SNR accuracy, and further possibilities will become apparent from discussing the third and fourth aspects of the present application, which aspects may also be, in accordance with an embodiment, combined with the presently described aspect, too.

The second of the present application described now is concerned with the problem of actually achieving a low coding delay, i.e. of embedding the low delay idea into the framework of NAL units. As described above, NAL units are composed of slices. Tile and/or WPP concepts are free to be chosen individually for the different layers of a multi-layered video data stream. Accordingly, each NAL unit having a slice packetized thereinto may be spatially attributed to the area of a picture which the respective slice refers to. Accordingly, in order to enable low delay coding in case of inter-layer prediction it would be favorable to be able to interleave NAL units of different layers pertaining to the same time instant in order to allow for encoder and decoder to commence encoding and transmitting, and decoding, respectively, the slices packetized into these NAL units in a manner allowing parallel processing of these pictures of the different layers, but pertaining to the same time instant. However, depending on the application, an encoder may favor the ability to use different coding orders among the pictures of the different layers, such as the use of different GOP structures for the different layers, over the ability to allow for parallel processing in layer dimension. Accordingly, in accordance with the second aspect a construction of a data stream may be as described again hereinafter with respect to FIG. 16.

Figure 16:
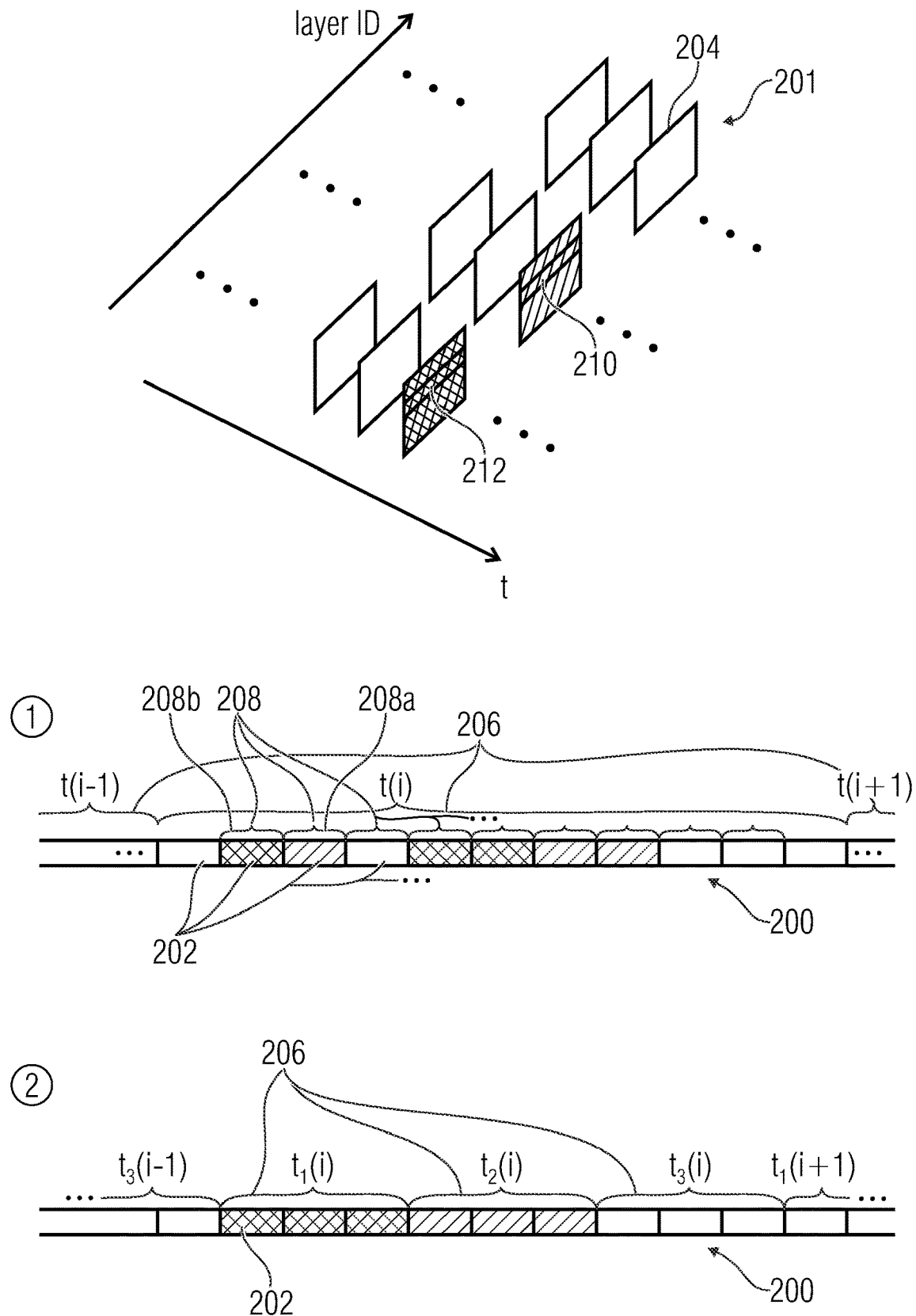
FIG. 16 shows a schematic diagram of a multi-layered video data stream, here exemplarily comprising three layers, wherein options 1 and 2 for arranging NAL units belonging to a respective time instant and a respective layer within the data stream are illustrated in the bottom half of FIG. 16.

FIG. 16 shows a multi-layered video material 201 composed of a sequence of pictures 204 for each of different layers. Each layer may describe a different property of this scene described by the multi-layered video material 201. That is, the meaning of the layers may be selected among: color component, depth map, transparency and/or view point, for example. Without losing generality, let us assume that the different layers correspond to different views with video material 201 being a multi-view video.

In case of the application necessitating low delay, the encoder may decide to signal a long-term high level syntax element (cp. set the du_interleaving_enabled_flag introduced below to be equal to 1). In that case, the data stream generated by the encoder may look like indicated in the middle of FIG. 16 at the one with the circle around it. In that case, the multi-layered video stream 200 is composed of the sequence of NAL units 202 such that NAL units 202 belonging to one access unit 206 relate to pictures of one temporal time instant, and NAL units 202 of different access units relate to different time instants. Within each access unit 206, for each layer, at least some of the NAL units relating to the respective layer are grouped into one or more decoding units 208. This means the following: among the NAL units 202 there are, as indicated above, NAL units of different types, such as VCL NAL units on the one hand and non-VCL NAL units on the other hand. Speaking more specifically, NAL units 202 may be of different types, and these types may comprise:

1) NAL units carrying slices, tiles, WPP substreams or the like, i.e. syntax elements concerning prediction parameters and/or residual data describing picture content on a picture sample scale/granularity. One or more such types may be present. VCL NAL units are of such type. Such NAL units are not removable.
2) Parameter set NAL units may carry infrequently changing information such as long-term coding settings, some examples of which have been described above. Such NAL units may be interspersed within the data stream to some extent and repeatedly, for example;

3) Supplementary enhancement information (SEI) NAL units may carry optional data.

Decoding units may be composed of the first of the above mentioned NAL units. To be more precise, decoding units may consist of "of one or more VCL NAL units in an access unit and the associated non-VCL NAL units." Decoding units thus describe a certain area of one picture, namely the area encoded into the one or more slices contained therein.

The decoding units 208 of NAL units which relate to different layers, are interleaved so that, for each decoding unit, inter-layer prediction used to encode the respective decoding unit is based on portions of pictures of layers other than the layer the respective decoding unit relates to, which portions are coded into decoding units preceding the respective decoding unit within the respective access unit. See, for example, decoding unit 208a in FIG. 16. Imagine that this decoding unit relates to the area 210 of the respective picture of dependent layer 2 and a certain time instant, exemplarily. The co-located area in the base layer picture of the same time instant is denoted by 212 and an area of this base layer picture slightly exceeding this area 212 could be necessitated in order to completely decode decoding unit 208a by exploiting inter-layer prediction. The slight exceeding may be the result of disparity-compensated prediction, for example. This in turn means that the decoding unit(s) 208b, which precedes decoding unit 208a within access unit 206, should cover the area needed for inter-layer prediction completely. Reference is made to the above description concerning the delay indication which could be used as a boundary for the interleaving granularity.

If, however, the application takes more advantage of the freedom to differently choose the decoding orders of the pictures among the different layers, the encoder may favor to set the du_interleaving_enabled_flag to be equal to 0, with this case being depicted at the bottom of FIG. 16 at the 2 with the circle around it. In this case, the multi-layered video data stream has individual access units for each picture belonging to a certain pair of one or more values of layer ID and a single temporal time instant. As shown in FIG. 16, at the (i−1)-th decoding order, i.e. time instant t(i−1), each layer may consist of an access unit $AU_1$, $AU_2$ (and so on) or not (c.p time instant t(i)) where all layers are contained in a single access unit $AU_1$. However, interleaving is not allowed in this case. The access units are arranged in the data stream 200 following the decoding order index i, i.e. the access units of decoding order index i for each layer, followed by the access units concerning the pictures of these layers corresponding to decoding order i+1 and so forth. A temporal inter-picture prediction signaling in the data stream signals as to whether equal coding order or different picture coding orders apply for the different layers, and the signaling may, for example, be placed within one or even redundantly within more than one position within the data stream such that within the slices packetized into the NAL units.

As to the NAL unit types, it shall be noted that the ordering rules defined thereamong may enable a decoder to decide where borders between consecutive access units are positioned irrespective of NAL units of a removable packet type having been removed during transmission or not. NAL units of the removable packet type may, for example, comprise SEI NAL units, or redundant picture data NAL units or other specific NAL unit types. That is, the borders between access units do not move but remain, and still, the ordering rules are obeyed within each access unit, but broken at each boundary between any two access units.

Figure 17:
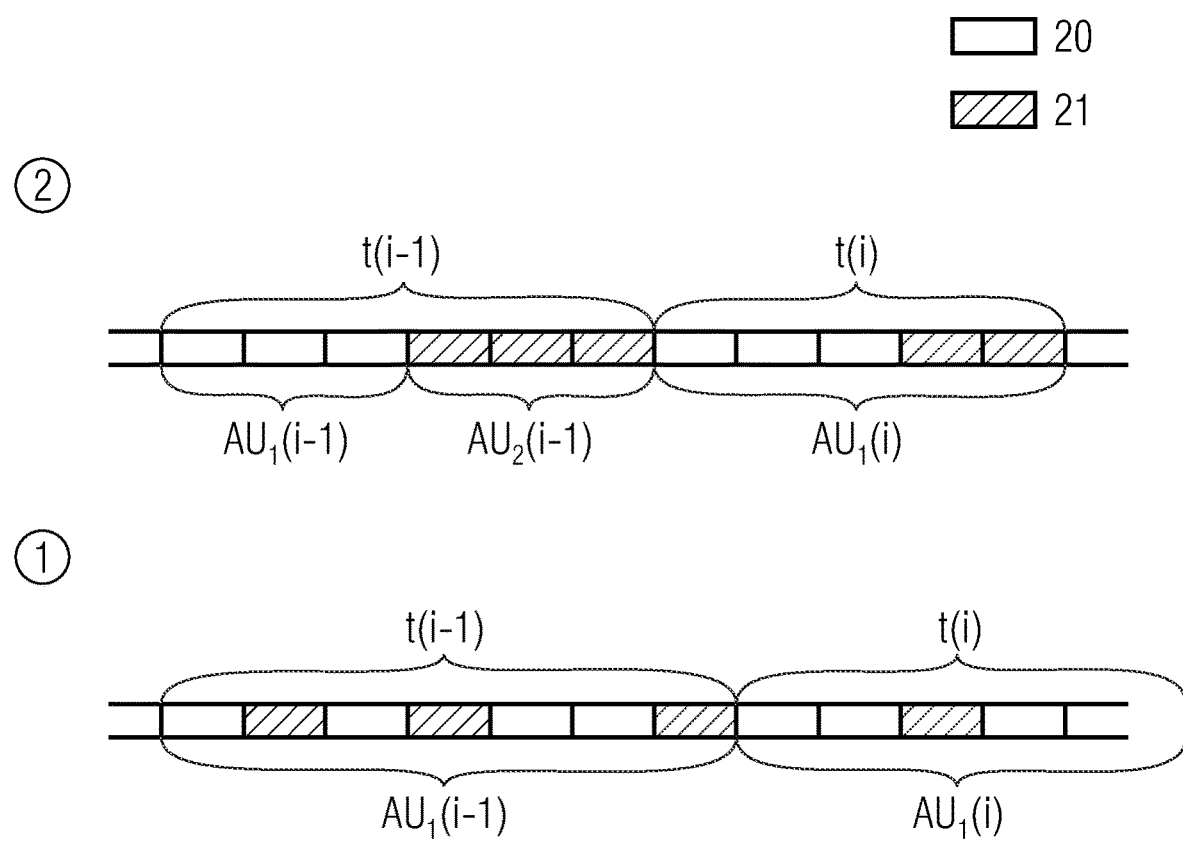
FIG. 17 shows a schematic diagram of a portion out of a data stream with illustrating these two options in the exemplary case of two layers.

For sake of completeness, FIG. 17 illustrates that the case of du_interleaving_flag=1, allows that the packets belonging to different layers, but the same time instant t(i−1), for example, are distributed within one access unit. The case of du_interleaving_flag=0 is depicted at 2 with a circle around it in conformity with FIG. 16.

However, with respect to FIGS. 16 and 17, it is noted that the above described interleaving signalization or interleaving signaling may be left off with resulting in a multi-layer video data stream which, inevitably, uses the access unit definition according to the case shown at 1 with a circle around it in FIGS. 16 and 17.

In accordance with an embodiment, the fact as to whether the NAL units contained within each access unit are actually interleaved or not with respect to their association with the layers of the data stream may be decided at the encoder's discretion. In order to ease the handling of the data stream, a syntax element, such as the du_interleaving_flag, may signal the interleaving or non-interleaving of the NAL units within an access unit collecting all NAL units of a certain time stamp, to the decoder so that the latter may more easily process the NAL units. For example, whenever interleaving is signaled to be switched on, the decoder could use more than one coded picture buffer as briefly illustrated with respect to FIG. 18.

Figure 18:
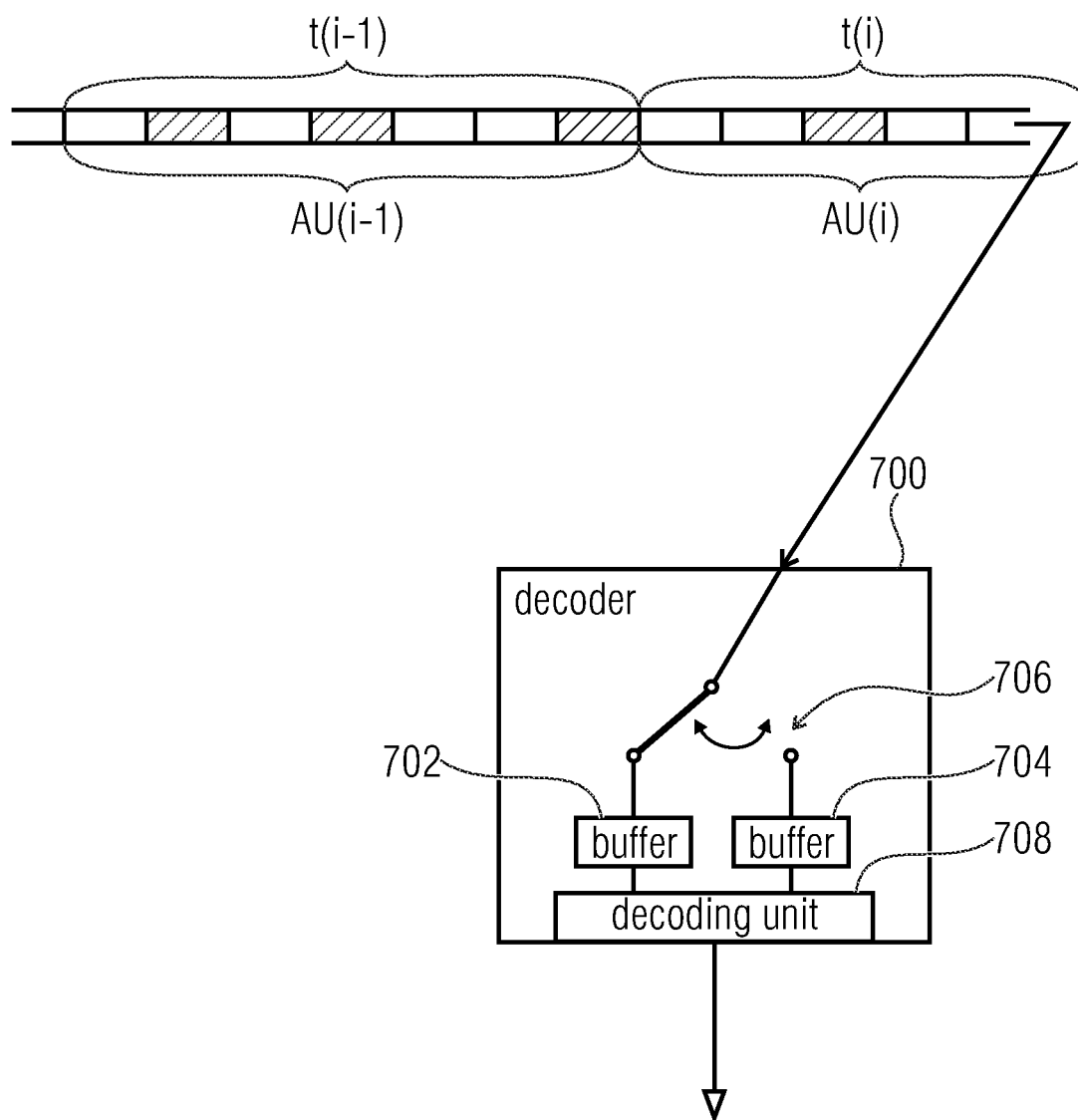
FIG. 18 shows a schematic block diagram of a decoder configured to process multi-layered video data streams according to FIGS. 16 and 17 of option 1.

FIG. 18 shows a decoder 700 which may be embodied as outlined above with respect to FIG. 2 and may even comply with the description brought forward with respect to FIG. 9. Exemplarily, the multi-layered video data stream of FIG. 17, option 1 with a circle around it, is shown as entering decoder 700. In order to more easily perform the deinterleaving of the NAL units belonging to different layers, but a common time instant, per access unit AU, decoder 700 uses two buffers 702 and 704, with a multiplexer 706 forwarding, for each access unit AU, the NAL units of that access unit AU, which belong to a first layer to buffer 702, for example, and NAL units belonging to a second layer to buffer 704, for example. A decoding unit 708 then performs the decoding. For example, in FIG. 18, NAL units belonging to base/first layer are, for example, shown as not-hatched, whereas NAL units of a dependent/second layer are shown using hatching. If the above-outlined interleaving signaling is present in the data stream, the decoder 700 may be responsive to this interleaving signaling in the following manner: if the interleaving signaling signals NAL unit interleaving to be switched on, i.e. NAL units of different layers are interleaved with each other within one access unit AU, and the decoder 700 uses buffers 702 and 704 with a multiplexer 706 distributing the NAL units onto these buffers as just outlined. If not, however, decoder 700 merely uses one of the buffers 702 and 704 for all NAL units comprised by any access unit, such as buffer 702, for example.

Figure 19:
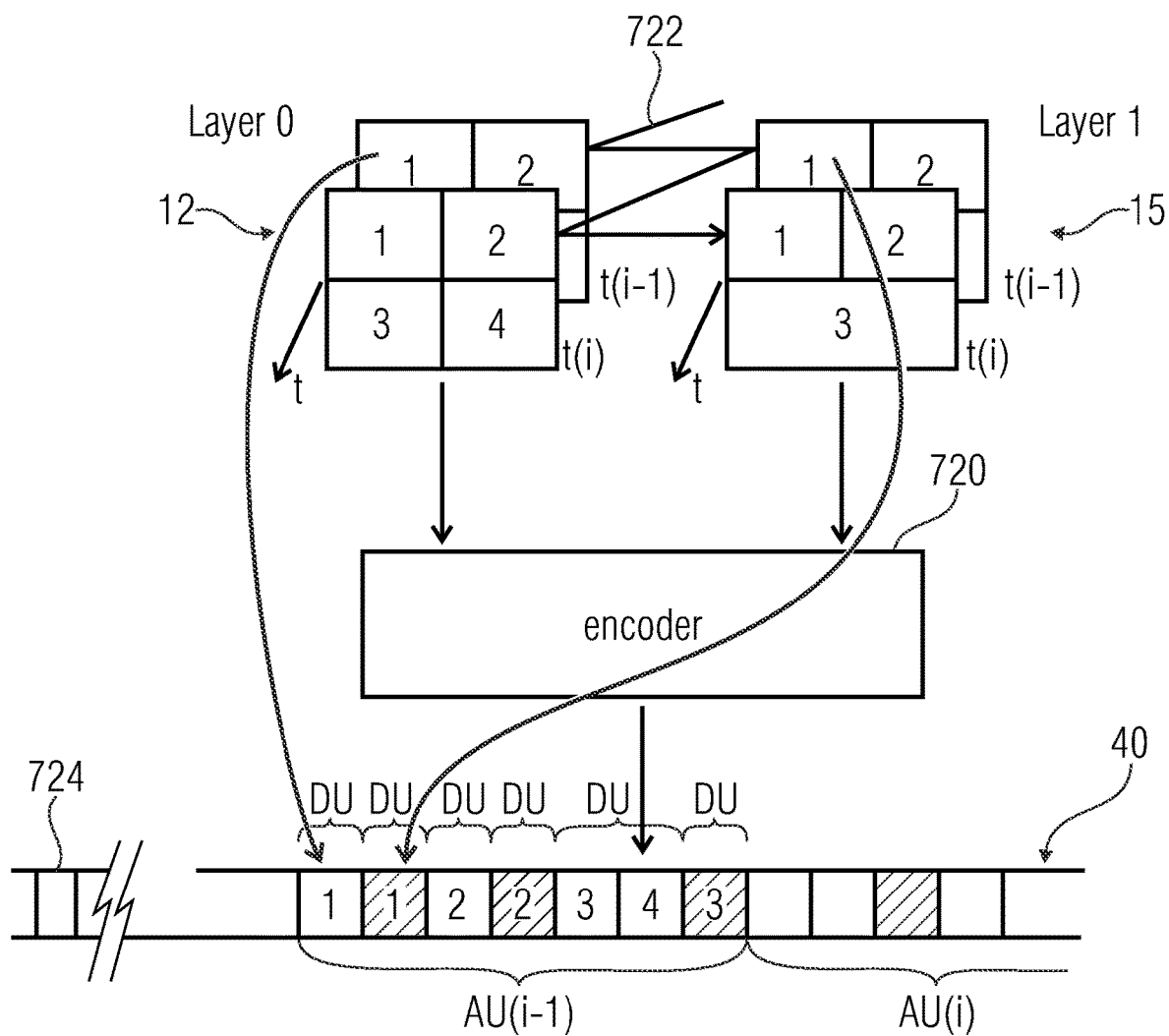
FIG. 19 shows a schematic block diagram of an encoder fitting to the decoder of FIG. 18.

In order to understand the embodiment of FIG. 18 more easily, reference is made to FIG. 18 along with FIG. 19, with FIG. 19 showing an encoder configured to generate a multi-layer video data stream as outlined above. The encoder of FIG. 9 is generally indicated using reference signs 720 and encodes the inbound pictures of here, exemplarily, two layers which are, for the ease of understanding, indicated as layer 12, forming a base layer, and layer 1, forming a dependent layer. They may, as previously outlined, form different views. A general encoding order along which encoder 720 encodes the pictures of layers 12 and 15, scans the pictures of these layers substantially along their temporal (presentation time) order wherein the encoding order 722 may, in units of groups of pictures, deviate from the presentation time order of the pictures 12 and 15. At each temporal time instant, the encoding order 722 passes the pictures of layers 12 and 15 along their dependency, i.e. from layer 12 to layer 15.

The encoder 720 encodes the pictures of layers 12 and 15 into the data stream 40 in units of the aforementioned NAL units, each of which is associated with a part of a respective picture in a spatial sense. Thus, NAL units belonging to a certain picture subdivide or partition, the respective picture spatially and as already described, the inter-layer prediction renders portions of pictures of layer 15 dependent on portions of time-aligned pictures of layer 12 which are substantially co-located to the respective portion of the layer 15 picture with "substantially" encompassing disparity displacements. In the example of FIG. 19, the encoder 720 has chosen to exploit the interleaving possibility in forming the access units collecting all NAL units belonging to a certain time instant. In FIG. 19, the portion out of data stream 40 illustrated corresponds to the one inbound to the decoder of FIG. 18. That is, in the example of FIG. 19, the encoder 720 uses inter-layer parallel processing in encoding layers 12 and 15. As far as time instant t(i−1) is concerned, the encoder 720 starts encoding the picture of layer 1 as soon as NAL unit 1 of the picture of layer 12 has been encoded. Each NAL unit, the encoding of which has been completed, is output by encoder 720, provided with an arrival time stamp which corresponds to the time the respective NAL unit has been output by encoder 720. After encoding the first NAL unit of the picture of layer 12 at time instant t(i−1), encoder 720 proceeds with encoding the content of the picture of layer 12 and outputs the second NAL unit of layer's 12 picture, provided with an arrival time stamp succeeding the arrival time stamp of the first NAL unit of the time-aligned picture of layer 15. That is, the encoder 720 outputs the NAL units of the pictures of layers 12 and 15, all belonging to the same time instant, in an interleaved manner, and in this interleaved manner, the NAL units of data stream 40 are actually transmitted. The circumstance that the encoder 720 has chosen to exploit the possibility of interleaving, is indicated by encoder 720 within data stream 40 by way of the respective interleaving signaling 724. As the encoder 720 is able to output the first NAL unit of the dependent layer 15 of time instant t(i−1) earlier than compared to the non-interleaved scenario according to which the output of the first NAL unit of layer 15 would be deferred until the completion of the encoding and outputting of all NAL units of the time-aligned base layer picture, the end-to-end delay between the decoder FIG. 18 and the encoder FIG. 19 may be reduced.

As already mentioned above, in accordance with an alternative example, in the case of non-interleaving, i.e. in case of signaling 724 indicating the non-interleaved alternative, the definition of the access units may remain the same, i.e. access units AU may collect all NAL units belonging to a certain time instant. In that case, signaling 724 merely indicates whether within each access unit, the NAL units belonging to different layers 12 and 15 are interleaved or not.

As described above, depending on the signaling 724, the decoding of FIG. 18 either uses one buffer or two buffers. In the case of interleaving switched on, decoder 700 distributes the NAL units onto the two buffers 702 and 704 such that, for example, NAL units of layer 12 are buffered in buffer 702, while the NAL units of layer 15 are buffered in buffer 704. The buffers 702 and 704 are emptied access unit wise. This is true in case of both signaling 724 indicating interleaving or non-interleaving.

It is advantageous if the encoder 720 sets the removal time within each NAL unit such that the decoding unit 708 exploits the possibility of decoding layers 12 and 15 from the data stream 40 using interlayer parallel processing. The end-to-end delay, however, is already reduced even if the decoder 700 does not apply inter-layer parallel processing.

As already described above, NAL units may be of different NAL unit type. Each NAL unit may have a NAL unit type index indicating the type of the respective NAL unit out of a set of possible types, and within each access unit, the types of the NAL units of the respective access unit may obey an ordering rule among the NAL unit types while merely between two consecutive access units, the ordering rule is broken, so that the decoder 700 is able to identify access unit borders by surveying this rule. For more information reference is made to the H.264 Standard.

With respect to FIGS. 18 and 19, decoding units, DU, are identifiable as runs of consecutive NAL units within one access unit, which belong to the same layer. The NAL units indicated "3" and "4" in FIG. 19 in the access unit AU(i−1), for example, form one DU. The other decoding units of access unit AU(i−1) all comprise merely one NAL unit. Together, access unit AU(i−1) of FIG. 19 exemplarily comprises six decoding units DU which are alternately arranged within access unit AU(i−1), i.e. they are composed of runs of NAL units of one layer with the one layer alternately changing between layer 1 and layer 0.

Similar to the first aspect, in the following it is now outlined as to how the second aspect described hereinbefore may be built into the HEVC extension.

Before this, however, for sake of completeness, a further aspect of the current HEVC is described, which enables inter-picture parallel processing, namely WPP processing.

Figure 20:
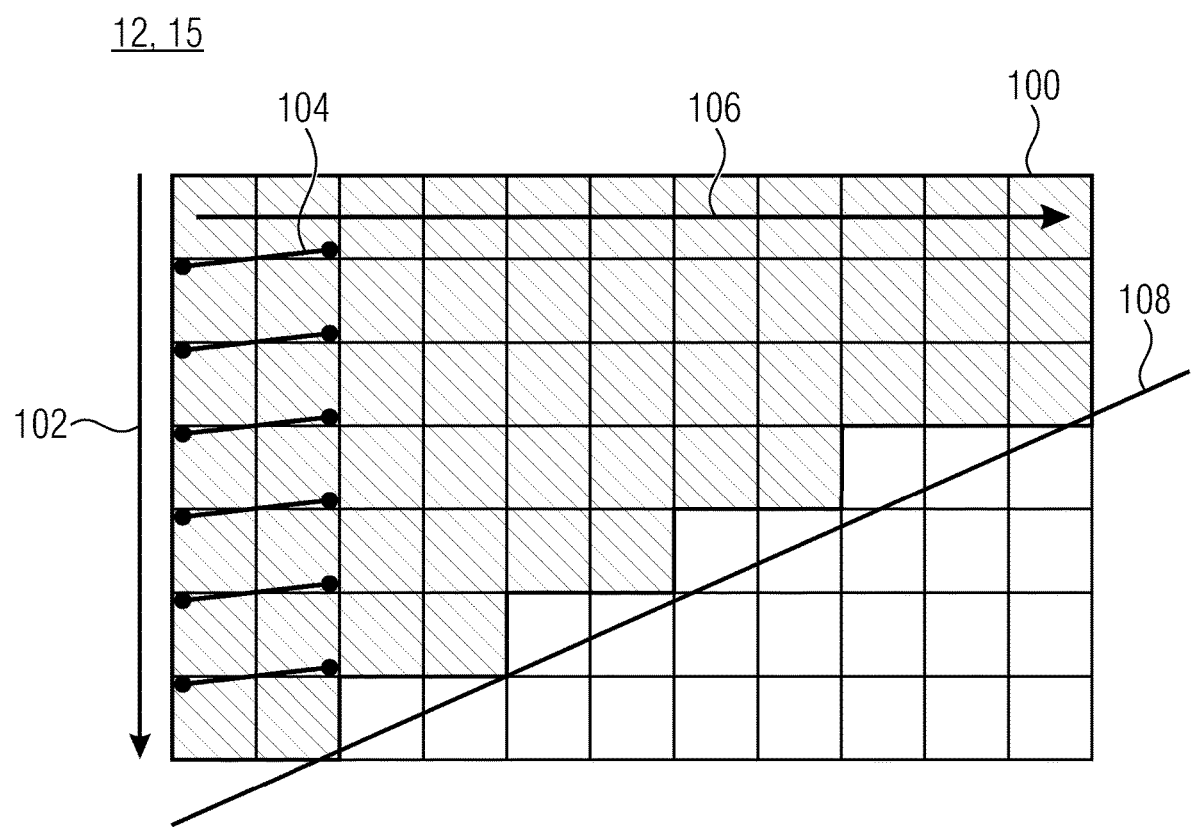
FIG. 20 shows a schematic diagram of a picture subdivided into substreams for WPP processing with additionally indicating the wavefront resulting when parallel decoding/encoding the picture using the WPP in accordance with an embodiment.

FIG. 20 describes how WPP is currently implemented in HEVC. That is, this description shall also form a basis for optional implementations of the WPP processing of any of the above or below described embodiments.

In the base layer, wavefront parallel processing allows parallel processing of coded tree block (CTBs) rows. Prediction dependencies are not broken across CTB rows. With regards to entropy coding, WPP changes the CABAC dependencies to the top-left CTB in the respective upper CTB row, as can be seen in FIG. 20. Entropy coding a CTB in following rows can start once entropy decoding of the corresponding upper-right CTB is finished.

In the enhancement layer, decoding of a CTB can start as soon as the CTBs containing the corresponding image area are fully decoded and available.

In HEVC and its extension, the following definition of decoding units is given:

decoding unit: An access unit if SubPicHrdFlag is equal to 0 or a subset of an access unit otherwise, consisting of one or more VCL NAL units in an access unit and the associated non-VCL NAL units.

In HEVC, the Hypothetical Reference Decoder (HRD) can optionally operate CPB and DPB at decoding unit level (or sub-picture level) if advantageous by external means and sub picture HRD parameters are available.

The HEVC specification [1] features a concept of so-called decoding units that are defined as follows.

3.1 decoding unit: An access unit if SubPicHrdFlag is equal to 0 or a subset of an access unit otherwise, consisting of one or more VCL NAL units in an access unit and the associated non-VCL NAL units.

In a layered coded video sequence as present in the HEVC extensions for 3D [3], Multiview [2] or spatial scalability [4], where additional representations of the video data (e.g. with higher fidelity, spatial resolution or different camera viewpoints) are coded depending on lower layers though predictive inter-layer/inter-view coding tools, it can be beneficial to interleave the (picture area wise-) related or co-located decoding units of related layers in the bitstream to minimize end to end delays on the encoder and decoder.

In order to allow interleaving of decoding units in the coded video bitstream, certain constraints on the coded video bitstreams have to be signalled and enforced.

How the above interleaving concept may be implemented in HEVC is described in detail and reasoned for in the following subsections.

As far as the current state of HEVC extension as taken from draft documents of the MV-HEVC specification [2] is concerned, it holds that the definition for an access unit used, according to which an access unit contains one coded picture (with a particular value of nuh_layer_id). One coded picture is defined below essentially identically to a view component in MVC. It was an open issue whether an access unit should instead be defined to contain all view components with the same POC value.

The Base HEVC Specification [1] defined:
3.1 access unit: A set of NAL units that are associated with each other according to a specified classification rule, are consecutive in decoding order, and contain exactly one coded picture.

NOTE 1—In addition to containing the VCL NAL units of the coded picture, an access unit may also contain non-VCL NAL units. The decoding of an access unit results in a decoded picture.

It seemed that the access unit (AU) definition, which allows only one coded picture in each access unit, was interpreted in a way that each dependent view would be interpreted as a separate coded picture and be necessitated to be contained in a separate access unit. This is depicted at "2" in FIG. 17.

In previous standards, a "coded picture" contains all layer of view representations of the picture of a certain time stamp.

Access units cannot be interleaved. This means, if each view is included in a different access unit, the whole picture of a base view needs to be received in the DPB, before the first decoding unit (DU) of a dependent picture can be decoded.

For ultra-low delay operation with dependent layers/views it would be favourable to interleave decoding units.

Figure 21:
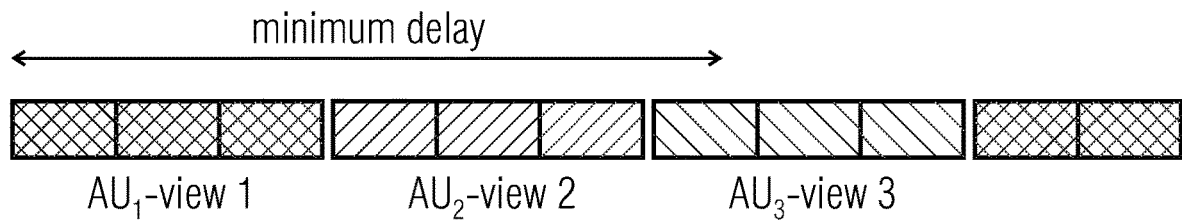
FIG. 21 shows a multi-layered video data stream concerning three views with three decoding units each in an un-interleaved state.

The example of FIG. 21 contains three views with three decoding units each. They are received in order from left to right:

If each view is contained in an own access unit, the minimum delay for decoding the first decoding unit of view 3 includes completely receiving views 1 and 2.

Figure 22:
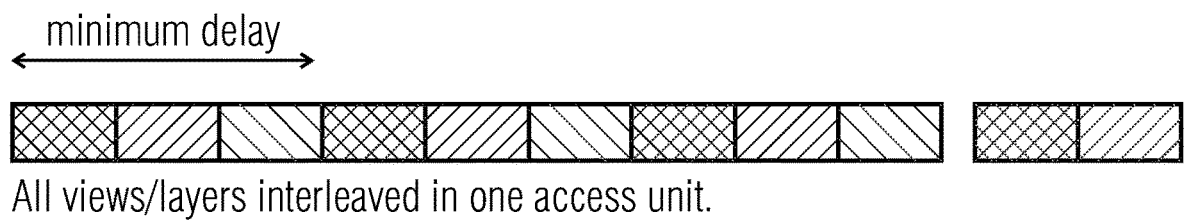
FIG. 22 shows a schematic diagram of the configuration of a multi-layered video data stream according to FIG. 21, but with the views being interleaved.

If views can be sent interleaved, the minimum delay can be reduced as shown in FIG. 22 and as already explained with respect to FIGS. 18 and 19.

Interleaving of NAL units from different layers in scalable extensions of HEVC may be achieved as follows:

a bitstream interleaving mechanism for layer or view representations and a decoder that may be realized which is able to use this bitstream layout to decode dependent views with very low delay using parallelization techniques. Interleaving of DUs is controlled via a flag (e.g. du_interleaving_enabled_flag).

In order to allow low delay decoding and parallelization in scalable extension of HEVC, interleaving of NAL units of the different layers of the same AU is necessitated. Therefore, definitions along the following could be introduced:

access unit: A set of NAL units that are associated with each other according to a specified classification rule, are consecutive in decoding order, and contain exactly one coded picture.

coded layer picture components: A coded representation of a layer picture component containing all coding tree units of a layer picture component.

coded picture: A coded representation of a picture containing all coding tree units of the picture containing one or more coded layer picture components.

picture: A picture is a set of one or more layer picture components.

layer picture component: An array of luma samples in monochrome format or an array of luma samples and two corresponding arrays of chroma samples in 4:2:0, 4:2:2, and 4:4:4 color format, which coded representation consists of the NAL units from a specific layer among all NAL units in an access unit.

NAL units are interleaved(cp. du_interleaving_enabled_flag==1) following the dependencies among them in such a way that each NAL unit can be decoded with only the data that was received in previous NAL units in decoding order, i.e. no data from NAL units later in the decoding order is necessitated for decoding the NAL unit.

When interleaving of DUs is applied (cp. du_interleaving_enabled_flag==1) and luma and chroma components are separated into different color planes, the respective NAL unit associated to the color planes are allowed to be interleaved. Each of these respective NAL units (associated to unique value of colour_plane_id) has to fulfil the VCL NAL unit order as described below. As color planes are expected to have no coding dependencies between each other in an Access Unit, they follow the normal order.

The constraints on NAL unit order may be expressed using a syntax element min_spatial_segment_delay, which measures and guarantees a worst case delay/offset between spatial segments in units of CTBs. The syntax element describes the dependency of spatial regions in between CTBs or spatial segments (such as tiles, slices or CTB rows for WPP) of base and enhancement layers. The syntax element is not necessitated for interleaving the NAL units or sequential decoding of the NAL units in coding order. A parallel multi-layer decoder can use the syntax element to set up parallel decoding of layers.

The following constraints influence the encoder possibilities to allow for parallelization across layers/views and interleaving of decoding units as described primarily with respect to the first aspect:

1) Prediction of Samples and Syntax Elements:

Interpolation filters for luma and chroma resampling set constraints on the necessitated data in lower layers to generate necessitated upsampled data for higher layers. Decoding dependencies can be reduced by constraining these filters, e.g. as spatial segments of the picture can be upsampled independently. Signaling of a specific constraint for Tile processing has been discussed above with respect to the first aspect.

Motion vector prediction for "Reference index based scalable extensions" (HLS-approach) and more concretely Temporal Motion Vector Prediction (TMVP) set constraints on the necessitated data in lower layer to generate the necessitated resampled picture motion field. The related inventions and signaling are described above with respect to the first aspect.

2) Motion Vectors:

For SHVC motion compensation is not used with lower layer, i.e. if lower layers are used as reference pictures (HLS-approach) the resulting motions vectors have to be zero vectors. However, for MV-HEVC 0 or 3D-HEVC 0, the disparity vectors may be constraint but are not necessarily zero vectors. That is, motion compensation may be used for interview prediction. Therefore, restriction to the motion vectors may be applied to ensure that only the data received in previous NAL units is necessitated for decoding. The related inventions and signaling are described above with respect to the first aspect.

3) Picture Partitioning with Tiles Boundaries:

If parallel processing and low delay is desired effectively with interleaving of NAL units from different layers, picture partitioning in enhancement layers should be done dependent of the picture partitioning of the partitioning in the reference layers.

As far as the order of VCL NAL units and association to coded pictures is concerned, the following may be specified.

Each VCL NAL unit is part of a coded picture.

The order of the VCL NAL units within a coded layer picture component of a coded picture, i.e. VCL NAL units of a coded picture with the same layer_id_nuh value, is constrained as follows:

The first VCL NAL unit of the coded layer picture component shall have first_slice_segment_in_pic_flag equal to 1.

Let sliceSegAddrA and sliceSegAddrB be the slice_segment_address values of any two coded slice segment NAL units A and B within the same coded layer picture component. When either of the following conditions is true, coded slice segment NAL unit A shall precede the coded slice segment NAL unit B:

TileId[CtbAddrRsToTs[sliceSegAddrA]] is less than TileId[CtbAddrRsToTs[sliceSegAddrB]].

TileId[CtbAddrRsToTs[sliceSegAddrA]] is equal to TileId[CtbAddrRsToTs[sliceSegAddrB]] and CtbAddrRsToTs[sliceSegAddrA] is less than CtbAddrRsToTs[sliceSegAddrB].

If a coded picture consists of more than one layer picture components the order of the VCL NAL units of all picture components is constrained as follows:

Let VCL NAL A be the the first VCL NAL unit A in a coded layer picture component layerPicA used as reference for another layer picture component layerPicB. Then VCL NAL unit A shall precede any VCL NAL unit B belonging to layerPicB.

Otherwise (not the first VCL NAL unit), if du_interleaving_enabled_flag is equal to 0, let VCL NAL A be any VCL NAL unit of a coded layer picture component layerPicA used as reference for another coded layer picture component layerPicB. Then VCL NAL unit A shall precede any VCL NAL unit B belonging layerPicB.

Otherwise (not the first VCL NAL unit and du_interleaving_enabled_flag is equal to 1), if ctb_based_delay_enabled_flag is equal to 1 (i.e. regardless whether tiles or WPP are used in the video sequence, a CTB based delay is signalled), let layerPicA be a coded layer picture component that is used as reference for another coded layer picture component layerPicB. Let also NALUsetA be a sequence of consecutive slice segment NAL units belonging to layerPicA and that directly follow a sequence of consecutive slice segment NAL units belonging to layerPicB NALUsetB1 and NALUsetB2 be a sequence of consecutive slice segment NAL units belonging to layerPicB that directly follow NALUsetA. Let sliceSegAddrA be the slice_segment_address of the first segment NAL unit of NALUsetA and sliceSegAddrB be the slice_segment_address of the first coded slice segment NAL unit of NALUsetB2. Then, the following conditions shall be true:

If NALUsetA exists NALUsetB2 shall exist.

Figure 23:
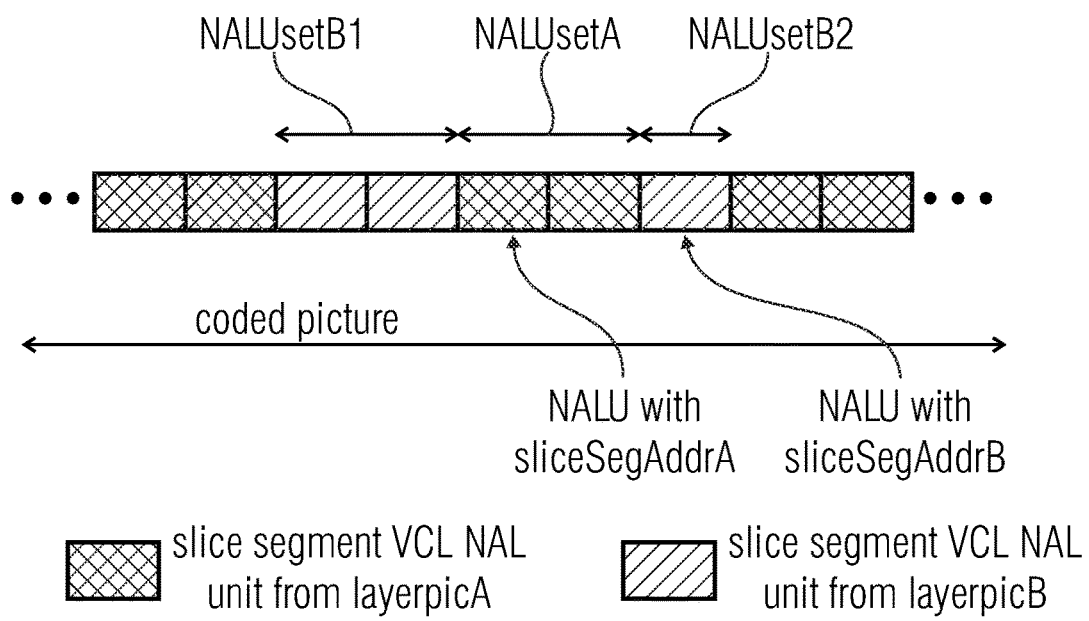
FIG. 23 shows a schematic diagram of a portion out of a multi-layered video data stream in the internal sequence of NAL units in order to illustrate constraints possibly to be obeyed in interleaving the layers within an access unit.

CtbAddrRsToTs[PicWidthInCtbsYA*CtbRowBA(sliceSegAddrB−1)+CtbColBA(sliceSegAddrB−1)+min_spatial_segment_delay] shall be smaller or equal than CtbAddrRsToTs[sliceSegAddrA−1]. See also FIG. 23.

Otherwise (not the first VCL NAL unit, and du_interleaving_enabled_flag is equal to 1 and ctb_based_delay_enabled_flag is equal to 0), if tiles_enabled_flag is equal to 0 and entropy_coding_sync_enabled_flag is equal to 0 (i.e. neither tiles nor WPP are used in the video sequence), let layerPicA be a coded layer picture component that is used as reference for another coded layer picture component layerPicB. Let also VCL NAL unit B be any VCL NAL unit of the coded layer picture component layerPicB and VCL NAL unit A be the preceeding VCL NAL unit from layerPicA with a value of slice_segment_address equal to sliceSegAddrA for which there are (min_spatial_segment_delay−1) VCL NAL units from layerPicA between VCL NAL unit A and VCL NAL unit B. Let also VCL NAL unit C be the next VCL NAL unit of the coded layer picture component layerPicB following VCL NAL unit B with a value of slice_segment_address equal to sliceSegAddrC. Let PicWidthInCtbsYA be the picture width in units of CTBs of layerPicA. Then, the following conditions shall be true:

There shall be min_spatial_segment_delay VCL NAL units from layerPicA preceding VCL NAL unit B.

PicWidthInCtbsYA*CtbRowBA(sliceSegAddrC−1)+ CtbColBA(sliceSegAddrC−1) shall be smaller than or equal to sliceSegAddrA−1.

Otherwise (not the first VCL NAL unit, and du_interleaving_enabled_flag is equal to 1 and ctb_based_delay_enabled_flag is equal to 0), if tiles_enabled_flag is equal to 0 and entropy_coding_sync_enabled_flag is equal to 1 (i.e. WPP is used in the video sequence), let sliceSegAddrA be the slice_segment_address of any segment NAL unit A of a coded layer picture component layerPicA that directly precedes a slice segment VCL NAL unit B with slice_segment_address equal to sliceSegAddrB that belongs to a coded layer picture component layerPicB that uses layerPicA as reference. Let also PicWidthInCtbsYA be the picture width in units of CTBs of layerPicA. Then, the following condition shall be true:

(CtbRowBA(sliceSegAddrB)−Floor((sliceSegAddrA)/ PicWidthInCtbsYA)+1) is equal or greater than min_spatial_segment_delay.

Otherwise (not the first VCL NAL unit, and du_interleaving_enabled_flag is equal to 1 and ctb_based_delay_enabled_flag is equal to 0), if tiles_enabled_flag is equal to 1 and entropy_coding_sync_enabled_flag is equal to 0 (i.e. tiles are used in the video sequence), let sliceSegAddrA be the slice_segment_address of any segment NAL unit A of a coded layer picture component layerPicA and slice segment VCL NAL unit B be the first following VCL NAL unit that belongs to a coded layer picture component layerPicB that uses layerPicA as reference with slice_segment_address equal to sliceSegAddrB. Let also PicWidthInCtbsYA be the picture width in units of CTBs of layerPicA. Then, the following condition shall be true:

TileId[CtbAddrRsToTs[PicWidthInCtbsYA*CtbRowBA (sliceSegAddrB−1)+CtbColBA(sliceSegAddrB−1)]]− TileId[CtbAddrRsToTs[sliceSegAddrA−1] ] shall be equal or greater than min_spatial_segment_delay.

The signaling 724 may be arranged within the VPS as illustrated in FIG. 24, wherein:

du_interleaving_enabled_flag, when du_interleaving_enabled_flag is equal to 1, specifies that a frame shall have a single associated coded picture (i.e. single associated AU) consisting of all coded layer picture components for that frame and VCL NAL units corresponding to different layers may be interleaved. When du_interleaving_enabled_flag is equal to 0 a frame may have more than one associated coded pictures (i.e. one or more associated AU) and VCL NAL units of different coded layer picture components are not interleaved.

To finalize the discussion above, the hypothetical reference decoder associated with decoder 700 may, in alignment with the embodiment of FIG. 18, be adapted to, depending on the setting of the signaling 724, operate with one or two buffers of buffers 702 and 704, i.e. switch between these options according to the signaling 724.

In the following, another aspect of the present application is described, which again may be combined with aspect 1, aspect 2 or both of them. The third aspect of the present application concerns an extension of scalability signaling for applications with a large number, for example, of views.

To ease the understanding of the description brought forward below, an overview of existing scalability signaling concepts is provided.

Most state-of-the-art 3D video application or deployments feature stereoscopic content with or without respective depth maps for each of the two camera views or multi view content with a higher number of views (>2) with or without respective depth maps for each camera view.

The High Efficiency Video Coding (HEVC) standard [1] and its extensions for 3D and multiview video [2][3] feature a scalability signaling on the Network Abstraction Layer (NAL) that is capable of expressing up to 64 different layers with a 6 bit layer identifier (cp. nuh_layer_id) in the header of each NAL unit as given in the syntax table of FIG. 25.

Each value of the layer identifier can be translated into a set of scalable identifiers variables (e.g. DependencyID, ViewID, and others), e.g. through the Video Parameter Set extension, depending on the scalability dimension in use, which allows for a maximum of 64 dedicated views to be indicated on the network abstraction layer or 32 dedicated views if the layer identifier is used to indicate depth maps as well.

However, there also exist applications that necessitate a substantially larger number of views to be encoded into a video bit stream, transported, decoded and displayed, e.g. in multi-camera arrays with a large number of cameras or in holographic displays that necessitate a large number of viewpoints as presented in [5][6][7]. The following sections describe two inventions that address the above mentioned shortcoming of the HEVC high level syntax for extensions.

Simply extending the size nuh_layer_id field in the NAL unit header is not considered as a useful solution of the problem. The header is expected to be fixed length, which is necessitated for easy access in very simple (low cost) devices that perform operations on the bitstream like routing and extraction. This would mean, that additional bits (or bytes) would have to be added for all cases, even if much less views would be used.

Also, after finalization of the first version of the standard, changing the NAL unit header is not possible anymore.

The following description describes an extension mechanism of an HEVC decoder or an intermediate device to extend the capabilities of the scalability signaling in order to meet the requirements stated above. Activation and extension data may be signaled in the HEVC high level syntax.

The following, in particular, describes the signaling that indicates than a layer identifier extension mechanism (as describes in the following sections) is enabled in the video bitstream.

Other than for the first and second aspects, a possible implementation of the third concept in HEVC framework is described first, with then describing generalizing embodiments below. The concept allows the occurrence of multiple view components with the same existing layer identifier (cp. nuh_layer_id) within the same access unit. An additional identifier extension is used distinguish between these view components. This extension is not coded in the NAL unit header. Thus it cannot be accessed as easily as in the NAL unit header, but still allows new use cases with many more views. Especially with view clustering (see the description below), the old extraction mechanisms can still be used for extracting groups of views that belong together without any modification.

To extend an existing range of layer identifier values, the invention describes the following mechanisms:

a. A predetermined value of the existing layer identifier is used as a special value (so called "escape code") to indicate that the actual value is determined using an alternative derivation process (in a specific embodiment: a value of the syntax element nuh_layer_id (e.g. maximum value of the layer identifier) in the NAL unit header is used).

b. A flag or index or bit length indication at a higher level syntax structure (e.g. in the slice header syntax or in a video/sequence/picture parameter set extension as given in the following embodiments of the invention) that enables a combination of each value of the existing layer identifier value with another syntax structure.

An activation of the extension mechanism may be implemented as follows.

For a) an explicit activation signaling would not be necessitated, i.e. the reserved escape code could be used to signal usage of the extension ($a_1$). But this would decrease the number of possible layers/views without using the extension by one (the value of the escape code). Thus the switching parameters below can be used for both variants ($a_2$).

The extension mechanism can be enabled or disabled within the bitstream using one or more syntax elements that are persistent over the whole bitstream, the video sequence or parts of the video sequence.

With the variable LayerId denoting the existing layer identifier specific example embodiments of the invention for enabling the extension mechanism are:

Variant I) Variant I is illustrated in FIG. 26. Here, layer_id_ext_flag enables the use of additional LayerId values Variant II) Variant II is illustrated in FIG. 27. Here, layer_id_mode_idc being equal to 1 indicates that the value range of LayerId is extended by using escape code in nuh_layer_id. layer_id_mode_idc equal to 2 indicated that the value range of LayerId is extended by an offset value. layer_id_mode_idc equal to 0 indicates that no extension mechanism is used for LayerId.

Note: different assignments of values to modes are possible.

Variant III) Variant III is illustrated in FIG. 28. Here,
layer_id_ext_len indicates the number of bits used for extending the LayerId range.

The above syntax element serves as indicator for the usage of the layer identifier extension mechanism for the indication of the layer identifier of the corresponding NAL unit or slice data.

In the description below the variable LayerIdExtEnabled is used as a boolean indicator that the extension mechanism has been enabled. The variable is used for easier reference in the description. The variable name example and embodiments of the invention could use different names or use the corresponding syntax elements directly. The variable LayerIdExtEnabled is derived as follows according to the cases above:

For $a_1$), if only a predetermined value of the layer identifier syntax element is used for enabling the layer identifier extension mechanism, the following applies:

```
if ( nuh_layer_id == predetermined value )
    LayerIdExtEnabled = true
else
    LayerIdExtEnabled = false
```

For cases $a_2$) an b), if variant I), i.e. a flag (e.g. layer_id_ext_enable_flag) is used for enabling the layer identifier extension mechanism, the following applies:
LayerIdExtEnabled=layer_id_ext_enable_flag For cases $a_2$) an b), if variant II), i.e. an index (e.g. layer_id_mode_idc) is used for enabling the layer identifier extension mechanism, the following applies:

```
if ( layer_id_mode_idc == predetermined value )
    LayerIdExtEnabled = true
else
    LayerIdExtEnabled = false
```

For cases $a_2$) an b), if variant III), i.e. a bit length indication (e.g. layer_id_ext_len) is used for enabling the layer identifier extension mechanism, the following applies:

```
if ( layer_id_ext_len > 0 )
    LayerIdExtEnabled = true
else
    LayerIdExtEnabled = false
```

For case $a_2$), if a predetermined value is used in combination with an enabling syntax element, the following applies:
LayerIdExtEnabled &=(nuh_layer_id==predetermined value)

The layer identifier extension may be signaled as follows:
If the extension mechanism is enabled (e.g. through signaling as described in the preceding section), a predefined or signaled number of bits (cp. layer_id_ext_len) is used to determine the actual LayerId value. For VCL NAL units the additional bits can be contained in the slice header syntax (e.g. by using the existing extensions) or in an SEI message that is by position in the video bitstream or by an index associated with the corresponding slice data, is used to extend the signaling range of the layer identifier in the NAL unit header.

For non-VCL NAL units (VPS, SPS, PPS, SEI messages) the additional identifier can be added to the specific extensions or also by an associated SEI message.

In further description the specified syntax element is referred to as layer_id_ext regardless of its position in the bitstream syntax. The name is used as an example. The following syntax tables and semantics give examples of possible embodiments.

Signaling of the layer identifier extension in the slice header is exemplified in FIG. 29.

Alternative signaling of the layer identifier extension in the slice header extension is shown in FIG. 30.

An example for a Signaling for video parameter set (VPS) is shown in FIG. 31.

Similar extensions exist for SPS, PPS and SEI messages. The additional syntax element can be added to these extensions in a similar way.

Signaling the layer identifier in an associated SEI message (ex. Layer ID extension SEI message) is illustrated in FIG. 32.

The scope of the SEI message can be determined based on its position in the bitstream. In a specific embodiment of the invention all NAL units between after a Layer ID extension SEI message are associated with the value of layer_id_ext until the beginning of a new access unit or a new Layer ID extension SEI message is received.

Dependent on its position, the additional syntax element may be coded with fixed (here denoted as u(v)) or variable (ue(v)) length codes.

The layer identifiers for a particular NAL unit and/or slice data are then derived by mathematically combining information provided by the layer identifier in the NAL unit header (cp. nuh_layer_id) and the layer identifier extension mechanism (cp. layer_id_ext) depending of the activation of the layer identifier extension mechanism (cp. LayerIdExtEnabled)

A specific embodiment derives the layer identifier, here referred to as LayerId, by using the existing layer identifier (cp. nuh_layer_id) as most significant bits, and the extension information as least significant bits as follows:

```
if ( LayerIdExtEnabled == true)
    LayerId = (nuh_layer_id << layer_id_ext_len) + layer_id_ext
else
    LayerId = nuh_layer_id
```

This signaling scheme allows signaling more different LayerId values with a small range of layer_id_ext values in case b) where nuh_layer_id can represent different values. It also allows clustering of specific views, i.e. views that are located close together could use the same value of nuh_layer_id to indicate that they belong together, see FIG. 33.

Figure 33:
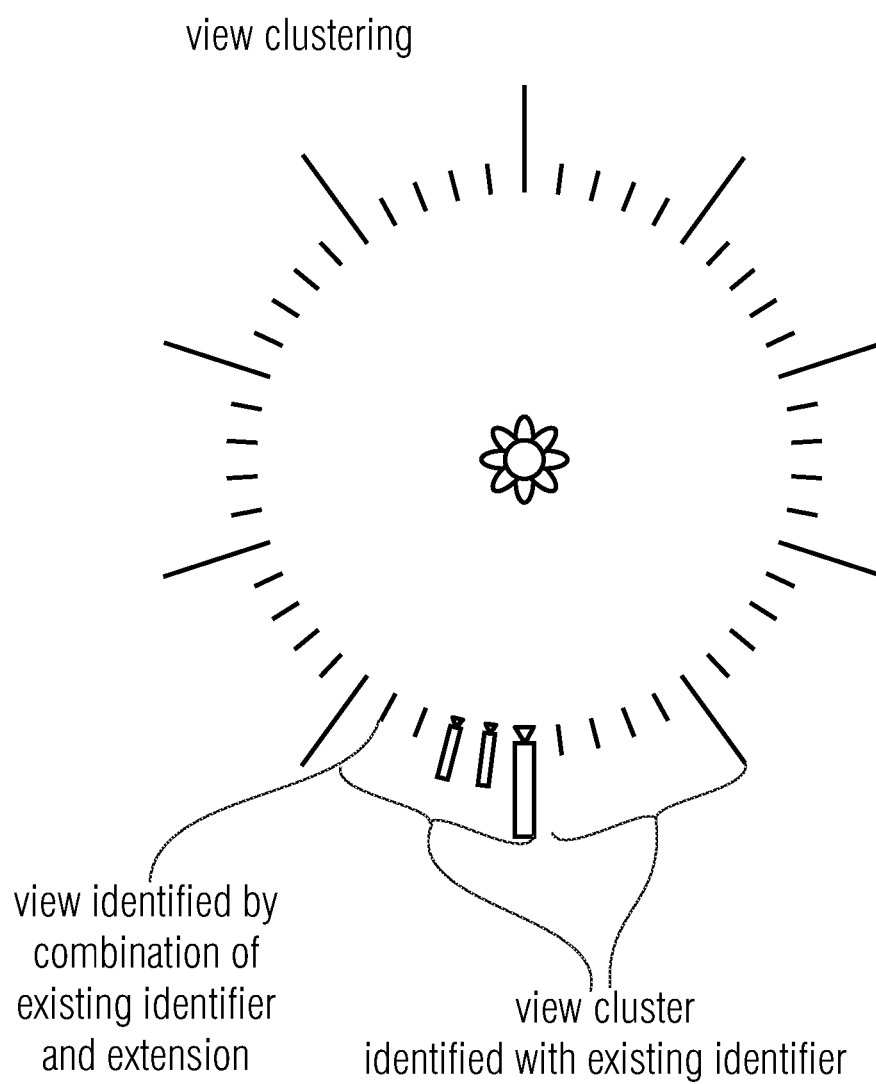
FIG. 33 schematically illustrates a camera setup in order to illustrate a possibility of combining the layer identification syntax element with the layer identification extension in accordance with an embodiment.

FIG. 33 illustrates a constitution of view clusters where all NAL units associated with a cluster (i.e. a group of views of physically close cameras) have the same value of nuh_layer_id and unequal values of layer_id_ext. Alternatively, the syntax element layer_id_ext may be used in another embodiment of the invention to constitute clusters accordingly and nuh_layer_id may serve to identify views within a cluster.

Another embodiment of the invention derives the layer identifier, here referred to as LayerId, by using the existing layer identifier (cp. nuh_layer_id) as least significant bits, and the extension information as most significant bits as follows:

```
if ( LayerIdExtEnabled == true)
    LayerId = (layer_id_ext << 6) + nuh_layer_id
else
    LayerId = nuh_layer_id
```

This signaling scheme allows signaling with clustering of specific views, i.e. views of cameras that are physically located far from each other could use the same value of nuh_layer_id to indicate that they utilize the same prediction dependencies with respect to views of cameras with the same value of nuh_layer_id in a different cluster (i.e. value of layer_id_ext in this embodiment).

Another embodiment uses an additive scheme to extend the range of LayerId (maxNuhLayerId referring to the maximum allowed value of the existing layer identifier range (cp. nuh_layer_id):

```
if ( LayerIdExtEnabled == true)
    LayerId = maxNuhLayerId + layer_id_ext
else
    LayerId = nuh_layer_id
```

This signaling scheme is especially useful in case a) where a pre-defined value of nuh_layer_id is used to enable the extension. For instance the value of maxNuhLayerId could be used as the pre-defined escape code to allow a gapless extension of the LayerId value range.

In context of the a draft of Test Model of the 3D video coding extension of HEVC as described early draft versions of [3], a possible embodiment is described in the following paragraphs.

In Section G.3.5 of early versions of [3] a view component is defined as follows.

view component: A coded representation of a view in a single access unit A view component may contain a depth view component and a texture view component.

The mapping of depth and texture view components has been defined in the VPS extension syntax based on the existing layer identifier (cp. nuh_layer_id). This invention adds the flexibility to map the additional layer identifier value range. An exemplary syntax is shown in FIG. 34. Changes to existing syntax are highlighted using shading.

If the layer identifier extension is used, VpsMaxLayerId is set equal to vps_max_layer_id, otherwise it is set equal to vps_max_ext_layer_id If the layer identifier extension is used, VpsMaxNumLayers is set to the maximum number of layers that can be encoded using the extension (either by a pre-defined number of bits or based on layer_id_ext_len), otherwise VpsMaxNumLayers is set to vps_max_layers_minus1+1 vps_max_ext_layer_id is the maximum used LayerId value.

layer_id_in_nalu[i] specifies the value of the LayerId value associated with VCL NAL units of the i-th layer. For i in a range from 0 to VpsMaxNumLayers−1, inclusive, when not present, the value of layer_id_in_nalu[i] is inferred to be equal to i.

When i is greater than 0, layer_id_in_nalu[i] shall be greater than layer_id_in_nalu[i−1].

When splitting_flag is equal to 1, the MSBs of layer_id_in_nuh should be necessitated to be 0 if the total number of bits in segments is less than 6.

For i in a range from 0 to vps_max_layers_minus1, inclusive, the variable LayerIdInVps[layer_id_in_nalu[i]] is set equal to i.

dimension_id[i][j] specifies the identifier of the j-th present scalability dimension type of the i-th layer. When not present, the value of dimension_id[i][j] is inferred to be equal to 0. The number of bits used for the representation of dimension_id[i][j] is dimension_id_len_minus1[j]+1 bits. When splitting_flag is equal to 1, it is a requirement of bitstream conformance that dimension_id[i][j] shall be equal to ((layer_id_in_nalu[i] & ((1−dimBitOffset[j+1])−1))−dimBitOffset[j]).

The variable ScalabilityId[i][smIdx] specifying the identifier of the smIdx-th scalability dimension type of the i-th layer, the variable ViewId[layer_id_in_nuh[i]] specifying the view identifier of the i-th layer and DependencyId[layer_id_in_nalu[i]] specifying the spatial/SNR scalability identifier of the i-th layer are derived as follows:

```
for (i = 0; i < VpsMaxNumLayers; i++) {
    for( smIdx= 0, j =0; smIdx< 16; smIdx ++ )
        if( ( i ! = 0 ) && scalability_mask[ smIdx ] )
            ScalabilityId[ i ][ smIdx ] = dimension_id[ i ][ j++ ]
        else
            ScalabilityId[ i ][ smIdx ] = 0
    ViewId[ layer_id_in_nalu[ i ] ] = ScalabilityId[ i ][ 0 ]
    DependencyId [ layer_id_in_nalu[ i ] ] = ScalabilityId[ i ][ 1 ]
}
```

In Section 2 of early versions of [3] it is described that corresponding depth view and texture components of a specific camera can be distinguished from other depth view and texture by their scalability identifiers view order index (cp. ViewIdx) and depth flag (cp. DepthFlag) that are derived as follows in Section NAL unit header semantics of early versions of [3]

ViewIdx=layer_id−1

DepthFlag=layer_id % 2

Therefore, individual view components (i.e. texture and depth view component of a specific camera) have to be packetized into NAL units with individual values of layer_id to be distinguishable, e.g. in the decoding process in section G.8 of early versions of 0 via the value of variable ViewIdx.

The just outlined concept allows using the same value of the layer identifier in the NAL unit header (cp. nuh_layer_id) for different views. Thus the derivation of the identifiers ViewIdx and DepthFlag need to be adapted to use the previously derived extended view identifier as follows:

ViewIdx=LayerId>>1

DepthFlag=LayerId % 2

A generalized embodiment of the third aspect is described below with respect to FIG. 35, which shows a decoder 800 configured to decode a multi-layered video signal. The decoder may be embodied as outlined above with respect to FIG. 2, 9 or 18. That is, examples for a more detailed explanation of decoder 800 of FIG. 35 in accordance with a certain embodiment may be obtained using the above outlined aspects and embodiments thereof. In order to illustrate this possible overlap between the above outlined aspects and their embodiments and the embodiment of FIG. 35, the same reference sign is, for example, used for the multi-layered video signal 40 in FIG. 35. As to what the multiple layers of the multi-layered video signal 40 could be, reference is made to the statements brought forward above with respect to the second aspect.

Figure 35:
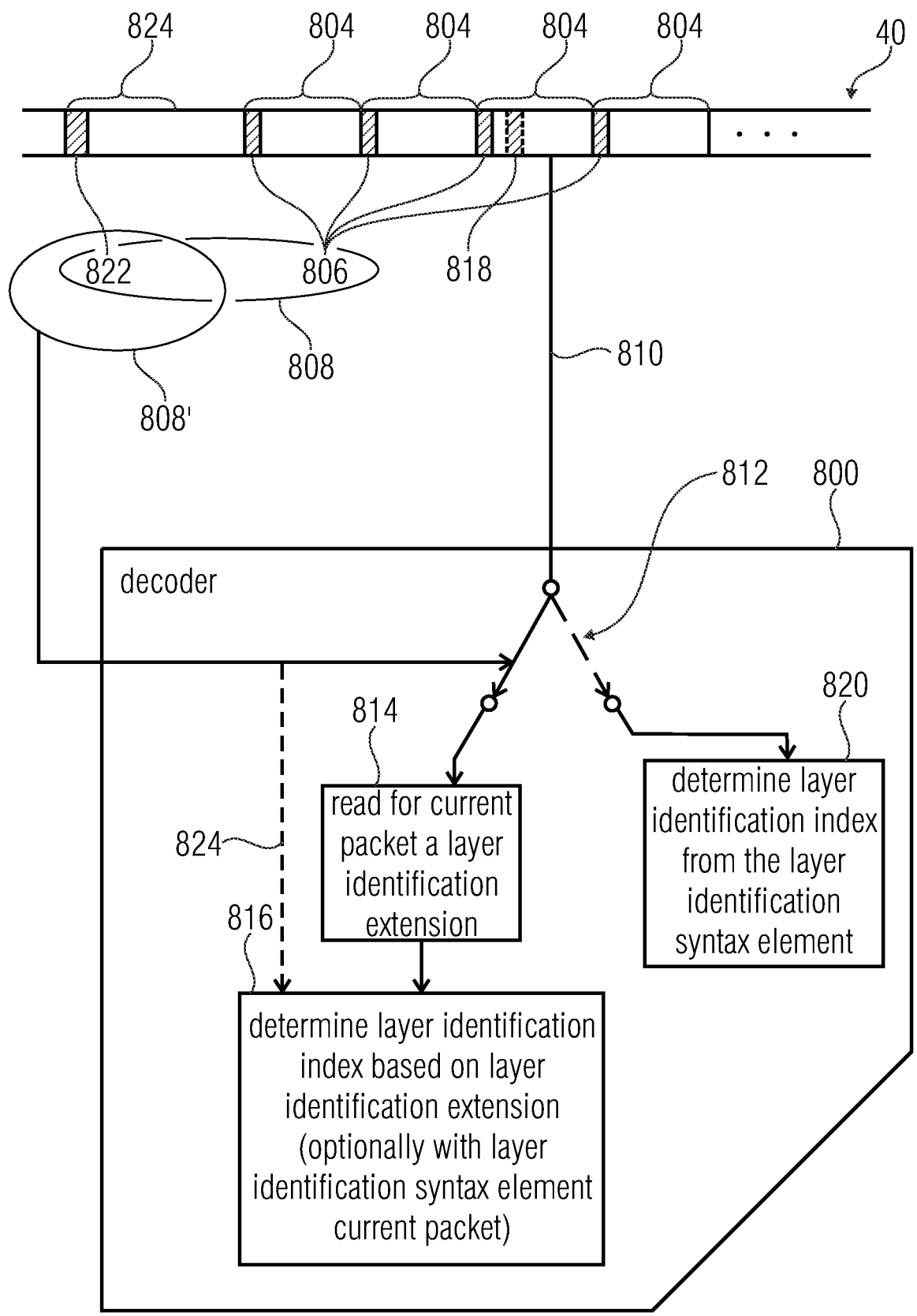
FIG. 35 shows a schematic diagram of a decoder configured to process a multi-layered video data stream provided with signaling concerning the layers of the data stream, the arrangement of these layers within a dependency space the dependencies between the layers, respectively.

As shown in FIG. 35, the multi-layered video signal is composed of a sequence of packets 804, each of which comprises a layer identification syntax element 806, embodied using syntax element nuh_layer_id in the above outlined specific HEVC extension example. The decoder 800 is configured to be responsive to a layer identification extension mechanism signaling in the multi-layer video signal 40 which, as outlined further below, may partially involve the layer identification syntax elements themselves. The layer identification extension mechanism signaling 808 is sensed by decoder 800 which, responsive to signaling 808, acts as follows for a predetermined packet among packets 804 with such predetermined packet being illustrated as entering decoder 800 using an arrow 810. As illustrated using a switch 812 of decoder 800, controlled via the layer identification extension mechanism signaling 808, decoder 800 reads at 814, for the predetermined packet 810, a layer identification extension from the multi-layer data stream 40, and determines 816 the layer identification index of the current packet 810 using this layer-identification extension. The layer-identification extension read at 814 if signaling 808 signals deactivation of the layer-identification extension mechanism, may be comprised by the current packet 810 itself as illustrated at 818, or may be positioned elsewhere within data stream 40, but in a manner associatable with current packet 810. Thus, if the layer-identification extension mechanism signaling 808 signals activation of the layer identification extension mechanism, decoder 800 determines the layer identification index for the current packet 810 according to 814 and 816. However, if the layer identification extension mechanism signaling 808 signals the inactivation of the layer identification extension mechanism, decoder 800 determines 820 the layer identification index of the predetermined packet 810 from the layer identification syntax element 806 of the current packet 810 solely. In that case, the layer identification extension 818, i.e. its presence within signal 40, is unnecessitated, i.e. it is not present.

In accordance with an embodiment, the layer identification syntax element 806 contributes to the layer identification extension mechanism signaling 808 in a per packet sense: as far as each packet such as current packet 810 is concerned, the fact whether layer identification extension mechanism signaling 808 signals activation or deactivation of the layer identification extension mechanism, is determined by decoder 800, at least partially, dependent on whether the layer identification syntax element 806 of the respective packet 810 assumes an escape value or not. A high-level syntax element 822 comprised by the data stream 40 within a certain parameter set 824, for example, may rather macroscopically, or with respect to a higher scope, contribute to the layer identification extension mechanism signaling 808, i.e. the same signals activation or deactivation of the layer identification extension mechanism. In particular, decoder 800 may be configured to determine whether the layer identification extension mechanism signaling 808 signals activation or deactivation of the layer identification extension mechanism for the predetermined packet 810 primarily depending on the high level syntax element 822: if the high level syntax element assumes a first state, the layer identification extension mechanism is signaled by signaling 808 to be deactivated. Referring to the above outlined embodiments, this relates to layer_id_ext_flag=0, layer_id_mode_idc=0 or layer_id_ext_len=0. In other words, in the above specific syntax examples, layer_id_ext_flag, layer_id_ext idc and layer_id_ext_len represented examples for the high level syntax element 822, respectively.

With respect to a certain packet, such as packet 810, this means that decoder 800 determines that the level-identification extension mechanism signaling 808 signals the activation of the level identification extension mechanism for packet 810 if both the high level syntax element 822 assumes a state different from the first state, and the layer identification syntax element 806 of that packet 810 assumes the escape value. If, however, the high level syntax element 822, valid for packet 810, assumes the first state, or the layer identification element 806 of that packet 810 assumes a value different from the escape value, then the decoder 800 determines the deactivation of the layer identification extension mechanism to be signaled by signaling 808.

Rather than having merely two possible states, as outlined in the above syntax examples, the high level syntax element 822 may, beyond the deactivation state, i.e. first state, comprise more than one further state which the high level syntax element 824 may possibly assume. Depending on these possible further states, the determination 816 may vary as indicated using dashed line 824. For example, in the above syntax example, the case that layer_id_mode_idc=2 showed that the determination 816 possibly results in decoder 800 concatenating digits representing the layer identification syntax element 806 of packet 810 and digits representing the layer identification extension so as to obtain the layer identification index of packet 810. Differing therefrom, the example case of layer_id_len≠0 showed that the determination 816 possibly results in decoder 800 performing the following: decoder 800 determines a length n of the layer identification extension 818 associated with packet 810 using the high level syntax element and concatenates digits representing the layer identification syntax element 806 of packet 810 and n digits representing the level identification extension 818 of packet 810 so as to obtain the level identification index of the predetermined packet. Even further, the determination 816 could involve adding the level identification extension 818 associated with packet 810 to a predetermined value which could, for example, correspond to a number exceeding the maximally representable states of the layer-identification syntax element 806 (less the escape value) so as to obtain the layer identification index of the predetermined packet 810.

As indicated using 808' in FIG. 34, it is however also feasible to exclude the layer identification syntax element 806 of packets 810 from contributing to the layer identification extension mechanism signaling 808 so that the whole representable values/states of syntax element 806 remain and none of them are to be reserved as an escape code. In that case, signaling 808' indicates to the decoder 800 whether, for each packet 810, a layer identification extension 818 is present or not, and accordingly whether the layer identification index determination follows 814 and 816 or 820.

An encoder fitting to the decoder of FIG. 35, simply forms the data stream accordingly. The encoder decides on using the extension mechanism or not, depending on the number of layers which is, for example, to be encoded into the data stream.

The fourth aspect of the present application is concerned with a dimension dependent direct dependency signaling.

In current HEVC extensions ([2], [3], [4]) a coding layer can utilize zero or more reference coding layers for the prediction of data. Each coding layer is identified by a unique nuh_layer_id value, which can be bijectively mapped to a layerIdInVps value. layerIdInVps values are consecutive and when a layer with layerIdinVps equal to A is referenced by a layer with layerIdInVps B it is a requirement of bitstream conformance that A is less than B.

For each coding layer within the bitstream reference coding layers are signalled in a video parameter set. Therefore a binary mask is transmitted for each coding layer. For a coding layer with layerIdInVps value of b the mask (denoted as direct_dependency_flag[b]) consist of b−1 bits. When the layer with layerIdinVps equal to x is a reference layer of the layer with layerIdinVps equal to b the x-th bit in the binary mask (denoted as direct_dependency_flag[b][x]) is equal to 1. Otherwise, when the layer with layerIdinVps equal to x is not a reference layer of the layer with layerIdinVps equal to B the value of direct_dependency_flag[b][x] is equal to 0.

After parsing all direct_dependency_flags, for each coding layer a list is created including the nuh_layer_id values of all reference layers, as specified by the direct_dependency_flags.

Moreover information is signaled in the VPS that allows to map each layerIdinVps value to a position in an T-dimensional scalability space. Each dimension t represents a type of scalability, which could be e.g. view scalability, spatial scalability or indication of depth maps.

Figure 36:
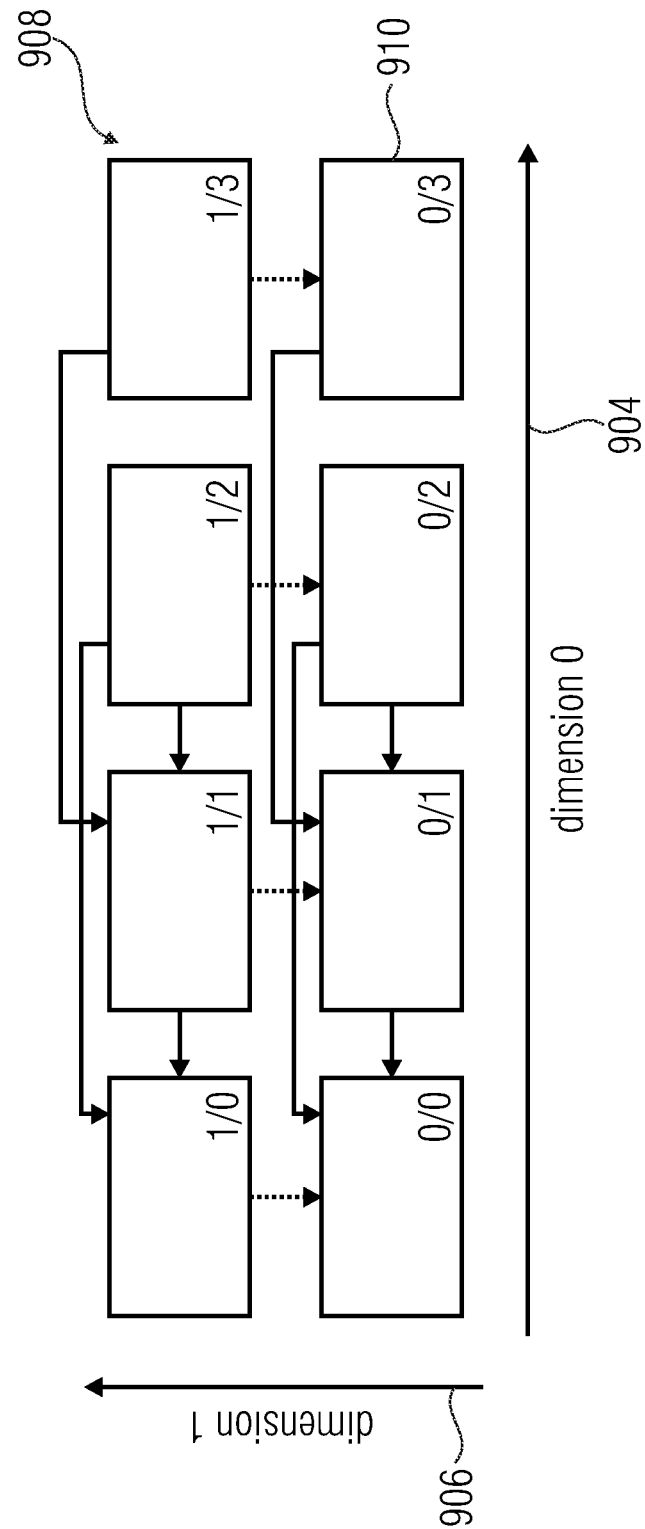
FIG. 36 shows a schematic diagram illustrating the dependency space, here a direct dependency structure of layers in a two-dimensional space with each dimension in the space using a particular prediction structure.
Figure 37:
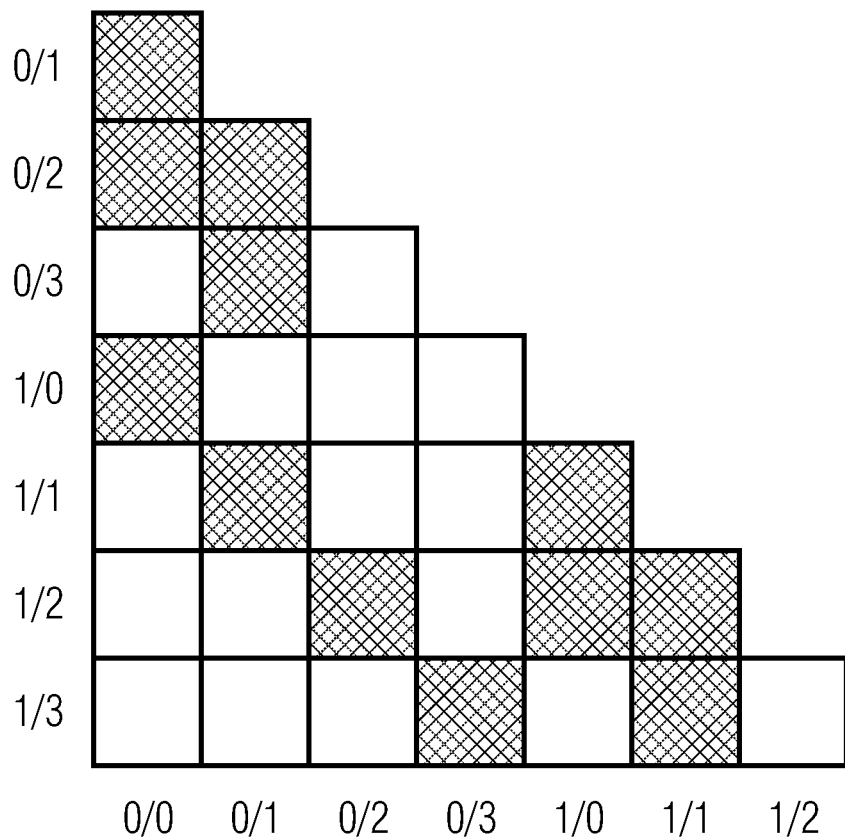
FIG. 37 shows a schematic diagram of an array of direct dependency flags specifying dependencies between different layers.

By signaling one bit for each possible dependency, the current design offers maximal flexibility. However, this flexibility comes with some shortcomings:

1. It is a common use case that for each scalability dimension a particular dependency structure is utilized. Moreover direct inter-dimension dependencies are not common and might be disallowed.
   An example for a common layer setup is depicted in FIG. 36. Here dimension 0 might be a view scalability dimension, utilizing a kind of hierarchical prediction structure. Dimension 1 might be a spatial scalability dimension using an IP structure. The direct_dependency_flags related to the depicted setup are shown in FIG. 37.
   A drawback of the current solution is that it is not straight forward to identify such dimension dependent dependencies from the current VPS design, since this would necessitate an algorithmically complex analysis of the direct_dependency_flags.
2. Even when only one scalable dimension type is utilized identical structures are commonly used for subsets of layers. For the case of only e.g. view scalability, views might be mapped to a space spanned by horizontal and vertical camera positions. An example for such a scenario is depicted in FIG. 36, where dimension 0 and 1 are interpreted as horizontal and vertical camera position dimensions.
   Although it is common practice to use one prediction structures for each camera position dimension, the current VPS design cannot exploit redundancies resulting from this. Moreover there is no direct indication in the current VPS design that dependencies are dimension dependent.
3. The number of direct_dependency_flags is proportional to the squared number of layers in the bitstream, hence in current worst case with 64 layers about 64*63/2=2016 bit are necessitated. Moreover when the maximal number of layers in the bitstream is extended, this results in a drastically increased number of bits.

The shortcomings described above may be resolved by enabling explicit signaling of dependencies for each dimension t of a T-dimensional dependency space.

The dimension dependent direct dependency signaling provides following benefits:

1. Dependencies for each dependency dimension are directly available in the bitstream and a complex analysis of direct_dependency_flags is not needed.
2. The number of bits necessitated for signaling dependencies can be reduced.

In an embodiment the dependency space could be e.g. identical to the scalability space as described in current MV- and scalable draft [2]. In another embodiment the dependency space could be explicitly signaled and could e.g. be also a space spanned by camera positions.

Figure 38:
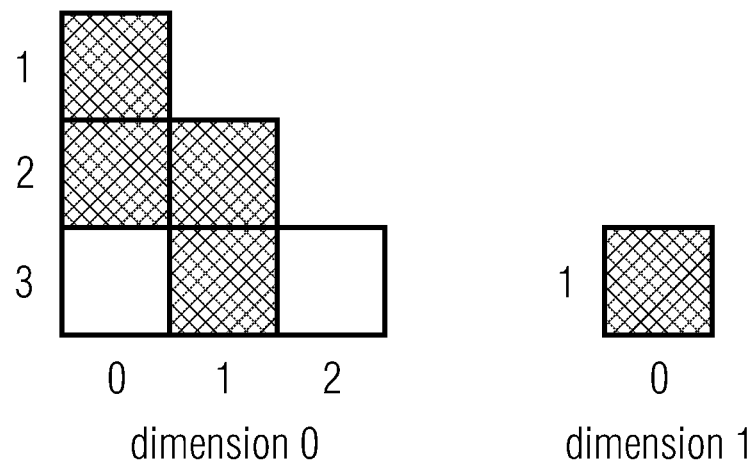
FIG. 38 shows a schematic diagram of two arrays of direct position dependency flags specifying dependencies between different positions and different dimensions.

An example for dimension dependent dependency signaling is given in FIG. 38. It can be seen that dependencies between dimensions can be directly derived from the binary masks and that amount of necessitated bits is reduced.

In the following it is assumed that each layerIdInVps value is bijectively mapped into a T-dimensional dependency space, with dimensions $0, 1, 2, \ldots, (T-1)$. Hence each layer has an associated vector $(d_0, d_1, d_2, \ldots, d_{T-1})'$ with $d_0, d_1, d_2, \ldots, d_{T-1}$, specifying the positions in the corresponding dimensions $0, 1, 2, \ldots, (T-1)$.

The basic idea is a dimension dependent signaling of layer dependencies. Hence for each dimension $t \in \{0, 1, 2 \ldots (T-1)\}$ and each position $d_t$ in dimension t a set $Ref(d_t)$ of reference positions in dimension t is signalled. The reference position sets are utilized to determine direct dependencies between the different layers, as described in the following:

A layer with position $d_t$ in dimension t and positions $d_x$ in dimensions x with $x \in \{0, 1, 2 \ldots (T-1)\} \setminus \{t\}$ depends on a layer with position $d_{t,Ref}$ in dimension t and positions $d_x$ in dimensions x with $x \in \{0, 1, 2 \ldots (T-1)\} \setminus \{t\}$, when $d_{t,Ref}$ is an element in $Ref(d_t)$.

In another particular embodiment all dependencies are inversed, hence positions in $Ref(d_t)$ indicate the positions of layers in dimension t that depend on layers at position $d_t$ in dimension t.

As far as the signaling and derivation of the dependency space is concerned, the signaling described below could be done e.g in the VPS, SPS in an SEI message or in other places in the bitstream.

As to the number of dimensions and number of positions in a dimension, the following is noted. A dependency space is defined with a particular number of dimensions and particular number of positions in each dimension.

Figures 39, 40:
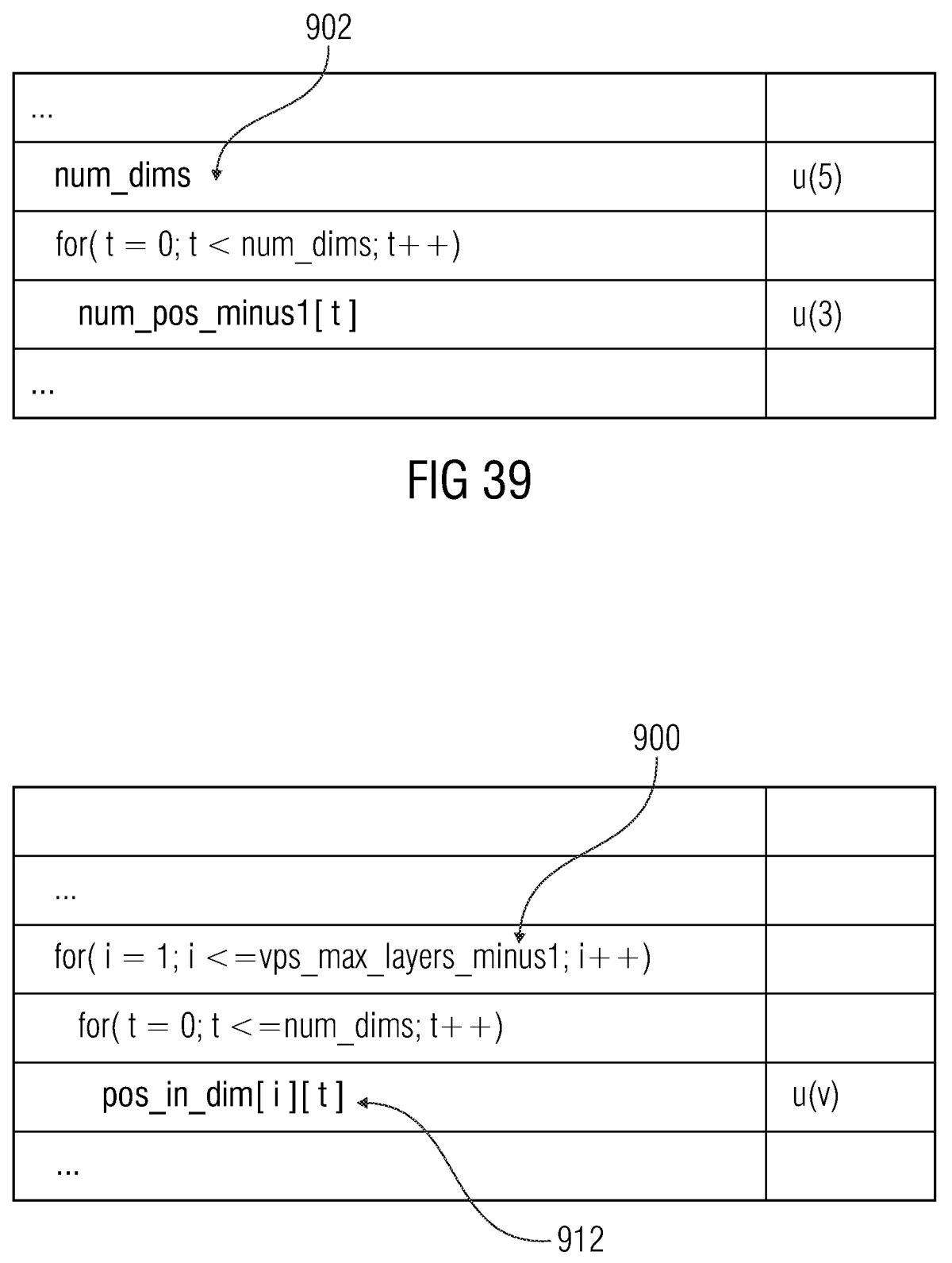

In a particular embodiment the number of dimensions num_dims and number num_pos_minus1[t] of positions in dimension t could be explicitly signaled as shown e.g., in FIG. 39.

In another embodiment the value of num_dims or the values of num_pos_minus1 could be fixed and are not be signaled in the bitstream.

In another embodiment the values of num_dims or the values of num_pos_minus1 could be derived from other syntax elements present in the bitstream. More specifically in the current HEVC extension design, the number of dimensions and number of positions in a dimension could be equal to the number of scalability dimensions and the length of the scalability dimension, respectively.

Hence (with NumScalabilityTypes and dimension_id_len_minus1[t] as defined in [2]:

num_dims=NumScalabilityTypes num_pos_minus1[t]=dimension_id_len_minus1[t]

In another embodiment it could be signaled in the bitstream whether the values of num_dims or the values of num_pos_minus1 are signaled explicitly or are derived from other syntax elements present in the bitstream.

In another embodiment the value of num_dims could be derived from other syntax elements present in the bitstream and then increased by additional signaling of a split of one or more dimensions or by signaling additional dimension.

As to the mapping of layerIdInVps to the position in the dependency space, it is noted that layers are mapped to the dependency space.

In a particular embodiment a syntax element pos_in_dim [i][t] specifying the position of a layer with layerIdinVps value i in dimension t could e.g. be explicitly transmitted. This is illustrated in FIG. 40.

In another embodiment the value of pos_in_dim[i][t] is not be signaled in the bitstream, but directly derived from the layerIdInVps value i as e.g.

```
idx = i
dimDiv[ 0 ] = 1
for ( t = 0; t < T - 1 ; t++ )
    dimDiv[ t + 1 ] = dimDiv[ t ] * ( num_pos_minus1[ t ] + 1 )
for ( t = T - 1 ; t >= 0; t - - ) {
    pos_in_dim[ i ][ t ] = idx / dimDiv[ t ]        // integer devision
    idx = idx - pos_in_dim[ i ][ t ] * dimDiv[ t ]
}
```

Specifically for the current HEVC extension design the above described might replace the current explicit signaling of dimension_id[i][t] values.

In another embodiment the value of pos_in_dim[i][t] is derived from other syntax elements in the bitstream. More specifically in the current HEVC extension design, the values of pos_in_dim[i][t] could be derived e.g. from the dimension_id[i][t] values.

pos_in_dim[i][t]=dimension_id[i][t]

In another embodiment it could be signaled, whether pos_in_dim[i][t] is explicitly signaled or derived from other syntax elements.

In another embodiment it could be signaled whether pos_in_dim[i][t] values are signaled explicitly in addition to pos_in_dim[i][t] values derived from other syntax elements present in the bitstream.

As to the signaling and derivation of dependencies, the following is used.

Figure 41:
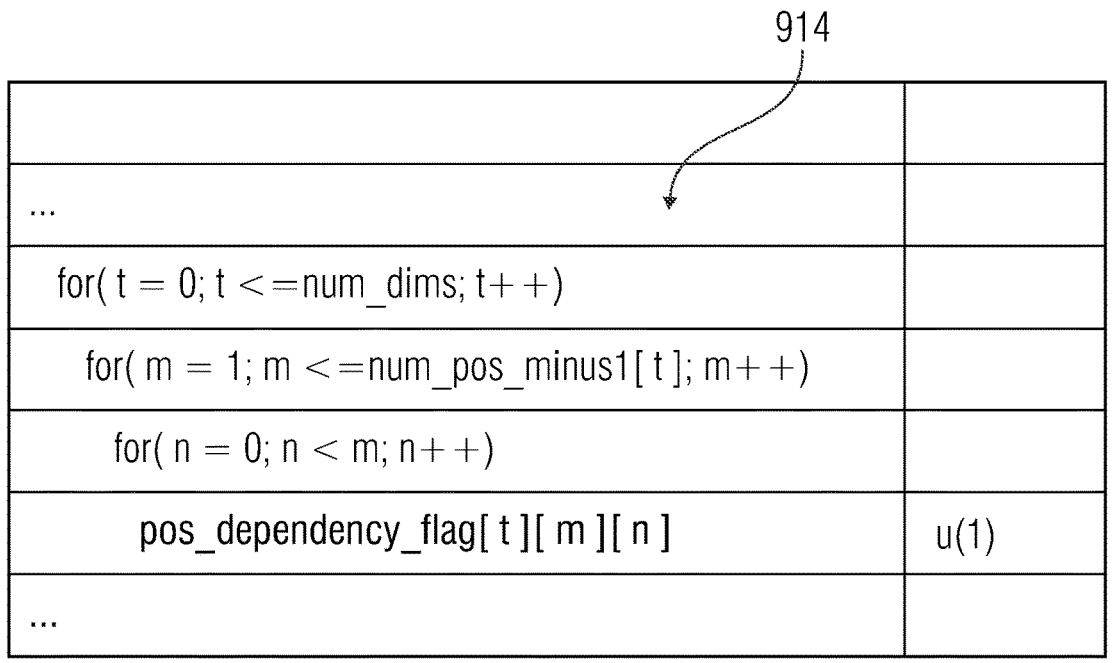
FIG. 41 shows a portion out a data stream illustrating a possibility of defining the second syntax structure describing the dependencies dependency-dimension wise.

The use of direct position dependency flags is subject of the following embodiment. In this embodiment reference positions are signaled by e.g. a flag pos_dependency_flag [t][m][n] indicating whether the position n in dimension t is included in the reference position set of the position m in dimension t, as e.g. specified in FIG. 41.

In an embodiment which uses reference position sets, the variable num_ref_pos[t][m] specifying the number of reference positions in dimension t for the position m in dimension t and the variable ref_pos_set[t][m][j] specifying the j-th reference position in dimension t for the position m in dimension t can, then be derived as e.g.:

```
for( t = 0; t <= num_dims; t++ )
    for( m = 1; m <= num_pos_minus1[ t ]; m++ )
        num_ref_pos[ t ][ m ] = 0
        for( n = 0; n < m; n++ ) {
            if ( pos_dependency_flag[ t ][ m ][ n ] = = true ) {
                ref_pos_set[ t ][ m ][ num_ref_pos[ t ][ m ] ] = n
                num_ref_pos[ t ][ m ] ++
            }
        }
```

Figure 42:
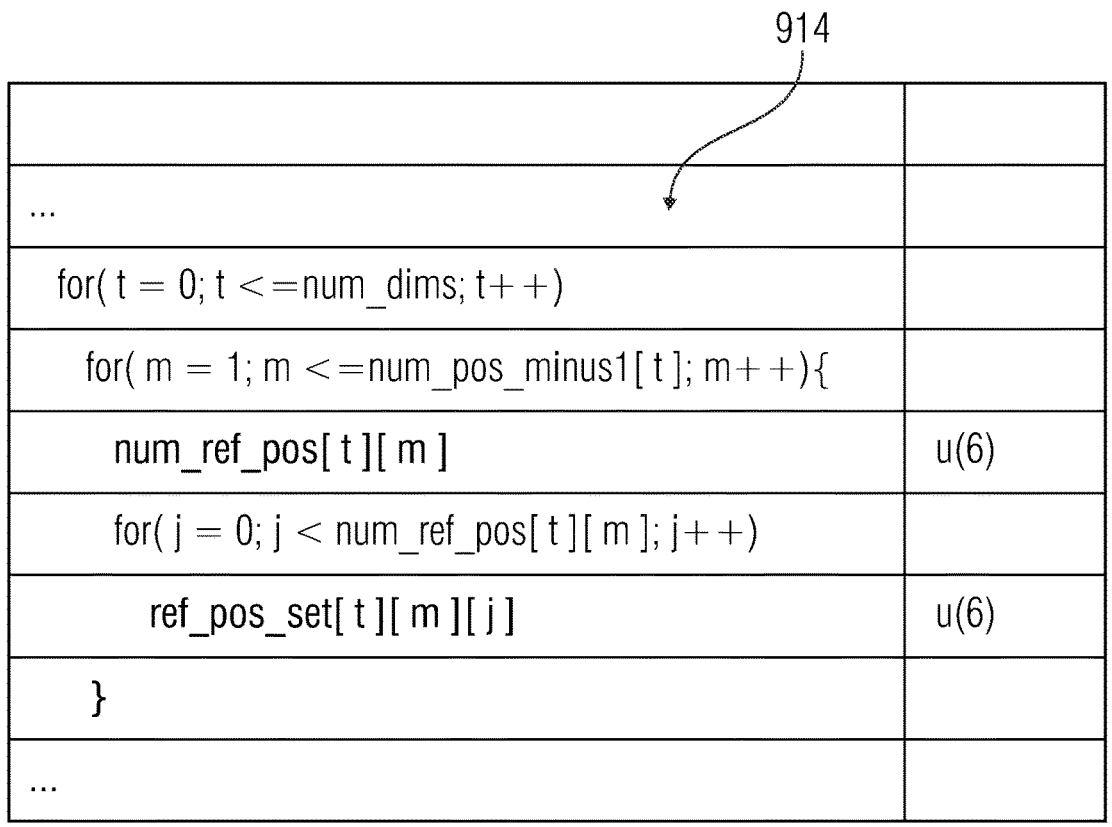
FIG. 42 shows another possibility of defining the second syntax structure.

In another embodiment elements of the reference positions set could be signaled directly, as e.g. specified in FIG. 42.

In an embodiment using direct_dependency_flags, direct dependencies flag directDependencyFlag[i][j] specifying that the layer with layerIdinVps equal to i depends on the layer with layerIdinVps equal to j might be derived from the reference positions sets. The might be done as specified e.g. in the following:

The function posVecToPosIdx(posVector) with a vector posVector as input derives an index posIdx related to the position posVector in the dependency space as specified in the following:

```
for ( t = 0, posIdx = 0, offset = 1; t < num_dims; t++) {
    posIdx = posIdx + offset * posVector[ t ]
    offset = offset * ( num_pos_minus1[ t ] + 1 );
}
```

A variable posIdxToLayerIdInVps[idx] specifying layerIdinVps value i depending on an index idx derived from pos_in_dim[i], can e.g. be derived as specified in the following:

for (i=0; i<vps_max_layers_minus1; i++)
    posIdxToLayerIdInVps[posVecToPosIdx(pos_in_dim [i])]=i The variable directDependencyFlag[i][j] is derived as specified in the following:

```
for (i = 0; i <= vps_max_layers_minus1; i++) {
    for (k = 0; k < i; k++)
        directDependencyFlag[ i ][ k ] = 0
    curPosVec = pos_in_dim[ i ]
    for (t = 0; t < num_dims; t++) {
        for (j = 0; j < num_ref_pos[ t ][ curPosVec[ t ] ]; j++) {
            refPosVec = curPosVec
            refPosVec[ t ] = ref_pos_set[ t ][ curPosVec[ t ] ][ j
            ]
            directDependencyFlag[ i ][ posIdxToLayerIdInVps[
                posVecToPosIdx( refPosVec ) ] ]
                = 1
        }
    }
}
```

In an embodiment direct dependencies flag directDependencyFlag[i][j] specifying that the layer with layerIdInVps equal to i depends on the layer with layerIdInVps equal to j might be derived directly from pos_dependency_flag[t][m][n] flags. As e.g. specified in following:

```
for (i = 1; i <= vps_max_layers_minus1; i++) {
    curPosVec = pos_in_dim[ i ];
    for (j = 0; j < i; j++) {
        refPosVec = pos_in_dim[ j ]
        for (t = 0, nD = 0; t < num_dims; t++)
            if ( curPosVec[ t ] ! = refPosVec[ j ][ t ] ) {
                nD ++
                tD = t
            }
        if ( nD = = 1 )
            directDependencyFlag[ i ][ j ] =
                pos_dependency_flag[ tD ][ curPosVec[ tD ] ][ refPosVec[ tD ] ]
        else
            directDependencyFlag[ i ][ j ] = 0
    }
}
```

In an embodiment using reference layers sets the variable NumDirectRefLayers[i] specifying the number of reference layers for the layer with layerIdInVps equal to i and the variable RefLayerId[i][k] specifying the value of layerIdInVps of the k-th reference layer, might be derived as e.g. specified in following:

```
for( i = 1; i <= vps_max_layers_minus1; i++ )
    for( j = 0, NumDirectRefLayers[ i ] = 0; j < i; j++ )
        if( directDependencyFlag[ i ][ j ] = = 1 )
            RefLayerId[ i ][ NumDirectRefLayers[ i ]++ ] =
                layer_id_in_nuh[ j ]
```

In another embodiment reference layers can be directly derived from the reference position sets, without deriving the directDependencyFlag values, as e.g. specified in the following:

```
for (i = 0; i <= vps_max_layers_minus1; i++) {
    NumDirectRefLayers[ i ] = 0
    curPosVec = pos_in_dim[ i ]
    for (t = 0; t < num_dims; t++) {
        for (j = 0; j < num_ref_pos[ t ][ curPosVec[ t ] ]; j++) {
            refPosVec = curPosVec
            refPosVec[ t ] = ref_pos_set[ t ][ curPosVec[ t ] ][ j ]
            m = posIdxToLayerIdInVps[ posVecToPosIdx( refPosVec )
            ]
            RefLayerId[ i ][ NumDirectRefLayers[ i ]++ ] =
            layer_id_in_nuh[ m ]
        }
    }
}
```

In another embodiment reference layers might be directly derived from the pos_dependency_flag variables, without deriving the ref_pos_set variables.

Thus, the figures discussed above illustrate a data stream according to the fourth aspect and reveal a multi-layered video data stream into which video material is coded at different levels of information amount, namely LayerId-InVps in number, using inter-layer prediction. The levels have a sequential order defined thereamong. For example, they follow the sequence 1 ... vps_max_layers_minus1. For example, see FIG. 40. Here, the number of layers within the multi-layered video data stream is given at 900 by vps_max_layers_minus1.

The video material is coded into the multi-layered video data stream so that no layer depends, via the inter-layer prediction, from any layer being subsequent in accordance with the sequential order. That is, using the numbering from 1 to vps_max_layers_minus1, layer i may merely depend on layers j<i.

Each layer which depends, via the inter-layer prediction, from one or more of the other layers, increases an information amount at which the video material is coded into the one or more other layers. For example, the increase pertains spatial resolution, number of views, SNR accuracy or the like or other dimension types.

The multi-layered video data stream comprises at, for example, VPS level a first syntax structure. In the above examples, num_dims may be comprised by the first syntax structure as shown at 902 in FIG. 39. Accordingly, the first syntax structure defines a number M of dependency dimensions 904 and 906. In FIG. 36, it is exemplarily 2, the one leading horizontally, the other vertically. In this regard, reference is made to item 2 above: the number of dimensions is not necessarily equal to the number of different dimension types in terms of which the levels increase the information amount: The number of dimensions may be higher, for example, with differentiating, for example, between vertical and horizontal view shifts. The M dependency dimensions 904 and 906 which span the dependency space 908 are exemplarily shown in FIG. 36.

Further, the first syntax structure defines a maximum number $N_i$, e.g. num_pos_minus1, of rank levels per dependency dimension i, thereby defining $$\prod_i N_i$$

available points 910 in the dependency space 908. In case of FIG. 36, there are 4 times 2 available points 910 with the latter being illustrated by the rectangles in FIG. 36. Further, the first syntax structure defines a bijective mapping 912 (see FIG. 40) which, in the above example, is defined by pos_in_dim[i][t] or implicitly. The bijective mapping 40 maps each level, i.e. i in FIG. 40, onto a respective one of at least a subset of the available points 910 within the dependency space 908. pos_in_dim[i][t] is the vector pointing for level i to available point 910 by its components pos_in_dim[i][t] with t scanning the dimensions 904 and 906. The subset is, for example, a proper subset in case of vps_max_layers_minus1 being smaller than $$\prod_i N_i.$$

For example, the levels actually used and having the dependency order defined thereamong, may be mapped onto less than the eight available points in FIG. 36.

Per dependency dimension i, the multi-layered video data stream comprises at, for example, the VPS level, a second syntax structure 914. In the above example, same encompasses pos_dependency_flag[t][m][n] or num_ref_pos[t][m] plus ref_pos_set[t][m][j]. The second syntax structure 914 describes, per dependency dimension i, a dependency among the $N_i$ rank levels of dependency dimensions i. The dependency is illustrated in FIG. 36 by all horizontal or all vertical arrows between the rectangles 910.

All in all, by this measure, the dependencies between the available points in the dependency space are defined in a manner restricted such that all of these dependencies run parallel to a respective one of the dependency axes and point from higher to lower rank levels, with, for each dependency dimension, the dependencies parallel to the respective dependency dimension being invariant against a cyclic shift along each of the dependency dimensions other than the respective dimension. See FIG. 36: all horizontal arrows between rectangles of the upper line of rectangles is duplicated in the lower row of rectangles, and the same applies to the vertical arrows with respect to the four vertical columns of rectangles with the rectangles corresponding to available points and the arrows corresponding to the dependencies thereamong. By this measure, via the bijective mapping, the second syntax structure defines, concurrently, the dependencies between the layers.

A network entity such as decoder or mane such as an MME, may read the first and second syntax structure of the data stream, and determine the dependencies between the layers based on the first and second second syntax structures.

The network entity reads the first syntax structure and derives therefrom the number M of dependency dimensions spanning the dependency space as well as the maximum number $N_i$ of rank levels per dependency dimension i, thereby obtaining the $$\prod_i N_i$$

available points in the dependency space. Further, the network entity derives from the first syntax structure the bijective mapping. Further, the network entity reads, per dependency dimension i, the second syntax structure and derives thereby the dependency among the $N_i$ rank levels of dependency dimension i. Whenever deciding on removing any layer, i.e. NAL units belonging to a certain layer, the network entity considers the layer's position in the dependency space along with the dependencies between the available points and layers, respectively.

In doing so, the network entity may select one of the levels; and discard packets, e.g. NAL units, of the multilayered video data stream belonging, e.g. via nuh_layer_id, to a layer of which the selected level is, by way of the dependencies between the layers, independent.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

According to a first embodiment, a multi-view decoder configured to reconstruct a plurality of views 12, 15 from a data stream using inter-view prediction from a first view 12 to a second view 15 is configured to be responsive to a signaling in the data stream so as to change the inter-view prediction at spatial segment boundaries 300 of spatial segments 301 into which the first view 12 is partitioned.

According to a second embodiment, the multi-view decoder according to the first embodiment is configured to, in changing the inter-view prediction, perform a restriction of a domain of possible disparity vectors signalizable in the data stream.

According to a third embodiment, the multi-view decoder according to the first embodiment is configured to, based on the data stream, determine a disparity vector 308 out of a domain of possible disparity vectors for a current portion 302 of the second view 15 and sample the first view 12 at a reference portion 304 displaced from a co-located portion 306 of the first view 12 co-located to the current portion 302 by the disparity vector determined 308.

According to a fourth embodiment, the multi-view decoder according to the third embodiment is configured to, in changing the inter-view prediction, perform a restriction of a domain of possible disparity vectors signalizable in the data stream and perform the restriction of the domain of possible disparity vectors such that the reference portion 304 lies within a spatial segment 301 which the co-located portion 306 is spatially located in.

According to a fifth embodiment, the multi-view decoder according to the third embodiment is configured to, in changing the inter-view prediction, perform a restriction of a domain of possible disparity vectors signalizable in the data stream and perform the restriction of the domain of possible disparity vectors such that the reference portion 304 lies within a spatial segment which the co-located portion 306 is spatially located in and is spaced apart from a boundary of the spatial segment by more than, or equal to, an interpolation filter kernel half-width 310 in case of a component of the disparity vector of a dimension pointing to the boundary 300, having a sub-pel resolution.

According to a sixth embodiment, the multi-view decoder according to the first embodiment is configured to, in changing the inter-view prediction, fill an interpolation filter kernel 311 at portions extending beyond a boundary 300 of a spatial segment which a co-located portion 306 of the first view co-located to a current portion 302 of the second view 15 to be currently predicted using the inter-view prediction, is spatially located in with substitute data independent from information external to the boundary of the spatial segment.

According to a seventh embodiment, the multi-view decoder according to the first embodiment is configured to, in the inter-view prediction, derive, for a current portion of the second view, a reference portion 314 within the first view 12 and, depending on the signaling in the data stream, check whether the reference portion 314 lies within a spatial segment 301 which a co-located portion 306 of the first view 12 co-located to the current portion 302, is spatially located in, and apply a predictor for the current portion 302 derived from an attribute of the reference portion 314, or suppress he appliance or apply a substitute predictor, to a parameter of the current portion 302 depending on whether the reference portion 314 lies within the spatial segment 301 which the co-located portion 306 is spatially located in or not, or apply the predictor irrespective of the reference portion 314 lying within the spatial segment 82 which the co-located portion is spatially located in or not.

According to an eighth embodiment, the multi-view decoder according to the seventh embodiment is configured to, in deriving the reference portion 314, estimate a disparity vector 316 for the current portion 302, locate a representative position 318 of the first view co-located to the current portion 302 or a neighboring portion 320 of the first view neighboring the current portion 302, and determining the reference portion 314 by applying the disparity vector 316 to the representative position 318.

According to a ninth embodiment, the multi-view decoder according to the eighth embodiment is configured to estimate the disparity vector for the current portion based on a depth map transmitted in the data stream or a spatially or temporally predicted disparity vector for the current portion.

According to a tenth embodiment, the multi-view decoder according to the eighth embodiment is configured to, in determining the reference portion 314, select, by use of the disparity vector 316, the reference portion out of a partitioning of the first view 12 into coding blocks, prediction blocks, residual blocks and/or transform blocks.

According to an eleventh embodiment, in the multi-view decoder according to the seventh embodiment the parameter is a motion vector, a disparity vector, a residual signal and/or a depth value.

According to a twelfth embodiment, in the multi-view decoder according to the seventh embodiment, the attribute is a motion vector, a disparity vector, a residual signal and/or a depth value.

According to a thirteenth embodiment, the multi-view encoder is configured to encode a plurality of views 12, 15 into a data stream using inter-view prediction from a first view 12 to a second view 15, wherein the multi-view encoder is configured to change the inter-view prediction at spatial segment boundaries 300 of spatial segments 301 into which the first view 12 is partitioned.

According to a fourteenth embodiment, the multi-view encoder according to the thirteenth embodiment is configured to, in changing the inter-view prediction, perform a restriction of a domain of possible disparity vectors.

According to a fifteenth embodiment, the multi-view encoder according to the thirteenth embodiment is configured to determine (by optimization, for example), and signal in the data stream, a disparity vector 308 out of a domain of possible disparity vectors for a current portion 302 (e.g. a disparity-compensatedly predicted prediction block) of the second view 15 and sample the first view 12 at a reference portion 304 displaced from a co-located portion 306 of the first view 12 co-located to the current portion 302 by the disparity vector determined 308.

According to a sixteenth embodiment, the multi-view encoder according to the fifteenth embodiment is configured to perform the restriction of the domain of possible disparity vectors such that the reference portion 304 lies (e.g. completely) within a spatial segment 301 which the co-located portion 306 is spatially located in.

According to a seventeenth embodiment, the multi-view encoder according to the fifteenth embodiment is configured to perform the restriction of the domain of possible disparity vectors such that the reference portion 304 lies within a spatial segment which the co-located portion 306 is spatially located in and is spaced apart from a boundary of the spatial segment by more than, or equal to, an interpolation filter kernel half-width 310 in case of a component of the disparity vector of a dimension pointing to the boundary 300, having a sub-pel resolution.

According to an eighteenth embodiment, the multi-view encoder according to the thirteenth embodiment is configured to, in changing the inter-view prediction, fill an interpolation filter kernel 311 at portions extending beyond a boundary 300 of a spatial segment which a co-located portion 306 of the first view co-located to a current portion 302 of the second view 15 to be currently predicted using the inter-view prediction, is spatially located in.

According to a nineteenth embodiment, the multi-view encoder according to the thirteenth embodiment is configured to, in the inter-view prediction, derive, for a current portion of the second view, a reference portion 314 within the first view 12 and, depending on the signaling in the data stream, check whether the reference portion 314 lies within a spatial segment 301 which a co-located portion 306 of the first view 12 co-located to the current portion 306, is spatially located in, and apply a predictor for the current portion 302 derived from an attribute of the reference portion 314, or suppress the appliance, to a parameter of the current portion 302 depending on whether the reference portion 314 lies within the spatial segment 301 which the co-located portion 306 is spatially located in or not, or apply the predictor irrespective of the reference portion 314 lying within the spatial segment 301 which the co-located portion is spatially located in or not.

According to a twentieth embodiment, the multi-view encoder according to the nineteenth embodiment is configured to, in deriving the reference portion 314, estimate a disparity vector 316 for the current portion 314, locate a representative position 318 of the first view co-located to the current portion 302 on a neighboring portion 320 of the first view neighboring the current portion 302, and determining the reference portion 314 by applying the disparity vector 316 to the representative position 318.

According to a twenty-first embodiment, the multi-view encoder according to the twentieth embodiment is configured to estimate the disparity vector for the current portion based on a depth map transmitted in the data stream or a spatially or temporally predicted disparity vector for the current portion.

According to a twenty-second embodiment, in the multi-view encoder according to the nineteenth embodiment, the parameter is a motion vector, a disparity vector, a residual signal and/or a depth value.

According to a twenty-third embodiment, in the multi-view encoder according to the nineteenth embodiment, the attribute is a motion vector, a disparity vector, a residual signal and/or a depth value.

According to a twenty-fourth embodiment, the multi-view encoder according to the thirteenth embodiment is configured to signal the change in the data stream to the decoder so as to enable the decoder to rely on the change.

According to a twenty-fifth embodiment, a multi-view decoder is configured to reconstruct a plurality of views 12, 15 from a data stream using inter-view prediction from a first view 12 to a second view 15, wherein the multi-view decoder is configured to use a signaling in the data stream as a guarantee that the inter-view prediction 602 is restricted at spatial segment boundaries 300 of spatial segments 301 into which the first view 12 is partitioned such that the inter-view prediction does not involve any dependency of any current portion 302 of the second view 15 on a spatial segment other than the spatial segment a co-located portion 606 of the first view co-located to the respective current portion of the second view, is located in.

According to a twenty-sixth embodiment, the multi-view decoder according to the twenty-fifth embodiment is configured to adjust an inter-view decoding offset or decide on a trial of performing the reconstruction of the first and second views using inter-view parallelism responsive to the signaling in the data stream.

According to a twenty-seventh embodiment, the multi-view decoder according to the twenty-fifth embodiment is configured to, based on the data stream, determine a disparity vector 308 out of a domain of possible disparity vectors for a current portion 302 of the second view 15 and sample the first view 12 at a reference portion 304 displaced from a co-located portion 306 of the first view 12 co-located to the current portion 302 by the disparity vector determined 308.

According to a twenty-eighth embodiment, a method for reconstructing a plurality of views 12, 15 from a data stream using inter-view prediction from a first view 12 to a second view 15 is responsive to a signaling in the data stream so as to change the inter-view prediction at spatial segment boundaries 300 of spatial segments 301 into which the first view 12 is partitioned.

According to a twenty-ninth embodiment, a method for encoding a plurality of views 12, 15 into a data stream using inter-view prediction from a first view 12 to a second view 15, comprises changing the inter-view prediction at spatial segment boundaries 300 of spatial segments 301 into which the first view 12 is partitioned.

According to a thirtieth embodiment, a method for reconstructing a plurality of views 12, 15 from a data stream using inter-view prediction from a first view 12 to a second view 15, comprises using a signaling in the data stream as a guarantee that the inter-view prediction 602 is restricted at spatial segment boundaries 300 of spatial segments 301 into which the first view 12 is partitioned such that the inter-view prediction does not involve any dependency of any current portion 302 of the second view 15 on a spatial segment other than the spatial segment a co-located portion 606 of the first view co-located to the respective current portion of the second view, is located in.

According to a thirty-first embodiment, a computer program may have a program code for performing, when running on a computer, a method according to the twenty-seventh embodiment.

According to a thirty-second embodiment, a multi-layered video data stream 200 composed of a sequence of NAL units 202 has pictures 204 of a plurality of layers encoded thereinto using inter-layer prediction, each NAL unit 202 having a layer index nuh_layer_id) indicating the layer the respective NAL unit relates to, the sequence of NAL units being structured into a sequence of non-interleaved access units 206 wherein NAL units belonging to one access unit relate to pictures of one temporal time instant, and NAL units of different access units relate to different time instants, wherein, within each access unit, for each layer, the NAL units relating to the respective layer are grouped into one or more decoding units 208, and the decoding units of NAL units relating to different layers are interleaved so that, for each decoding unit 208, inter-layer prediction used to encode the respective decoding unit is based on portions of pictures of layers other than the layer the respective decoding unit relates to, which are coded into decoding units preceding the respective decoding unit within the respective access unit.

According to a thirty-third embodiment, the multi-layered video data stream 200 according to the thirty-second embodiment has an interleaving signaling having a first possible state and a second possible state, wherein, if the interleaving signaling assumes the first possible state, within each access unit, for each layer, at least some of the NAL units relating to the respective layer are grouped into one or more decoding units, and the decoding units of NAL units relating to different layers are interleaved so that, for each decoding unit, inter-layer prediction used to encode the respective decoding unit is based on portions of pictures of layers other than the layer the respective decoding unit relates to, which are coded into decoding units preceding the respective decoding unit within the respective access unit, and if the interleaving signaling assumes the second possible state, within each access unit, the NAL units are arranged un-interleaved with respect to the layers same relate to.

According to a thirty-fourth embodiment, in the multi-layered video data stream according to the thirty-second embodiment, each NAL unit has an NAL unit type index indicating a type of the respective NAL unit out of a set of possible types and, within each access unit, the types of the NAL units of the respective access unit obey an ordering rule among the NAL unit types, and between each pair of access units, the ordering rule is broken.

According to a thirty-fifth embodiment, a multi-layer video coder for generating a multi-layered video data stream 200 composed of a sequence of NAL units 202 is configured to generate the multi-layered video data stream 200 such that same has pictures 204 of a plurality of layers encoded thereinto using inter-layer prediction, each NAL unit 202 having a layer index (e.g. nuh_layer_id) indicating the layer the respective NAL unit relates to, the sequence of NAL units being structured into a sequence of non-interleaved access units 206 wherein NAL units belonging to one access unit relate to pictures of one temporal time instant, and NAL units of different access units relate to different time instants, wherein, within each access unit, for each layer, at least some of the NAL units relating to the respective layer are grouped into one or more decoding units 208, and the decoding units of NAL units relating to different layers are interleaved so that, for each decoding unit 208, inter-layer prediction used to encode the respective decoding unit is based on portions of pictures of layers other than the layer the respective decoding unit relates to, which are coded into decoding units preceding the respective decoding unit within the respective access unit.

According to a thirty-sixth embodiment, a decoder is configured to decode a multi-layered video data stream 200 composed of a sequence of NAL units 202, the multi-layered video data stream 200 having pictures 204 of a plurality of layers encoded thereinto using inter-layer prediction, each NAL unit 202 having a layer index (e.g. nuh_layer_id) indicating the layer the respective NAL unit relates to, the sequence of NAL units being structured into a sequence of non-interleaved access units 206 wherein NAL units belonging to one access unit relate to pictures of one temporal time instant, and NAL units of different access units relate to different time instants, wherein, within each access unit, for each layer, at least some of the NAL units relating to the respective layer are grouped into one or more decoding units 208, and the decoding units of NAL units relating to different layers are interleaved so that, for each decoding unit 208, inter-layer prediction used to encode the respective decoding unit is based on portions of pictures of layers other than the layer the respective decoding unit relates to, which are coded into decoding units preceding the respective decoding unit within the respective access unit.

According to a thirty-seventh embodiment, the decoder according to the thirty-sixth embodiment is configured to decode from the multi-layer video data stream the pictures of the plurality of layers, relating to the one time instant, in a parallel manner.

According to a thirty-eighth embodiment, the decoder according to the thirty-sixth embodiment is configured to buffer the multi-layer video data stream in a plurality of buffers with distributing the NAL units onto the plurality of buffers according to the layer, the NAL units belong to.

According to a thirty-ninth embodiment, in the decoder according to the thirty-sixth embodiment, the multi-layered video data stream has an interleaving signaling having a first possible state and a second possible state, wherein the decoder is configured to be responsive to the interleaving signaling in that the decoder is aware that if the interleaving signaling assumes the first possible state, within each access unit, for each layer, at least some of the NAL units relating to the respective layer are grouped into one or more decoding units, and the decoding units of NAL units relating to different layers are interleaved so that, for each decoding unit, inter-layer prediction used to encode the respective decoding unit is based on portions of pictures of layers other than the layer the respective decoding unit relates to, which are coded into decoding units preceding the respective decoding unit within the respective access unit, and if the interleaving signaling assumes the second possible state, within each access unit, the NAL units are arranged un-interleaved with respect to the layers same relate to.

According to a fortieth embodiment, in the decoder according to the thirty-sixth embodiment, the multi-layered video data stream has an interleaving signaling having a first possible state and a second possible state, wherein the decoder is configured to be responsive to the interleaving signaling in that the decoder is configured to buffer the multi-layer video data stream in a plurality of buffers with distributing the NAL units onto the plurality of buffers according to the layer, the NAL units belong to, in case of the interleaving signaling having the first possible state, and buffer the multi-layer video data stream in one of the plurality of buffers, irrespective of the layer the respective NAL units belong to, in case of the interleaving signaling having the second possible state.

According to a forty-first embodiment, in the decoder according to the thirty-sixth embodiment, the multi-layered video data stream 200 is arranged such that each NAL unit has an NAL unit type index indicating a type of the respective NAL unit out of a set of possible types and, within each access unit, the types of the NAL units of the respective access unit obey an ordering rule among the NAL unit types, and between each pair of access units, the ordering rule is broken, wherein the decoder is configured to detect access unit borders using the ordering rule by detecting whether the ordering rule is broken between two immediately consecutive NAL units.

According to a forty-second embodiment, a method for generating a multi-layered video data stream 200 composed of a sequence of NAL units 202 comprises generating the multi-layered video data stream 200 such that same has pictures 204 of a plurality of layers encoded thereinto using inter-layer prediction, each NAL unit 202 having a layer index (e.g. nuh_layer_id) indicating the layer the respective NAL unit relates to, the sequence of NAL units being structured into a sequence of non-interleaved access units 206 wherein NAL units belonging to one access unit relate to pictures of one temporal time instant, and NAL units of different access units relate to different time instants, wherein, within each access unit, for each layer, at least some of the NAL units relating to the respective layer are grouped into one or more decoding units 208, and the decoding units of NAL units relating to different layers are interleaved so that, for each decoding unit 208, inter-layer prediction used to encode the respective decoding unit is based on portions of pictures of layers other than the layer the respective decoding unit relates to, which are coded into decoding units preceding the respective decoding unit within the respective access unit.

According to a forty-third embodiment, a method for decoding a multi-layered video data stream 200 composed of a sequence of NAL units 202, the multi-layered video data stream 200 having pictures 204 of a plurality of layers encoded thereinto using inter-layer prediction, each NAL unit 202 having a layer index (e.g. nuh_layer_id) indicating the layer the respective NAL unit relates to, the sequence of NAL units being structured into a sequence of non-interleaved access units 206 wherein NAL units belonging to one access unit relate to pictures of one temporal time instant, and NAL units of different access units relate to different time instants, wherein, within each access unit, for each layer, at least some of the NAL units relating to the respective layer are grouped into one or more decoding units 208, and the decoding units of NAL units relating to different layers are interleaved so that, for each decoding unit 208, inter-layer prediction used to encode the respective decoding unit is based on portions of pictures of layers other than the layer the respective decoding unit relates to, which are coded into decoding units preceding the respective decoding unit within the respective access unit.

According to a forty-fourth embodiment, a computer program may have a program code for performing, when running on a computer, a method according to the forty-second and forty-third embodiment.

According to a forty-fifth embodiment, a decoder configured to decode a multi-layered video signal composed of a sequence of packets each of which comprises a layer identification syntax element 806 is configured to be responsive to a layer identification extension mechanism signaling 808; 808' in the multi-layered video signal so as to if the layer-identification extension mechanism signaling 808; 808' signals an activation of a layer-identification extension mechanism, read 814, for a predetermined packet 810, a layer-identification extension 818 from the multi-layered data stream and determine 816a layer-identification index of the predetermined packet using the layer-identification extension 818, and if the layer identification extension mechanism signaling 808; 808' signals an inactivation of the layer-identification extension mechanism, determine 820, for the predetermined packet 810, the layer-identification index of the predetermined packet from the layer-identification syntax element 806 comprised by the predetermined packet.

According to a forty-sixth embodiment, the decoder according to the forty-fifth embodiment, wherein the layer-identification syntax element 806 at least contributes to the layer-identification extension mechanism signaling 808, is configured to determine whether the layer-identification extension mechanism signaling 808 signals the activation or the deactivation of the layer-identification extension mechanism for the predetermined packet at least depending on the layer-identification syntax element comprised by the predetermined packet assuming an escape value or not.

According to a forty-seventh embodiment, the decoder according to the forty-fifth embodiment, wherein a high-level syntax element 822 at least contributes to the layer-identification extension mechanism signaling 808; 808', is configured to determine whether the layer-identification extension mechanism signaling signals the activation or deactivation of the layer-identification extension mechanism for the predetermined packet 810 depending on the high-level syntax element 822.

According to a forty-eighth embodiment, the decoder according to the forty-seventh embodiment is configured to determine that the layer-identification extension mechanism signaling 808; 808' signals the deactivation of the layer-identification extension mechanism responsive to the high-level syntax element assuming a first state.

According to a forty-ninth embodiment, the decoder according to the forty-eighth embodiment, wherein the layer-identification syntax element additionally contributes to the layer-identification extension mechanism signaling 808, is configured to determine that the level-identification extension mechanism signaling signals the activation of the level-identification extension mechanism for the predetermined packet if both the high level syntax element assumes a second state different from the first state, and the layer-identification syntax element of the predetermined packet assumes an escape value, and determine that the level-identification extension mechanism signaling signals the deactivation of the level-identification extension mechanism, if one of the high-level syntax element assuming the first state and the layer-identification element assuming a value different from the escape value, applies.

According to a fiftieth embodiment, the decoder according to the forty-ninth embodiment is configured to, if the high-level syntax element assumes a third state different from the first and second states, concatenate digits representing the layer-identification syntax element comprised by the predetermined packet and digits representing the layer identification extension so as to obtain the level-identification index of the predetermined packet.

According to a fifty-first embodiment, the decoder according to the forty-ninth embodiment is configured to, if the high-level syntax element assumes the second state, determine a length n of the level-identification extension using the high-level syntax element and concatenate digits representing the layer-identification syntax element comprised by the predetermined packet and n digits representing the level-identification extension so as to obtain the level-identification index of the predetermined packet.

According to a fifty-second embodiment, the decoder according to the forty-fifth embodiment is configured to if the layer-identification extension mechanism signaling signals the activation of the layer-identification extension mechanism, determine 816 the layer-identification index of the predetermined packet by concatenating digits representing the layer-identification syntax element comprised by the predetermined packet and digits representing the level-identification extension so as to obtain the level-identification index of the predetermined packet.

According to a fifty-third embodiment, the decoder according to the forty-fifth embodiment is configured to, if the layer-identification extension mechanism signaling signals the activation of the layer-identification extension mechanism, determine the layer-identification index of the predetermined packet by adding the level-identification extension to a predetermined value (e.g. maxNuhLayerId) so as to obtain the level-identification index of the predetermined packet.

According to a fifty-fourth embodiment, a method for decoding a multi-layered video signal composed of a sequence of packets each of which comprises a layer identification syntax element 806 is responsive to a layer identification extension mechanism signaling 808; 808' in the multi-layered video signal in that same comprises if the layer-identification extension mechanism signaling 808; 808' signals an activation of a layer-identification extension mechanism, reading 814, for a predetermined packet 810, a layer-identification extension 818 from the multi-layered data stream and determining 816 a layer-identification index of the predetermined packet using the layer-identification extension 818, and if the layer identification extension mechanism signaling 808; 808' signals an inactivation of the layer-identification extension mechanism, determining 820, for the predetermined packet 810, the layer-identification index of the predetermined packet from the layer-identification syntax element 806 comprised by the predetermined packet.

According to a fifty-fifth embodiment, a computer program may have a program code for performing, when running on a computer, a method according to the fifty-fourth embodiment.

According to a fifty-sixth embodiment, a multi-layered video data stream into which video material is coded at different levels of information amount using inter-layer prediction, the levels having a sequential order defined thereamong and the video material being coded into the multi-layered video data stream so that no layer depends, via the inter-layer prediction, from any layer being subsequent in accordance with the sequential order, wherein each layer which depends, via the inter-layer prediction, from one or more of the other layers, increases an information amount at which the video material is coded into the one or more other layers in terms of different dimension types, for example), comprises a first syntax structure which defines a number M of dependency dimensions spanning a dependency space as well as a maximum number $N_i$ of rank levels per dependency dimension i, thereby defining $$\prod_i N_i$$

available points in the dependency space, and an bijective mapping, mapping each level onto a respective one of at least a subset of the available points within the dependency space, and per dependency dimension i, a second syntax structure describing a dependency among a $N_i$ rank levels of dependency dimensions i, thereby defining dependencies between the available points in the dependency space all of which run parallel to a respective one of the dependency axes with pointing from higher to lower rank levels, with, for each dependency dimension, the dependencies parallel to the respective dependency dimension being invariant against a cyclic shift along each of the dependency dimensions other than the respective dimension, thereby defining, via the bijective mapping, concurrently the dependencies between the layers.

According to a fifty-seventh embodiment, a network entity is configured to read the first and second syntax structure of the data stream of the fifty-sixth embodiment, and determining the dependencies between the layers based on the first and second second syntax structures.

According to a fifty-eighth embodiment, the network entity according to the fifty-sixth embodiment is configured to select one of the levels; and discard packets (e.g. NAL units) of the multi-layered video data stream belonging (e.g. via nuh_layer_id) to a layer of which the selected level is, by way of the dependencies between the layers, independent.

According to a fifty-ninth embodiment, a method comprises reading the first and second syntax structure of the data stream of the fifty-sixth embodiment, and determining the dependencies between the layers based on the first and second second syntax structures.

According to a sixtieth embodiment, a computer program may have a program code for performing, when running on a computer, a method according to the fifty-ninth embodiment.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] B. Bross et al., "High Efficiency Video Coding (HEVC) text specification draft 10", JCTVC-L1003, Geneva, CH, 14-23 Jan. 2013
[2] G. Tech et al., "MV-HEVC Draft Text 3", JCT3V-C1004, Geneva, CH, 17-23 Jan. 2013
[3] G. Tech et al., "3D-HEVC Test Model 3", JCT3V-C1005, Geneva, CH, 17-23 Jan. 2013
[4] J. Chen et al., "SHVC Draft Text 1", JCT-VCL1008, Geneva, CH, 17-23 Jan. 2013
[5] WILBURN, Bennett, et al. High performance imaging using large camera arrays. ACM Transactions on Graphics, 2005, 24. Jg., Nr. 3, S. 765-776.
[6] WILBURN, Bennett S., et al. Light field video camera. In: Electronic Imaging 2002. International Society for Optics and Photonics, 2001. S. 29-36.
[7] HORIMAI, Hideyoshi, et al. Full-color 3D display system with 360 degree horizontal viewing angle. In: Proc. Int. Symposium of 3D and Contents. 2010. S. 7-10.

The invention claimed is:

1. A decoder configured to reconstruct a plurality of views from a data stream using inter-view prediction from a first view to a second view, wherein the decoder is configured to perform, based on a signaling in the data stream, the inter-view prediction at spatial segment boundaries of spatial segments into which the first view is partitioned, wherein the signaling indicates a guarantee that the inter-view prediction from the first view to the second view for a current portion of the second view is based on information stemming from only a first spatial segment of the spatial segments of the first view without combining information from another spatial segment of the spatial segments of the first view, wherein the first spatial segment of the first view is spatially co-located with the current portion of the second view.

2. The decoder of claim 1, wherein the inter-view prediction includes predicting sample values of the current portion of the second view.

3. The decoder of claim 1, wherein the inter-view prediction includes predicting motion vectors associated with the current portion of the second view based on motion vectors associated with the first spatial segment of the first view.

4. The decoder of claim 1, wherein the change in the inter-view prediction at spatial segment boundaries is associated with a selection of a binarization or a probability estimate of a syntax element of the current portion of the second view.

5. An encoder configured to encode a plurality of views into a data stream using inter-view prediction from a first view to a second view, wherein the encoder is configured to insert a signaling in the data stream, wherein the inter-view prediction at spatial segment boundaries of spatial segments into which the first view is partitioned is performed based on the signaling, wherein the signaling indicates a guarantee that the inter-view prediction from the first view to the second view for a current portion of the second view is based on information stemming from only a first spatial segment of the spatial segments of the first view without combining information from another spatial segment of the spatial segments of the first view, wherein the first spatial segment of the first view is spatially co-located with the current portion of the second view.

6. The encoder of claim 5, wherein the inter-view prediction includes predicting sample values of the current portion of the second view.

7. The encoder of claim 5, wherein the inter-view prediction includes predicting motion vectors associated with the current portion of the second view based on motion vectors associated with the first spatial segment of the first view.

8. The encoder of claim 5, wherein the change in the inter-view prediction at spatial segment boundaries is associated with a selection of a binarization or a probability estimate of a syntax element of the current portion of the second view.

9. A non-transitory computer-readable medium for storing data associated with a video, comprising:
a data stream stored in the non-transitory computer-readable medium, the data stream comprising a signaling in the data stream, wherein the inter-view prediction at spatial segment boundaries of spatial segments into which the first view is partitioned is performed based on the signaling, wherein the signaling indicates a guarantee that the inter-view prediction from the first view to the second view for a current portion of the second view is based on information stemming from only a first spatial segment of the spatial segments of the first view without combining information from another spatial segment of the spatial segments of the first view, wherein the first spatial segment of the first view is spatially co-located with the current portion of the second view.

10. The non-transitory computer-readable medium of claim 9, wherein the inter-view prediction includes predicting sample values of the current portion of the second view.

11. The non-transitory computer-readable medium of claim 9, wherein the inter-view prediction includes predicting motion vectors associated with the current portion of the second view based on motion vectors associated with the first spatial segment of the first view.

12. The non-transitory computer-readable medium of claim 9, wherein the change in the inter-view prediction at spatial segment boundaries is associated with a selection of a binarization or a probability estimate of a syntax element of the current portion of the second view.

* * * * *